US 6,738,714 B2

(12) United States Patent
McCall et al.

(10) Patent No.: US 6,738,714 B2
(45) Date of Patent: May 18, 2004

(54) VEHICLE SELF-CARRIED POSITIONING METHOD AND SYSTEM THEREOF

(75) Inventors: Hiram McCall, Simi Valley, CA (US); Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

(21) Appl. No.: 10/370,130

(22) Filed: Feb. 18, 2003

(65) Prior Publication Data

US 2003/0158665 A1 Aug. 21, 2003

Related U.S. Application Data

(62) Division of application No. 10/150,455, filed on May 17, 2002, which is a division of application No. 09/704,211, filed on Oct. 31, 2000, now Pat. No. 6,477,465.
(60) Provisional application No. 60/167,830, filed on Nov. 29, 1999.

(51) Int. Cl.[7] .............................................. G01C 21/26
(52) U.S. Cl. ...................... 701/220; 701/207; 340/988
(58) Field of Search .................. 701/220, 221, 701/207, 217; 73/178 R, 430; 342/357.14, 357.01, 357.05; 340/995, 988

(56) References Cited

U.S. PATENT DOCUMENTS

| 5,902,351 A | * | 5/1999 | Streit et al. ................. 701/220 |
| 6,014,103 A | * | 1/2000 | Sumner et al. ............. 342/457 |
| 6,282,496 B1 | * | 8/2001 | Chowdhary ................. 701/220 |

* cited by examiner

*Primary Examiner*—Marthe Y. Marc-Coleman
(74) *Attorney, Agent, or Firm*—Raymond Y. Chan; David and Raymond Patent Group

(57) ABSTRACT

A vehicle self-carried positioning system, carried in a vehicle, includes an inertial measurement unit, a north finder, a velocity producer, a navigation processor, a wireless communication device, and a display device and map database. Output signals of the inertial measurement unit, the velocity producer, and the north finder are processed to obtain highly accurate position measurements of a vehicle on land and in water, and the vehicle position information can be exchanged with other users through the wireless communication device, and the location and surrounding information can be displayed on the display device by accessing a map database with the vehicle position information.

19 Claims, 36 Drawing Sheets

VEHICLE SELF-CARRIED POSITIONING METHOD AND SYSTEM THEREOF

CROSS REFERENCE OF RELATED APPLICATIONS

This is a divisional application of a non-provisional application, application No. 10/150,455, filed May 17, 2002, which is a divisional application of a non-provisional application, application No. 09/704,211, filed Oct. 31, 2000 now U.S. Pat. No. 6,477,465, which is a regular application of a provisional application having an application No. of 60/167,830 and a filing date of Nov. 29, 1999.

BACKGROUND OF THE PRESENT INVENTION

1. Field of the Present Invention

The present invention relates to a positioning method and system, and more particularly to a vehicle self-carried positioning method and system, specifically for land and water vehicles, which can obtain highly accurate position measurements of a vehicle on land and in water, exchange the vehicle position information with other users through a wireless communication device, and provide location and surrounding information through a display device by accessing a map database with the position information.

2. Description of Related Arts

Current vehicle navigators depend on the GPS (Global Positioning System). The GPS is a satellite radionavigation system, which is owned, deployed, and operated by the U.S. Department of Defense, but is available for commercial use around the world.

Unfortunately, GPS is vulnerable to jamming and shadowing, especially on land, so that a GPS receiver often can not provide continuous positioning information.

An inertial navigation system (INS) is a self-contained navigation system, which does not need to receive any external radio frequency signals. However, the cost, size, power, and drift of conventional inertial navigation systems prohibit them from use in commercial vehicle navigation applications.

Therefore, it is very desirable to develop a positioning system with reasonable size and weight and power consumption for commercial vehicle operation, which can be used in areas where GPS signals are not available, such as tunnels, forested areas, urbanized terrain, and high Electronic Counter Measure (ECM) environments.

SUMMARY OF THE PRESENT INVENTION

The main objective of the present invention is to provide a vehicle self-carried positioning method and system to determine position information on land and in water with high accuracy such as an accuracy of better than 1 percent of the distance traveled without using GPS or radar updates, wherein output signals of an inertial measurement unit, a velocity producer, and a north finder are processed to obtain highly accurate position measurements of a vehicle on land and in water.

Another objective of the present invention is to provide a vehicle self-carried positioning system which fuses information from the IMU, a velocity producer, and a north finder to achieve a highly accurate self-contained navigation solution with hardware and software modules, including the following capabilities:

(1) Self-contained navigation.

(2) Autonomous position error $\leq 1\%$ of the distance traveled without any external RF (radio frequency) signal.

(3) Low cost, low power consumption, lightweight.

(4) A unique sophisticated Kalman filter. It removes the inherent drift of the free inertial positioning solution derived from the output of the low cost coremicro™ IMU by means of fusing information from the coremicro™ IMU, magnetic heading sensor, odometer, and velocimeter.

(5) Smoothing of the output noise of the magnetic sensor, odometer, and velocimeter.

(6) Innovative state variable selection and measurement design of the Kalman Filter, including relative position update, heading update, and zero velocity update.

(7) Autonomous multiple vehicle stop tests and associated zero-velocity updates. The vehicle is not required to perform a zero-velocity update. But, if the vehicle stops at will, the system can exploit such a benefit autonomously.

(8) Advanced IMU-MEMS (microelectromechanical systems) and ASIC (Application Specific Integration Circuit) based coremicro™ IMU: Miniaturized (Length/Width/Height) and Lightweight; High Performance and Low Cost; Low Power Dissipation; Exceptional Improvement In Reliability.

(9) Map database and software module to access surrounding information using the current position solution.

(10) Display device and software module to visualize the location of the user and the surrounding information.

Typical applications of the vehicle self-carried positioning method and system of the present invention include automobiles, railway vehicles, miniature land vehicles, robots, unmanned ground vehicles, military land vehicles, and marine vehicles.

Another objective of the present invention is to provide a vehicle self-carried positioning method and system, which can exchange the vehicle position information with other users through a wireless communication device.

Another objective of the present invention is to provide a vehicle self-carried positioning method and system, which can provide location and surrounding information through a display device by accessing a map database with position information.

DETAIL DESCRIPTION OF THE PREFERRED EMBODIMENT

The present invention provides a vehicle self-carried positioning method and system, specifically for land and water vehicles, wherein output signals of an inertial measurement unit, velocity producer, and a north finder are processed to obtain highly accurate position measurements of a vehicle on land and in water.

Rapid advances in MEMS technologies make it possible to fabricate low cost, light weight, miniaturized size, and low power gyros and accelerometers. "MEMS" stands for "MicroElectroMechanical Systems", or small integrated electrical/mechanical devices. MEMS devices involve creating controllable mechanical and movable structures using IC (Integrated Circuit) technologies. MEMS includes the concepts of integration of Microelectronics and Micromachining. Examples of successful MEMS devices include inkjet-printer cartridges, accelerometers that deploy car airbags, and miniature robots.

Microelectronics, the development of electronic circuitry on silicon chips, is a very well developed and sophisticated technology. Micromachining utilizes process technology developed by the integrated circuit industry to fabricate tiny sensors and actuators on silicon chips. In addition to shrinking the sensor size by several orders of magnitude, integrated electronics can be placed on the same chip, creating an entire system on a chip. This instrument will result in, not only a revolution in conventional military and commercial products, but also new commercial applications that could not have existed without small, inexpensive inertial sensors.

MEMS (MicroElectronicMechanicalSystem) inertial sensors offer tremendous cost, size, reliability improvements for guidance, navigation, and control systems, compared with conventional inertial sensors.

Figure 3:
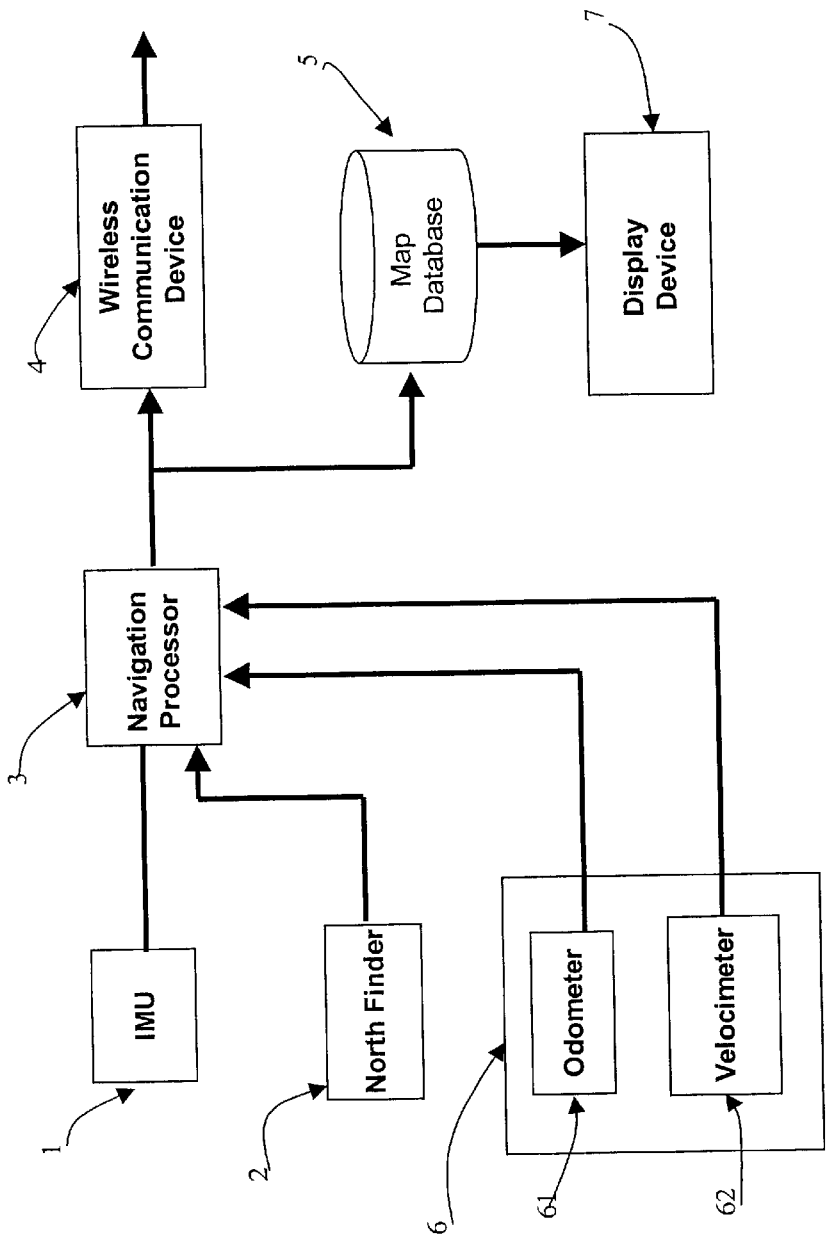
FIG. 3 is a block diagram illustrating a vehicle self-carried positioning method and system thereof according to a preferred embodiment of the present invention.

Referring to FIG. 3, the vehicle self-carried positioning system according to a preferred embodiment of the present invention comprises an inertial measurement unit 1, a north finder 2, a navigation processor 3, and a velocity producer 6 encased in a body frame.

The inertial measurement unit (IMU) 1 is carried in a vehicle for sensing traveling displacement motions of the vehicle so as to produce digital angular increments and velocity increments signals in response to motions of the vehicle. The north finder 2 is carried in the vehicle to produce a heading measurement of the vehicle. The velocity producer 6, carried in the vehicle, for producing a current axis velocity data of the body frame of the vehicle The navigation processor 3 is connected with the inertial measurement unit 1, the north finder 2, and the velocity producer so as to receive the digital angular increments and velocity increments signals, heading measurement, and current axis velocity data of the body frame for a real-time software, which performs the following tasks:

(i) the IMU position deduced from the digital angular increments and velocity increments signals is compared with the measured position deduced from the heading measurement and current axis velocity data of the body frame; and (ii) if the position difference is bigger than a predetermined scale value, the position difference is fed back to correct the IMU position to output the corrected IMU position.

The applicants of the present invention invented and developed technologies of MEMS angular rate sensors and MEMS IMUs, include "MicroElectroMechanical System for Measuring Angular Rate", "Processing Method for Motion Measurement", "Angular Rate Producer with MicroElectroMechanical System Technology", "Micro Inertial Measurement Unit", and "coremicro™ IMU".

It is preferred to employ the coremicro™ IMU as the inertial measurement unit (IMU) 1 employed in the self-carried positioning system. However, it is not limited to the configuration using the micro IMU. Any IMU device with such specifications can be used in the system of the present invention.

However, if a pure conventional inertial navigation method is applied to MEMS-based IMU including coremicro™ IMU, the drift of position is too rapid to be used. In the system of the present invention, an inertial navigation system (INS) is built around the coremicro™ IMU that is the core of the position determination system. To compensate the error of the INS, multiple navigation sensors are integrated into the system. The north finder 2 is used to measure the heading of the vehicle. The preferred velocity producer 6 is an odometer or velocimeter. The odometer is used to measure the relative velocity with respect to the ground to obtain the distance when the vehicle is on land. When the vehicle is in the water, a velocimeter is used to measure water speed for INS aiding. Zero velocity updating method is used to calibrate the INS errors.

The preferred north finder 2 can be a magnetic sensor, for example, a flux valve, sensing earth magnetic field to measure the heading angle of the vehicle.

The velocity producer 6 further includes an odometer 61 for measuring relative velocity with respect to the ground on which the vehicle travels when the vehicle is on land, and a velocimeter 62 for measuring velocity with respect to water when the vehicle is in the water.

Figure 4:
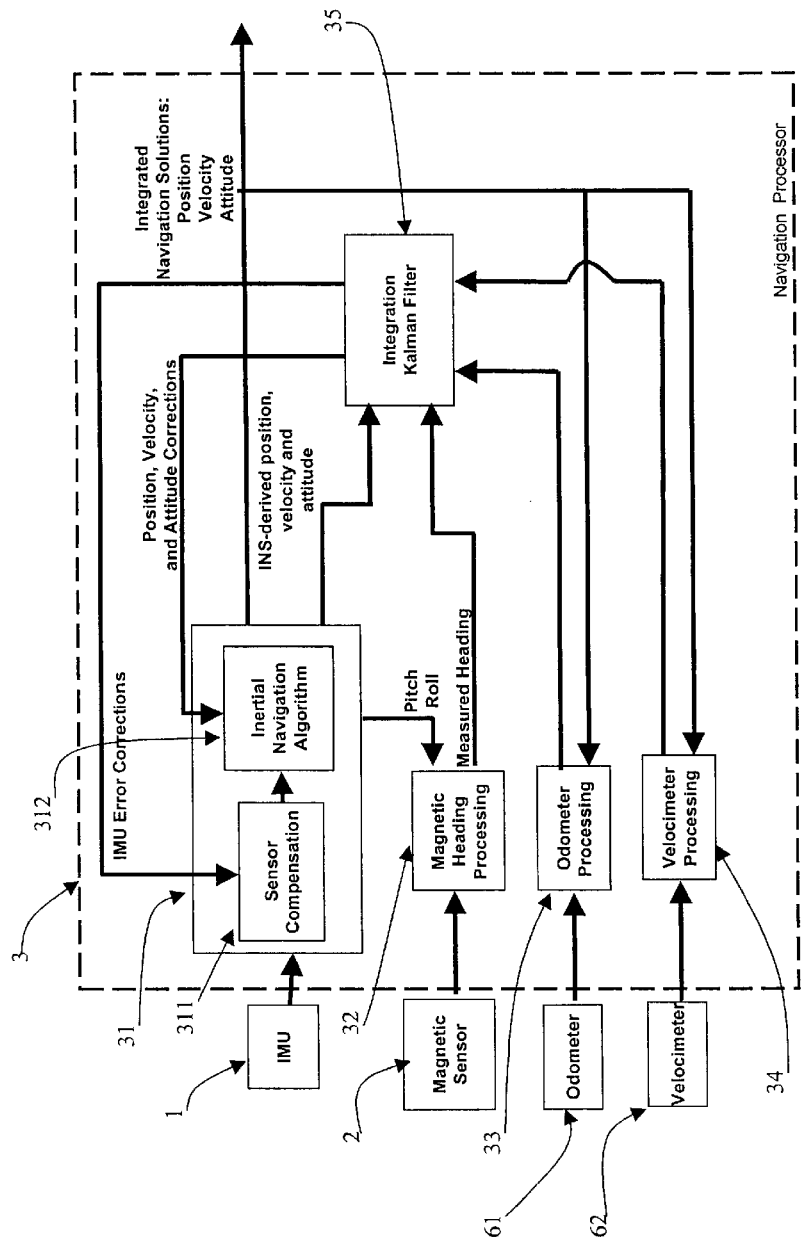
FIG. 4 is a block diagram illustrating the processing modules of the navigation processor according to the above preferred embodiment of the present invention.

Referring to FIG. 4, the preferred real-time software running in the navigation processor 3 comprises the following modules:

(5.1) an INS computation module 31, using digital angular increments and velocity increments signals from the IMU 1 to produce inertial positioning measurements;

(5.2) a magnetic sensor processing module 32, for producing the heading angle;

(5.3) an odometer processing module 33, for producing relative position error measurements for a Kalman filter;

(5.4) a velocimeter processing module 34, for producing relative position error measurements for a Kalman filter, and (5.5) an integration Kalman filter 35, for estimating errors of inertial positioning measurements by means of performing Kalman filtering computation to calibrate the inertial positioning measurement errors.

In order to enhance the performance of the vehicle self-carried positioning system of the present invention, which further connects with a wireless communication device 4 to exchange the obtained position information with other users.

In order to visualize the position information of the vehicle self-carried positioning system of the present invention, a map database 5 and a display device 7 are further inserted into the vehicle self-carried positioning system to display the location of the vehicle on a map and to obtain surrounding information by accessing the map database using the position information.

The IMU 1 and the associated INS computation module 31 are the core of the navigator for users on land and in water. The INS computation module 31 further comprises a sensor compensation module 311 for calibrating the error of the digital angular increments and velocity increments signals, and an inertial navigation algorithm module 322 for computing the IMU position, velocity, and attitude data.

Figure 5:
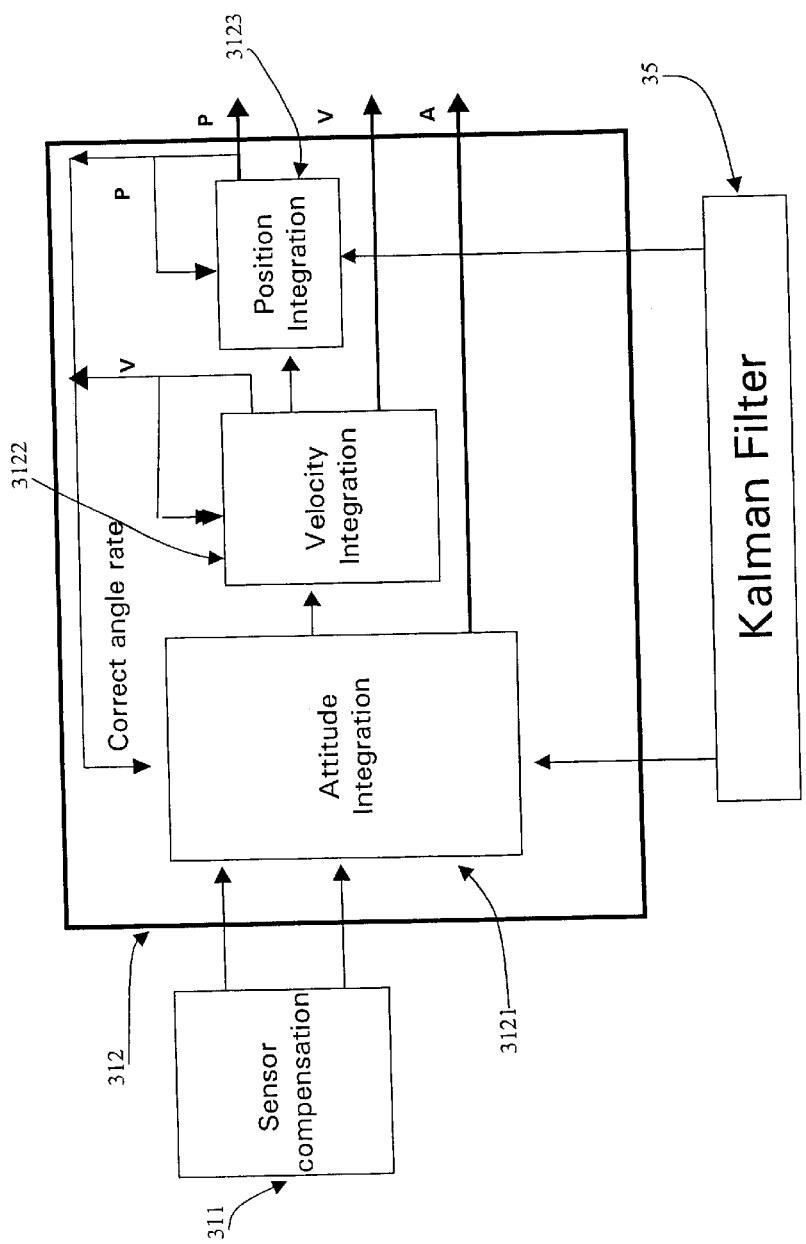
FIG. 5 is a block diagram illustrating processing modules of the inertial navigation processing according to the above preferred embodiment of the present invention.

FIG. 5 shows the inertial navigation algorithm module 322. While the INS provides a self-contained, non-radiating, and deterministic means for three-dimensional navigation with accurate short-term position information, it also exhibits an unbounded mean position error due to uncompensated gyro and accelerometer errors, especially for low quality strapdown based INS systems. The external aiding information must be provided to enhance the long-term accuracy of the system. Multiple navigation sensors in the present invention are used to aid the core INS. Flux valve aiding is used for heading updates. The odometer, velocimeter, and Zero velocity updating is used to suppress the error growth of the INS Based on the established INS error model and other sensor error models, an integration Kalman filter is constructed to estimate and compensate the INS errors and sensor errors. The integrated system of the present invention is used to determine the position of the user on land and in water.

Figure 1:
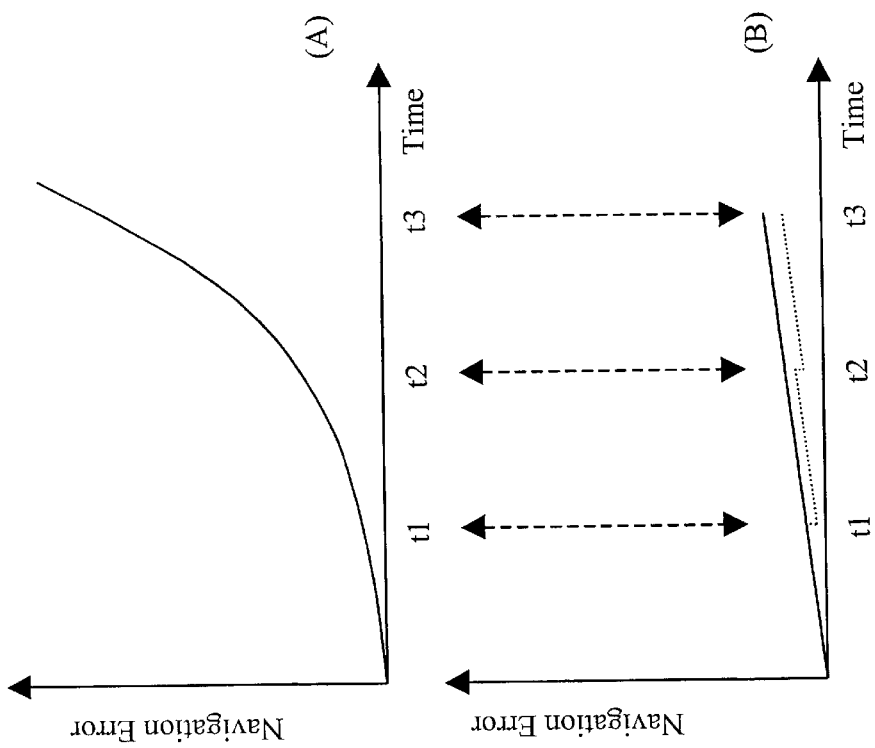
FIG. 1 illustrates a characteristics comparison of a pure INS and an aided INS.

As the block diagram of the vehicle self-carried positioning system of the present invention shown in FIG. 3, one of the key technologies is the use of automatic zero-velocity updates in the navigation algorithm to greatly reduce the accumulated navigation error. The position error of an inertial navigation system (INS), which is a dead-reckoning system, increases with time with a pattern shown in FIG. 1(A). The zero-velocity update technology uses the additional zero velocity information to reset the velocity measurement of the navigator, when the user stops. The periodic zero-velocity reset leads to a navigation error pattern shown in FIG. 1(B).

With the zero-velocity reset and odometer and velocimeter aiding augmented with error estimation and compensation, the growth of the inertial navigation error is greatly reduced. Its navigation error pattern with time is given by the dotted line shown in FIG. 1(B). The vehicle self-carried positioning method of the present invention is effective to compensate for currents and drifts, during navigation on land and in water, to maintain a navigation accuracy of better than 1% of distance traveled.

Figure 6:
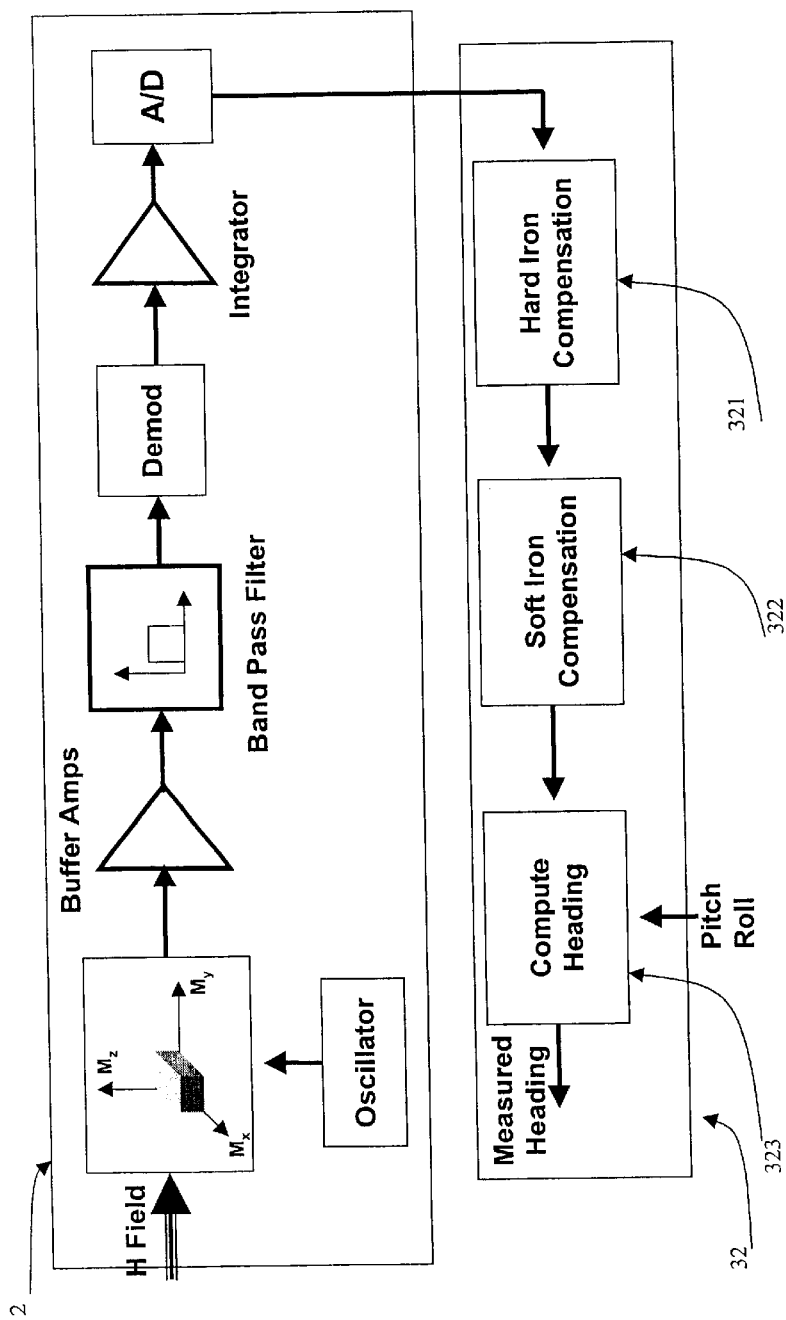
FIG. 6 is a block diagram illustrating processing of magnetic sensor signals according to the above preferred embodiment of the present invention.

FIG. 6 is a block diagram depicting a magnetic sensor and the magnetic sensor processing module 32. The magnetic sensor detects the magnitude and direction of the earth's magnetic field and converts it to electrical information, which is used to obtain the magnetic north.

To obtain the true magnetic north, the earth's magnetic field measurement must be compensated using the measured field strengths, soft iron, and hard iron transformation matrices.

Ferrous metals in the vehicle often magnetize over time, misdirecting magnetic compass readings. In addition, some devices also generate soft iron distortions. Soft iron can either misdirect or magnify existing magnetic fields, making calibration extremely difficult.

Figure 7:
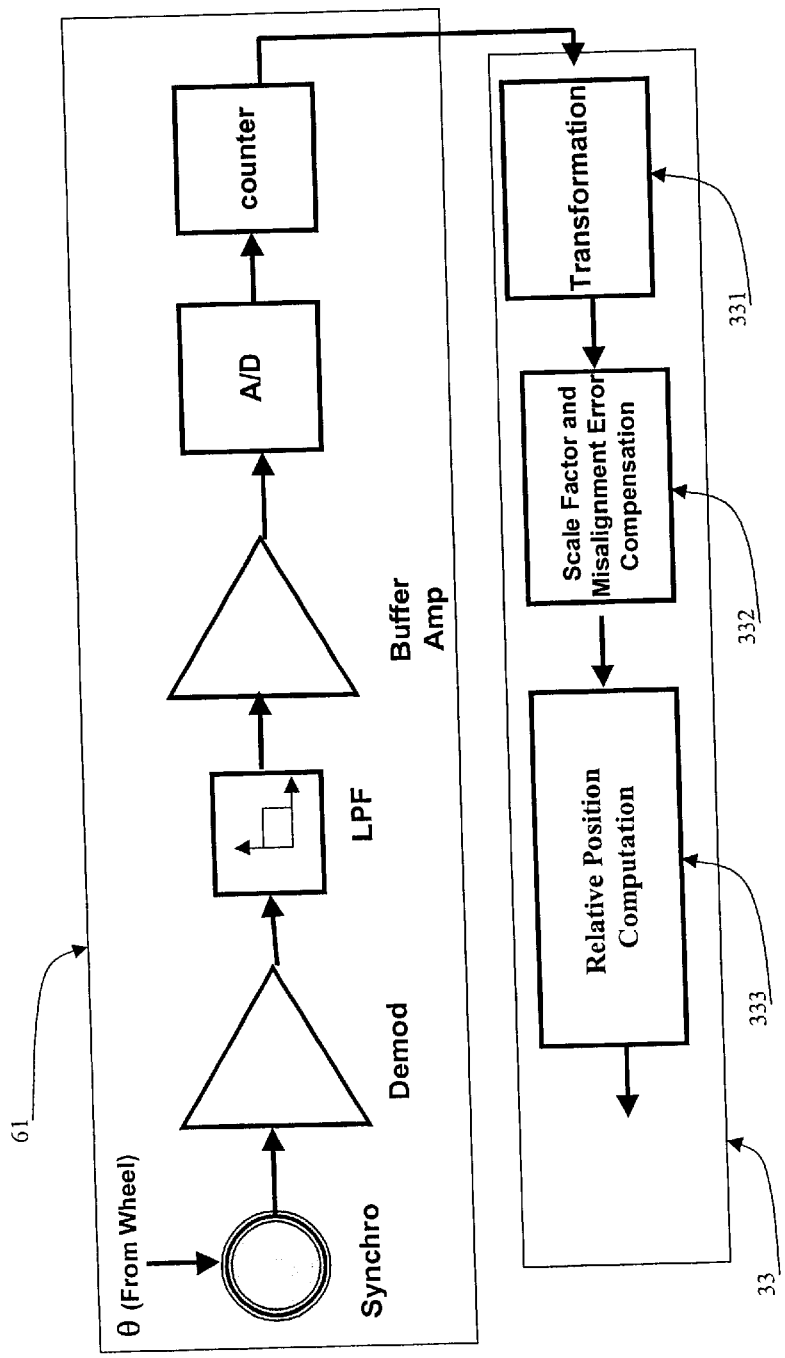
FIG. 7 is a block diagram illustrating odometer sensor signal processing according to the above preferred embodiment of the present invention.

FIG. 7 depicts the odometer and the odometer processing module 33. The odometer measures the rotation of the wheel of the vehicle with a synchro. The output of the synchro is a modulated signal of alternating current/voltage. This signal is demodulated and passed through a low pass filter to get an analog signal representing the delta distance in a sampling period. The signal is further converted to a digital signal for the navigation computer. It is noted that the measured delta distance is represented in the vehicle body frame instead of the navigation frame.

Figure 8:
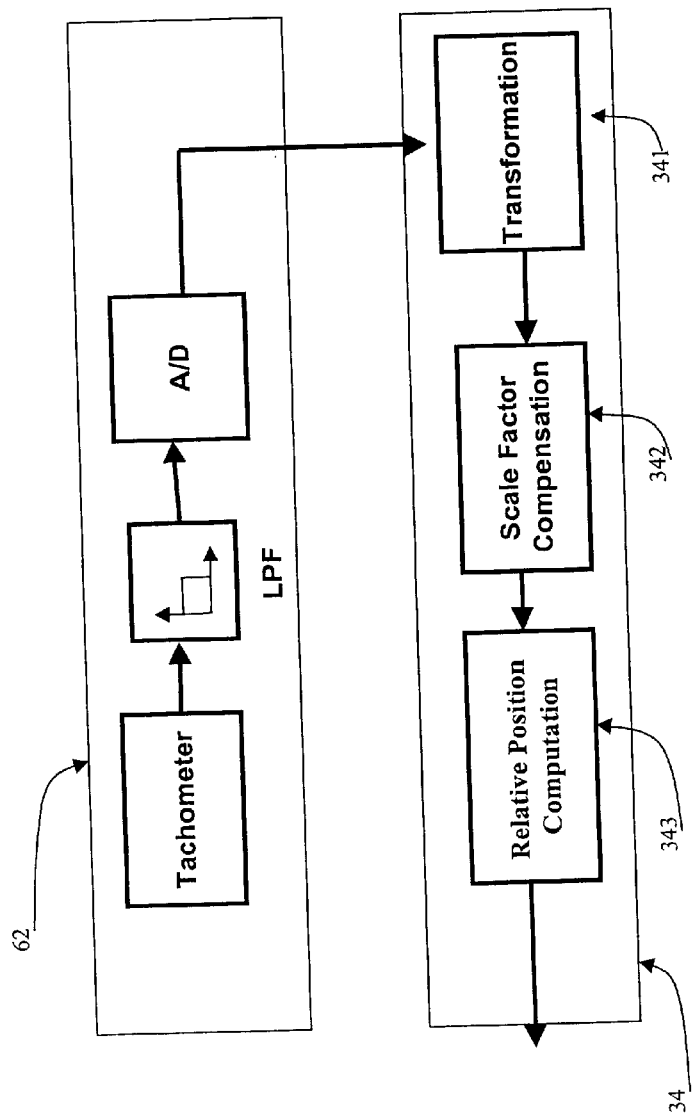
FIG. 8 is a block diagram illustrating velocimeter sensor signal processing according to the above preferred embodiment of the present invention.

FIG. 8 depicts the velocimeter signal and the velocimeter processing module 34. The output of the velocimeter is an analog signal. A low pass filter is used to suppress the noise and acts as an anti-aliasing filter. An A/D converter is used to convert the velocimeter signal from analog to digital signal and input it into the processing computer. The digital velocimeter signal is then integrated to get the delta distance or distance increment.

Referring to FIG. 4, the INS processing module 31 further comprises a sensor compensation module 311 and an inertial navigation algorithm module 322.

Because the installation of the gyros and the accelerometers in an IMU are not precisely in three orthogonal directions, the IMU data must be calibrated before it is applied to the inertial navigation algorithm module 322.

For example, currently, the EMS IMU is an assembly of low accuracy micromachined silicon gyros and accelerometers. Because the MEM sensor is very sensitive to temperature and acceleration, a set of special modules are devised in the sensor compensation module design.

The simplified error compensation for the MEM gyro is expressed as:

$$\epsilon = \epsilon_{drift} + \epsilon_{misalign} + \epsilon_{nonorth} + \epsilon_{scale} + \epsilon_g + \epsilon_{random} + \epsilon_t(T)$$

This error compensation for the MEM IMU errors is explained as follows.

(1) Stability error $\epsilon_{drift}$, also denoted as drift. Since the time constant is large for the MEM gyro stability error, this effect is modeled as a constant bias.

(2) Misalignment error $\epsilon_{misalign}$. Misalignment is the difference between the actual orientation of the device sensitive axis and the intended orientation of that axis. This is a constant angular error and is normally kept small by precision mounting and calibrating techniques during installation.

(3) Non-Orthogonal error $\epsilon_{nonorth}$. This error refers to imprecision in assembling the MEM IMU unit itself. The IMU consists of three micro gyros which are intended to be mounted perfectly along three orthogonal axes. Non-orthogonal error results when one gyro input axis leans into the plane containing the remaining two gyro input axes. This non-orthogonal gyro will detect a component of the angular rate about the other axes.

(4) Scale factor error $\epsilon_{scale}$. This error is calculated as a percentage of the true angular rate sensed by the MEM rate gyro. Scale factors produce an error in the measured angular rate of a magnitude that is proportional to the true angular rate being measured. Scale factor errors can be cause remarkable navigation errors at high angular rates.

(5) G sensitive error $\epsilon_g$. Gyro output variation due to accelerations incident on the device is called g-sensitive error. This produces a rate bias error proportional to the amount of specific force in a maneuver. The specific force is equal to the inertial acceleration of a body minus the gravitational acceleration.

(6) Random walk $\epsilon_{random}$. MEM gyros are noisy sensors. In the inertial navigation system, the micro gyro acts as an integrator of the sensed angular rate. The actual sensor output of $\Delta\theta$ integrates the noise in the gyro output to produce a smoother signal that randomly wanders through a certain range of errors. Angle random walk is estimated by the compensation processing.

(7) Temperature sensitivity $\epsilon_t(T)$. The MEM gyro is very sensitive to a change in temperature. It can even be regarded as a good thermometer. The temperature induced error must be removed by the navigation algorithm in the INS. Thus in the IMU error processing we must provide a temperature term which can produce the error data according to the temperature changes during system operation.

Similarly, the error compensation for the MEM accelerometer is expressed as:

$$\nabla = \nabla_{drift} + \nabla_{misalign} + \nabla_{nonorth} + \nabla_{scale} + \nabla_g + \nabla_{random} + \nabla_t(T)$$

The definition of the error terms in this accelerometer are also similar to that of the MEM gyro.

Figure 2:
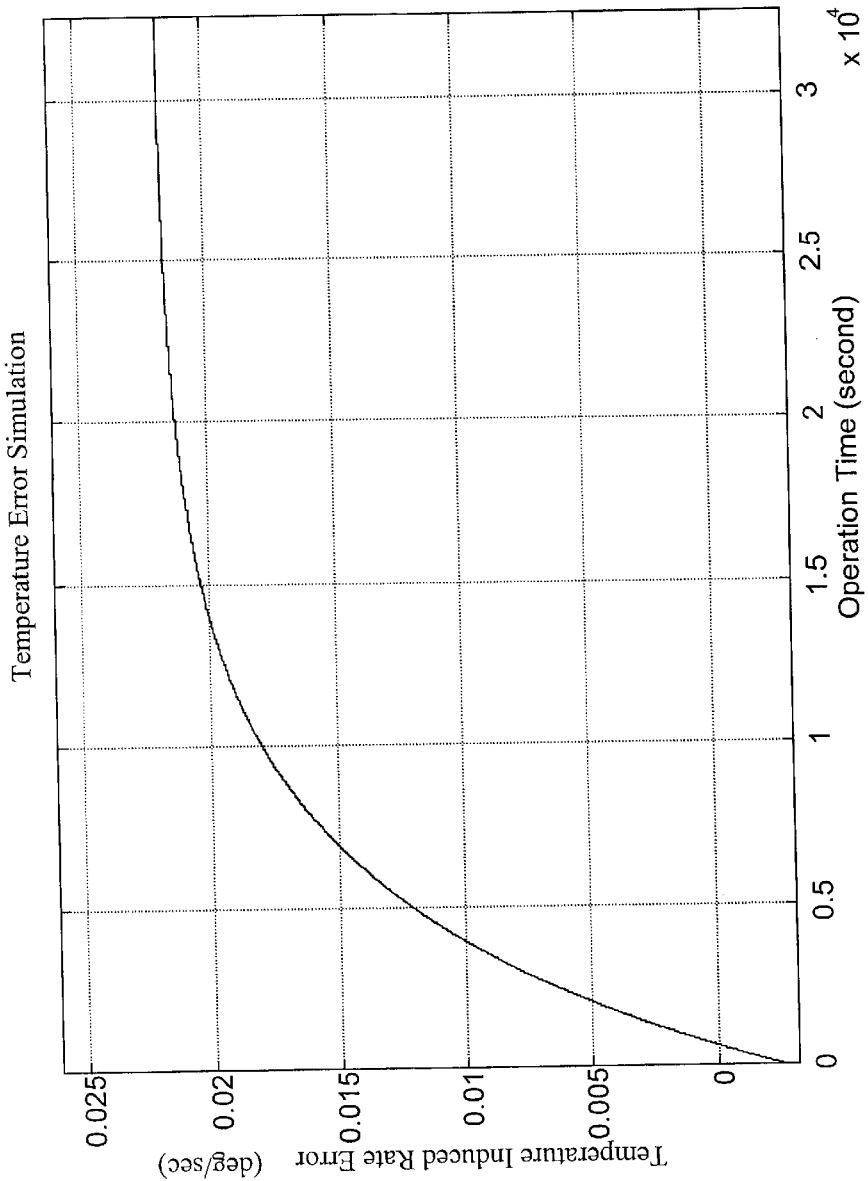
FIG. 2 illustrates the characteristics of temperature induced errors of a MEMS gyro.

In practice the temperature change of an IMU can be approximately described by the first order differential equation $$\dot{T} = -\frac{1}{t_c}(T - T_{bal})$$

$$T(0) = T_0$$

where T represents the IMU temperature, $T_0$ is the initial temperature, $t_c$ is the time constant, $T_{bal}$ is the balance temperature of the IMU. Parameter $t_c$ and $T_{bal}$ are determined by the heat transfer properties of the IMU and the environmental temperature, which can be found by calibration. The temperature induced error can be expressed as $$\epsilon_t = K_t(T - T_{nom})$$

where $T_{nom}$ is the nominal temperature at which the IMU is calibrated, and $K_t$ is the temperature error factor. FIG. 2 shows a typical temperature induced error of a MEMS gyro.

Referring to FIG. 5, the inertial navigation algorithm module 322 further comprises:

(1) an attitude integration module 3121, for integrating the angular increments into attitude data;

(2) a velocity integration module 3122, for transforming measured velocity increments into a suitable navigation coordinate frame by use of the attitude data, wherein the transformed velocity increments is integrated into velocity data; and (3) a position module 3123, for integrating the navigation frame velocity data into position data.

Referring to FIG. 6, the magnetic sensor processing module 32 for producing the heading angle further comprises:

(1) a hard iron compensation module 321, for receiving the digital Earth's magnetic field vector and compensating the hard iron effects in the digital earth's magnetic field vector;

(2) a soft iron compensation module 322, for compensating the soft iron effects in the digital earth's magnetic field vector; and (3) a heading computation module 322, for receiving the compensated earth's magnetic field vector and pitch and roll from the inertial navigation algorithm module 322 and computing the heading data.

Referring to FIG. 7, the odometer processing module 33 for producing relative position error measurements for a Kalman filter further comprises:

(1) a transformation module 331, for transforming the input odometer velocity data expressed in the body frame to the odometer velocity expressed in the navigation frame;

(2) a scale factor and misalignment error compensation module 332, for compensating the scale factor and misalignment errors in the odometer velocity; and (3) a relative position computation 333, for receiving the IMU velocity and attitude data and the compensated odometer velocity to form the relative position measurements for the Kalman filter 35.

Referring to FIG. 8, the velocimeter processing module 34 for producing relative position error measurements for a Kalman filter comprises:

(1) a transformation module 341, for transforming the input velocimeter velocity data expressed in the body frame to the odometer velocity expressed in the navigation frame;

(2) a scale factor and misalignment error compensation module 342, for compensating the scale factor and misalignment errors in the velocimeter velocity; and (3) a relative position computation 343, for receiving the IMU velocity and attitude data and the compensated velocimeter velocity to form the relative position measurements for the Kalman filter 35.

The relative position computation 343 is the same as the relative position computation 333.

Figure 10:
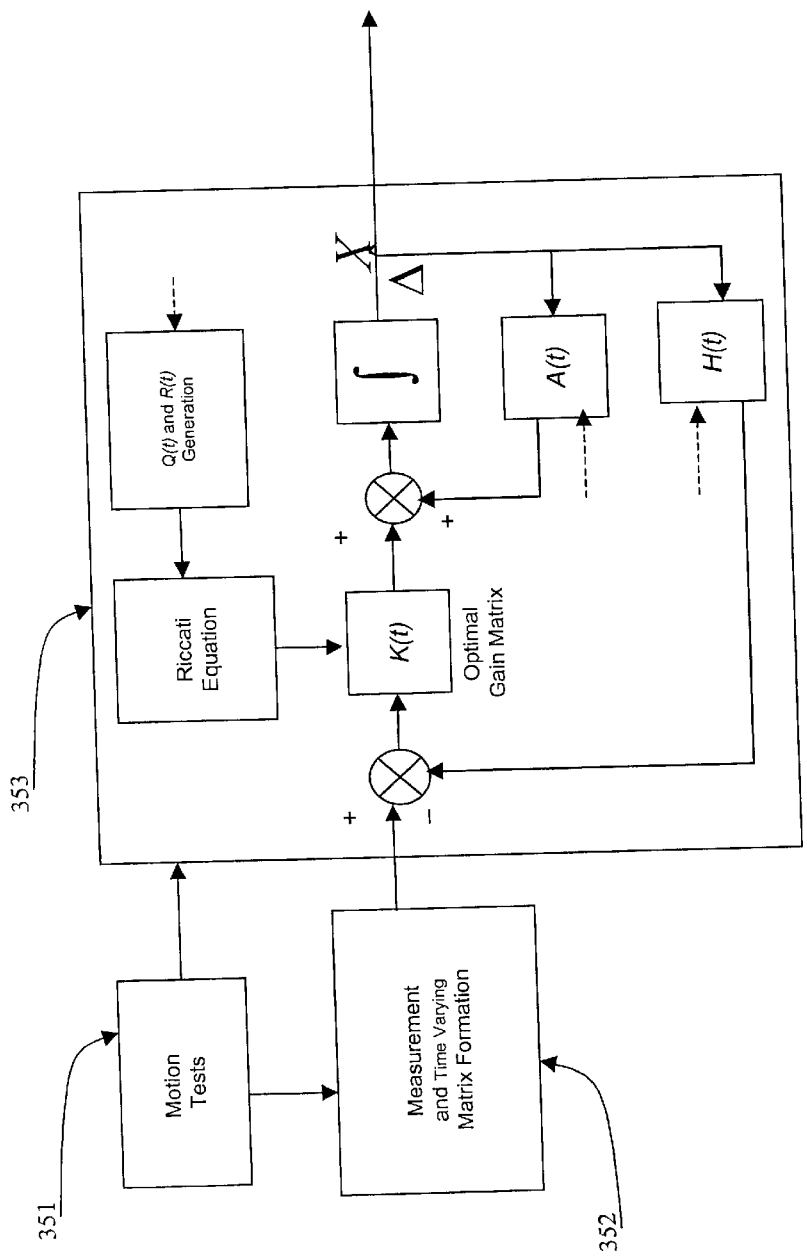
FIG. 10 is a block diagram illustrating the computation of the Kalman filter according to the above preferred embodiment of the present invention.

Referring to FIG. 4 and FIG. 10, the Kalman filter module 35 further comprises:

(1) a motion test module 351, for determining if the vehicle stops automatically;

(2) a measurement and time varying matrix formation module 352, for formulating the measurement and time varying matrix for the state estimation module 353 according to the motion status of the vehicle from the motion test module 351; and (3) a state estimation module 353, for filtering the measurement and obtaining the optimal estimates of the IMU position errors.

In order to obtain optimal estimates of the IMU position errors, a set of error state equations need to be established for the Kalman filter, the relationship between the reference/ideal system determined p platform and the actual/practical system determined platform pc is defined as $$C_b^{pc} = C_p^{pc} C_b^p = (I + [\phi])C_b^p$$

where I is the identity matrix. $[\phi]$ is the skew symmetric matrix form of vector $\phi$ $$[\phi] = \begin{bmatrix} 0 & \phi_z & -\phi_y \\ -\phi_z & 0 & \phi_x \\ \phi_y & -\phi_x & 0 \end{bmatrix}$$

Vector $\phi$ consists of three small angle error between the reference/ideal system determined p platform and the actual/practical system determined platform pc:

$$\phi = \begin{bmatrix} \phi_x \\ \phi_y \\ \phi_z \end{bmatrix}$$

The gyro and accelerometer models are expressed as $$\omega_{ibc}^b = \omega_{ib}^b + \varepsilon^b$$

$$f_c^b = f^b + \nabla^b$$

where $\epsilon^b$ and $\nabla^b$ are generalized gyro and accelerometer errors. Superscript b means the errors are expressed in the body or sensor frame and are real sensor errors.

Then, the generalized linear INS error model, with first order approximation, can be expressed as following equations:

$$\Delta \dot{X} = \frac{\partial F_x(X)}{\partial X}\Delta X + \begin{bmatrix} [\phi]f^p + \nabla^p \\ O \end{bmatrix} + \begin{bmatrix} \Delta G^p \\ O \end{bmatrix}$$

$$\dot{\phi} = -\varepsilon^p - [\phi]\omega_{ip}^p + \Delta\omega_{ip}^p$$

$$= -\varepsilon^p - [\phi]\omega_{ip}^p + \frac{\partial F_\omega(X)}{\partial X}\Delta X$$

or in vector form $$\dot{\phi} = \phi \times \omega_{ip}^p + \Delta\omega_{ip}^p - \varepsilon^p$$

where $$f^P = C_b^p f^b$$
$$\nabla^P = C_b^p \nabla^b$$
$$\varepsilon^P = C_b^P \varepsilon^b$$

This generalized INS error model can be used to derive specific error models for different system configurations.

In a preferred embodiment of the state estimation module 353, two filters are established:
- (1) a horizontal filter, for obtaining the estimates of the horizontal IMU position errors; and
- (2) a vertical filter, for obtaining the estimates of the vertical IMU position errors.

The preferred state vector for the horizontal filter state vector comprises the following variables:
1. $\theta_x$ position error about x (rad)
2. $\theta_y$ position error about y (rad)
3. $\Delta v_x$ x velocity error (F/s)
4. $\Delta v_y$ y velocity error (F/s)
5. $\phi_x$ x tilt error (rad)
6. $\phi_y$ y tilt error (rad)
7. $\theta_z$ azimuth error (rad)
8. $\Delta x_R$ relative position error about x (FT)
9. $\Delta y_R$ relative position error about y (FT)
10. $\epsilon_x$ gyro bias error (R/s)
11. $\epsilon_y$ y gyro bias error (R/s)
12. $\epsilon_z$ z gyro bias error (R/s)
13. $\Delta\theta$ odometer/velocimeter horizontal boresight (rad)
14. $\Delta SF$ odometer/velocimeter scale factor error The preferred state vector for the vertical filter state vector comprises following variables:
1. $\Delta EL$=elevation error (FT)
2. $\Delta v_z$=z velocity error (F/s)
3. $\Delta z_R$=z relative position error (FT)
4. $\epsilon_{AZB}$=z accelerometer bias (F/s²)
5. $\Delta\theta_v$=odometer/velocimeter vertical boresight (rad)

On land, the state estimation module 353 from time to time receives external information:
- (1) known position change, obtained from the odometer processing module 33;
- (2) position change equal to zero, obtained from the zero velocity update processing from the motion tests module 351; and
- (3) known heading, obtained from the magnetic sensor processing module 32.

In water, the state estimation module 353 from time to time receives external information:
- (1) known position change, obtained from the velocimeter processing module;
- (2) position change equal to zero, obtained from the zero velocity update processing from the motion tests module 351; and
- (3) known heading, obtained from the magnetic sensor processing module 32.

The difference between odometer/velocimeter velocity and the IMU velocity, both resolved into a "level body" coordinate, is rapidly integrated into 3 components of relative position.

Every Kalman update interval, for example, every 8 seconds, the x and y relative position is provided to the level Kalman filter and the z relative position is provided to the vertical Kalman filter. The filters will then proceed to update and correct the IMU position.

The motion test module 351 determines if the vehicle has stopped. If the vehicle stops, a zero position change is applied to the Kalman filter. The definition of "stopped" is given in the following description. Suppose the Kalman update interval is 8 sec. The motion during the 8 sec period is analyzed to determine if the vehicle "stopped" for the entire 8 sec. If so, the "stop" flag is set. To do the update with small measurement noise, the vehicle must have been "stopped" for the proceeding 8 sec. Once the stop has been set, it may be reset as soon as motion is detected, which may be less than 8 sec. If stop is reset, it may only be set by 8 continuous seconds of no motion.

The motion test module 351 comprises:
- (1) an odometer change test module, for receiving the odometer reading to determining if the vehicle stops or restarts;
- (2) a system velocity change test module, for comparing system velocity change between the current interval and the previous interval to determining if the vehicle stops or restarts;
- (3) a system velocity test module, for comparing the system velocity magnitude with a predetermined value to determine if the vehicle stops or restarts; and
- (4) an attitude change test module, for comparing the system attitude magnitude with a predetermined value to determine if the vehicle stops or restarts;

For example, in the odometer change test, at the start of the candidate 8 sec interval, the odometer input pulses are summed as they are read in. If the absolute value of the accumulation ever exceeds a pre-determined value, such as 2 pulses, at any time in the 8 sec interval, stop is reset.

In the system velocity test, every pre-determined period, for example, 2 seconds, the average x, y, z velocities (as determined by x, y, z position change in 2 seconds) are compared to the previous 2-second average x, y, z velocities, respectively. If any 2-sec change in any axis exceeds a predetermined value, for example, 0.1 F/s, the entire 8-sec interval is defined as "not stopped". Note that a velocity of 0.1 f/s for 2 sec corresponds to a 0.2 ft (or approximate 2 inch) of vehicle disturbance which will be allowed.

In the system velocity test, if we assume an upper bound of 10 f/s for the magnitude of system velocity error, we use this criteria:

Every 2 seconds compare the average x, y, z velocities with the previous 2 second average. reset stop if any velocity is greater in magnitude than 10 f/s.

In a tracked vehicle with only one odometer and with the IMU mounted near the odometer, the vehicle may turn by locking this track, giving no odometer output and small IMU velocities. This situation is detected by the attitude change test.

The total attitude change in any 2 second interval and in any 8 sec interval must be less than 1 degree to set stop.

Every update period of the Kalman filter (for example, 8 sec), the x, y, z relative position measurement is passed to the Kalman filter to perform an update. The scalor sigma squared=[H] [P] [$H^T$]+R is an estimate of the covariance of this measurement and may be used to test the reasonability of the magnitude of the measurement. Three such scalors are available, one for each axis.

The preferred IMU 1 is a micro IMU in which a position and attitude processor is built in. The position and attitude processor can replace the above disclosed INS computation module 31. The micro IMU is disclosed as follows.

Generally, an inertial measurement unit (IMU) is employed to determine the motion of a carrier. In principle, an inertial measurement unit relies on three orthogonally mounted inertial angular rate producers and three orthogonally mounted acceleration producers to obtain three-axis angular rate and acceleration measurement signals. The three orthogonally mounted inertial angular rate producers and three orthogonally mounted acceleration producers with additional supporting mechanical structure and electronic devices are conventionally called an Inertial Measurement Unit (IMU). The conventional IMUs may be cataloged into Platform IMU and Strapdown IMU.

In the platform IMU, angular rate producers and acceleration producers are installed on a stabilized platform. Attitude measurements can be directly picked off from the platform structure. But attitude rate measurements can not be directly obtained from the platform. Moreover, there are highly accurate feedback control loops associated with the platform.

Compared with the platform IMU, in the strapdown IMU, angular rate producers and acceleration producers are directly strapped down with the carrier and move with the carrier. The output signals of the strapdown rate producers and acceleration producers are expressed in the carrier body frame. The attitude and attitude rate measurements can be obtained by means of a series of computations.

A conventional IMU uses a variety of inertial angular rate producers and acceleration producers. Conventional inertial angular rate producers include iron spinning wheel gyros and optical gyros, such as Floated Integrating Gyros (FIG.), Dynamically Tuned Gyros (DTG), Ring Laser Gyros (RLG), Fiber-Optic Gyros (FOG), Electrostatic Gyros (ESG), Josephson Junction Gyros (JJG), Hemisperical Resonating Gyros (HRG), etc. Conventional acceleration producers include Pulsed Integrating Pendulous Accelerometer (PIPA), Pendulous Integrating Gyro Accelerometer (PIGA), etc.

The processing method, mechanical supporting structures, and electronic circuitry of conventional IMUs vary with the type of gyros and accelerometers employed in the IMUs. Because conventional gyros and accelerometers have a large size, high power consumption, and moving mass, complex feedback control loops are required to obtain stable motion measurements. For example, dynamic-tuned gyros and accelerometers need force-rebalance loops to create a moving mass idle position. There are often pulse modulation force-rebalance circuits associated with dynamic-tuned gyros and accelerometer based IMUs. Therefore, conventional IMUs commonly have the following features:

High cost,
Large bulk (volume, mass, large weight),
High power consumption,
Limited lifetime, and
Long turn-on time.

These present deficiencies of conventional IMUs prohibit them from use in the emerging commercial applications, such as phased array antennas for mobile communications, automotive navigation, and handheld equipment.

New horizons are opening up for inertial sensor device technologies. MEMS (MicroElectronicMechanicalSystem) inertial sensors offer tremendous cost, size, and reliability improvements for guidance, navigation, and control systems, compared with conventional inertial sensors.

MEMS, or, as stated more simply, micromachines, are considered as the next logical step in the silicon revolution. It is believed that this coming step will be different, and more important than simply packing more transistors onto silicon. The hallmark of the next thirty years of the silicon revolution will be the incorporation of new types of functionality onto the chip structures, which will enable the chip to, not only think, but to sense, act, and communicate as well.

Prolific MEMS angular rate sensor approaches have been developed to meet the need for inexpensive yet reliable angular rate sensors in fields ranging from automotive to consumer electronics. Single input axis MEMS angular rate sensors are based on either translational resonance, such as tuning forks, or structural mode resonance, such as vibrating rings. Moreover, dual input axis MEMS angular rate sensors may be based on angular resonance of a rotating rigid rotor suspended by torsional springs. Current MEMS angular rate sensors are primarily based on an electronically-driven tuning fork method.

More accurate MEMS accelerometers are the force rebalance type that use closed-loop capacitive sensing and electrostatic forcing. Draper's micromechnical accelerometer is a typical example, where the accelerometer is a monolithic silicon structure consisting of a torsional pendulum with capacitive readout and electrostatic torquer. Analog Device's MEMS accelerometer has an integrated polysilicon capacitive structure fabricated with on-chip BiMOS process to include a precision voltage reference, local oscillators, amplifiers, demodulators, force rebalance loop and self-test functions.

Although the MEMS angular rate sensors and MEMS accelerometers are available commercially and have achieved micro chip-size and low power consumption, however, there is not yet available high performance, small size, and low power consumption IMUs.

Currently, MEMS exploits the existing microelectronics infrastructure to create complex machines with micron feature sizes. These machines can have many functions, including sensing, communication, and actuation. Extensive applications for these devices exist in a wide variety of commercial systems.

The difficulties for building a micro IMU is the achievement of the following hallmark using existing low cost and low accuracy angular rate sensors and accelerometers:

Low cost,
Micro size
Lightweight
Low power consumption
No wear/extended lifetime
Instant turn-on
Large dynamic range
High sensitivity
High stability
High accuracy To achieve the high degree of performance mentioned above, a number of problems need to be addressed:

(1) Micro-size angular rate sensors and accelerometers need to be obtained. Currently, the best candidate angular rate sensor and accelerometer to meet the micro size are MEMS angular rate sensors and MEMS accelerometers.

(2) Associated mechanical structures need to be designed.

(3) Associated electronic circuitry needs to be designed.

(4) Associated thermal requirements design need to be met to compensate MEMS sensor's thermal effects.

(5) The size and power of the associated electronic circuitry needs shrink.

The micro inertial measurement unit of the present invention is preferred to employ with the angular rate producer, such as MEMS angular rate device array or gyro array, that provides three-axis angular rate measurement signals of a carrier, and the acceleration producer, such as MEMS acceleration device array or accelerometer array, that provides three-axis acceleration measurement signals of the carrier, wherein the motion measurements of the carrier, such as attitude and heading angles, are achieved by means of processing procedures of the three-axis angular rate measurement signals from the angular rate producer and the three-axis acceleration measurement signals from the acceleration producer.

In the present invention, output signals of the angular rate producer and acceleration producer are processed to obtain digital highly accurate angular rate increment and velocity increment measurements of the carrier, and are further processed to obtain highly accurate position, velocity, attitude and heading measurements of the carrier under dynamic environments.

Referring to FIG. 10, the micro inertial measurement unit of the present invention comprises an angular rate producer c5 for producing three-axis (X axis, Y axis and Z axis) angular rate signals; an acceleration producer c10 for producing three-axis (X-axis, Y axis and Z axis) acceleration signals; and an angular increment and velocity increment producer c6 for converting the three-axis angular rate signals into digital angular increments and for converting the input three-axis acceleration signals into digital velocity increments.

Moreover, a position and attitude processor c80 is adapted to further connect with the micro IMU of the present invention to compute position, attitude and heading angle measurements using the three-axis digital angular increments and three-axis velocity increments to provide a user with a rich motion measurement to meet diverse needs.

The position, attitude and heading processor c80 further comprises two optional running modules:

(1) Attitude and Heading Module c81, producing attitude and heading angle only; and (2) Position, Velocity, Attitude, and Heading Module c82, producing position, velocity, and attitude angles.

In general, the angular rate producer c5 and the acceleration producer c10 are very sensitive to a variety of temperature environments. In order to improve measurement accuracy, referring to FIG. 12, the present invention further comprises a thermal controlling means for maintaining a predetermined operating temperature of the angular rate producer c5, the acceleration producer c10 and the angular increment and velocity increment producer c6. It is worth to mention that if the angular rate producer c5, the acceleration producer c10 and the angular increment and velocity increment producer c6 are operated in an environment under prefect and constant thermal control, the thermal controlling means can be omitted.

Figure 12:
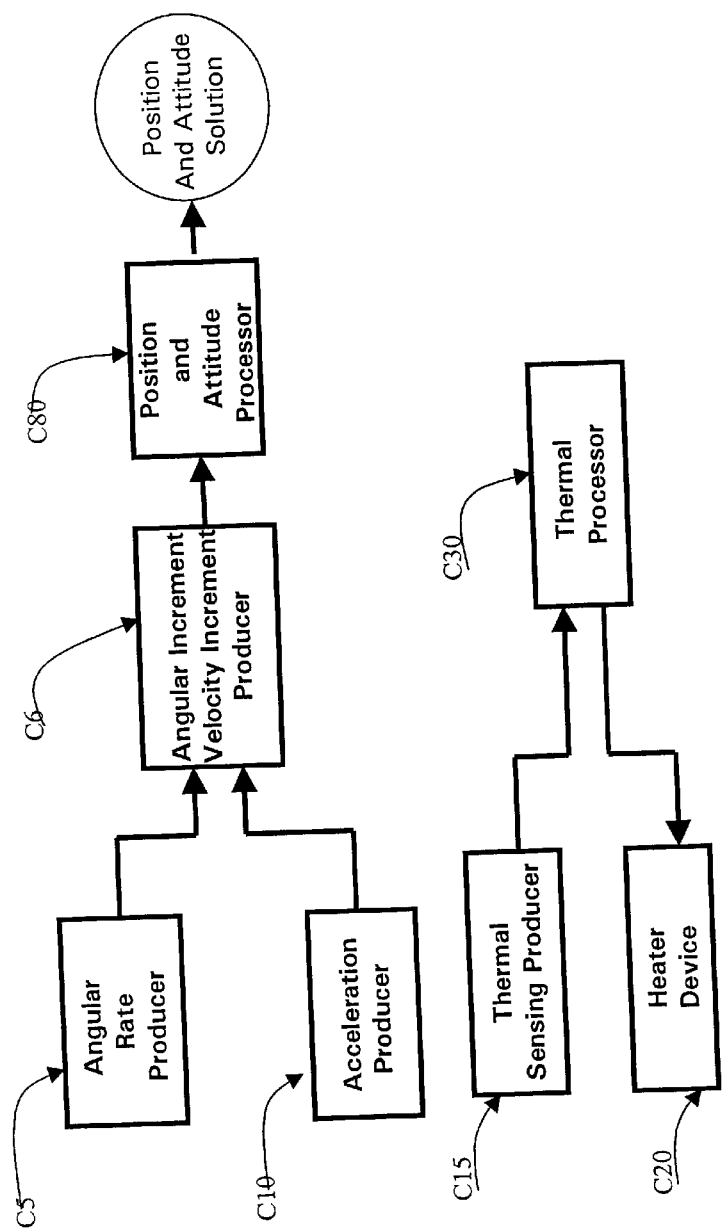
FIG. 12 is a block diagram illustrating the processing modules with thermal control processing for the micro inertial measurement unit according to the above preferred embodiment of the present invention.

According to the preferred embodiment of the present invention, as shown in FIGS. 12, the thermal controlling means comprises a thermal sensing producer device c15, a heater device c20 and a thermal processor c30.

The thermal sensing producer device c15, which produces temperature signals, is processed in parallel with the angular rate producer c5 and the acceleration producer c10 for maintaining a predetermined operating temperature of the angular rate producer c5 and the acceleration producer c10 and angular increment and velocity increment producer c6 of the micro IMU, wherein the predetermined operating temperature is a constant designated temperature selected between 150° F. and 185° F., preferable 176° F. (±0.1° F.).

The temperature signals produced from the thermal sensing producer device c15 are inputted to the thermal processor c30 for computing temperature control commands using the temperature signals, a temperature scale factor, and a predetermined operating temperature of the angular rate producer c5 and the acceleration producer c10, and produce driving signals to the heater device c20 using the temperature control commands for controlling the heater device c20 to provide adequate heat for maintaining the predetermined operating temperature in the micro IMU.

Temperature characteristic parameters of the angular rate producer c5 and the acceleration producer c10 can be determined during a series of the angular rate producer and acceleration producer temperature characteristic calibrations.

Figure 13:
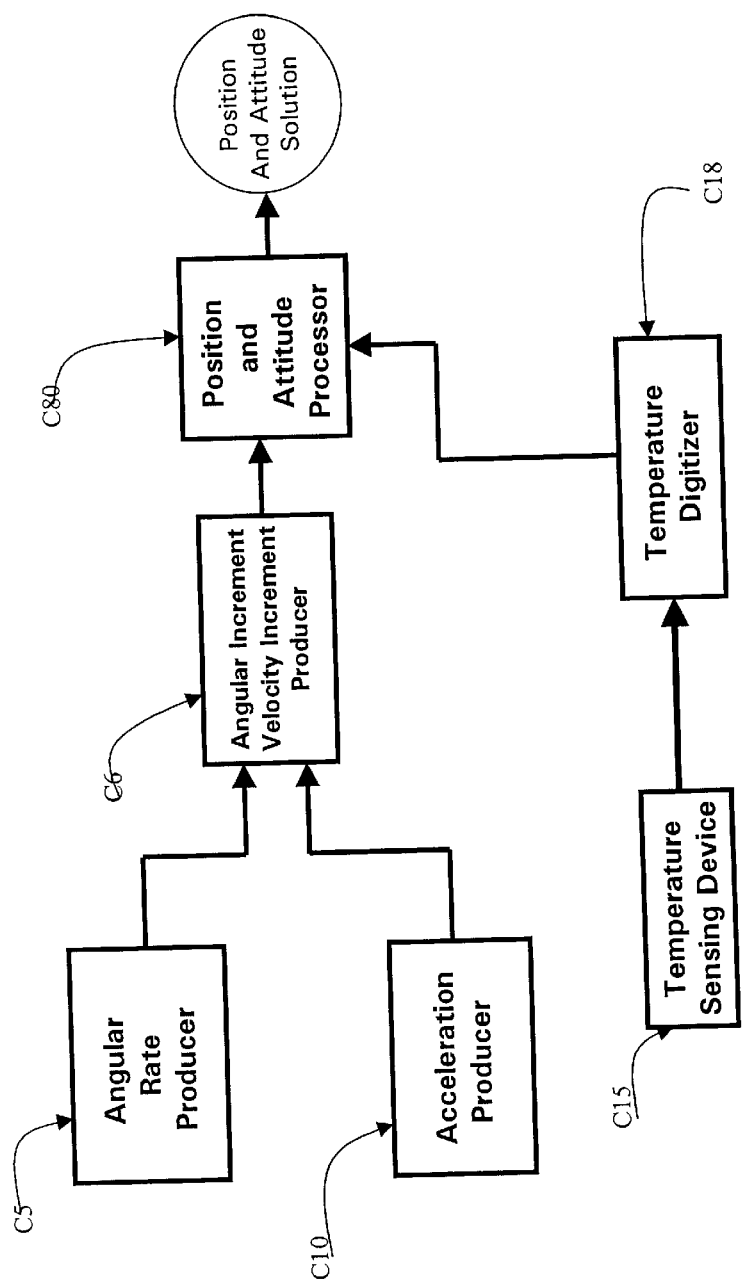
FIG. 13 is a block diagram illustrating the processing modules with thermal compensation processing for the micro inertial measurement unit according to the above preferred embodiment of the present invention.
Figure 22:
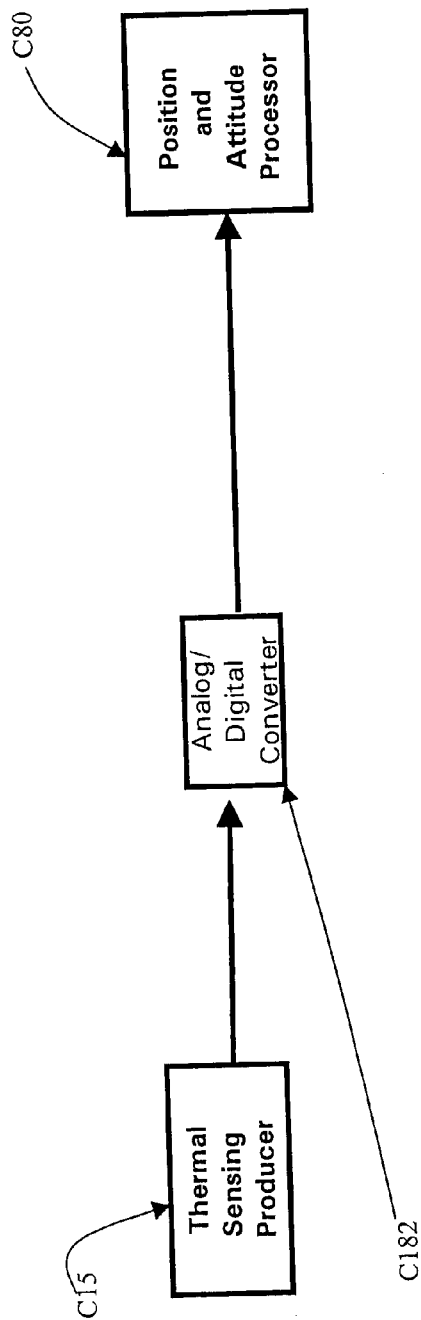
FIG. 22 is a block diagram illustrating a temperature digitizer for outputting analog voltage signals of the thermal sensing producer according to the above preferred embodiment of the present invention.

Referring to FIG. 13, when the above thermal processor c30 and the heater device c20 are not provided, in order to compensate the angular rate producer and acceleration producer measurement errors induced by a variety of temperature environments, the micro IMU of the present invention can alternatively comprise a temperature digitizer c18 for receiving the temperature signals produced from the thermal sensing producer device c15 and outputting a digital temperature value to the position, attitude, and heading processor c80. As shown in FIG. 22, the temperature digitizer c18 can be embodied to comprise an analog/digital converter c182.

Moreover, the position, attitude, and heading processor c80 is adapted for accessing temperature characteristic parameters of the angular rate producer and the acceleration producer using a current temperature of the angular rate producer and the acceleration producer from the temperature digitizer c18, and compensating the errors induced by thermal effects in the input digital angular and velocity increments and computing attitude and heading angle measurements using the three-axis digital angular increments and three-axis velocity increments in the attitude and heading processor c80.

In most applications, the output of the angular rate producer c5 and the acceleration producer c10 are analog voltage signals. The three-axis analog angular rate voltage signals produced from the angular producer c5 are directly proportional to carrier angular rates, and the three-axis analog acceleration voltage signals produced from the acceleration producer c10 are directly proportional to carrier accelerations.

Figure 15:
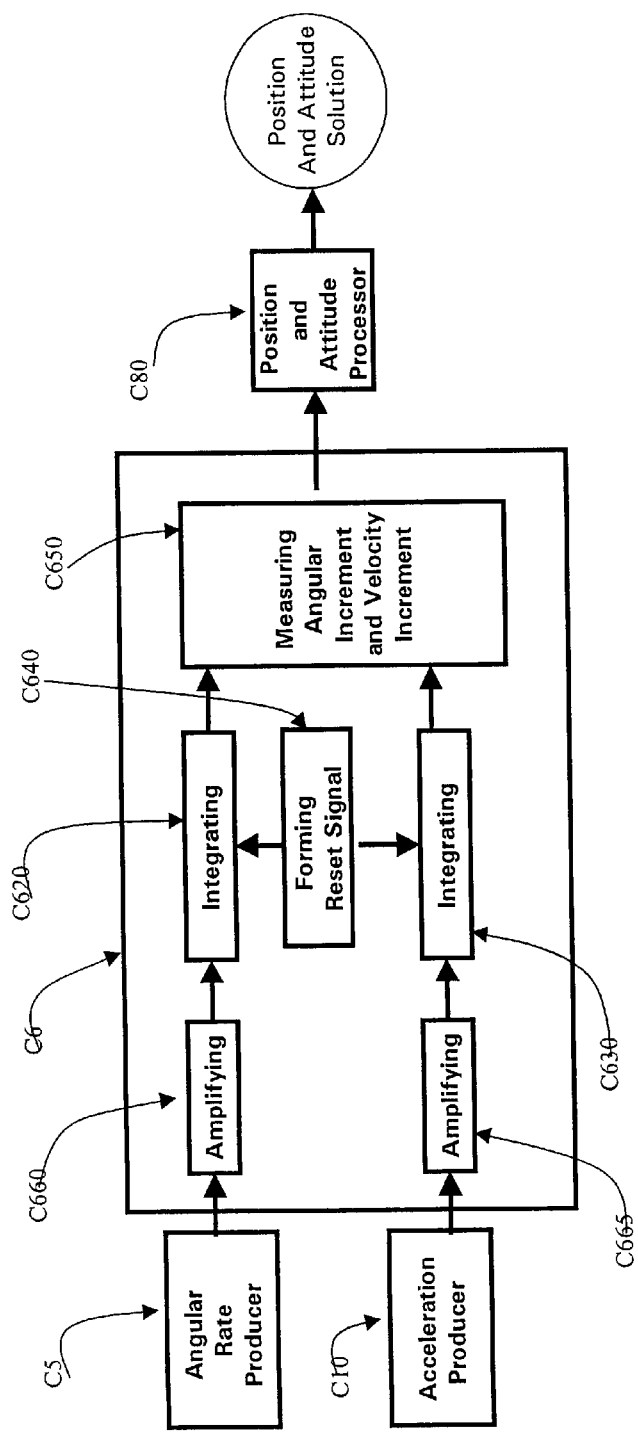
FIG. 15 is a block diagram illustrating another angular increment and velocity increment producer for outputting voltage signals of angular rate producer and acceleration producer for the micro inertial measurement unit according to the above preferred embodiment of the present invention.
Figure 16:
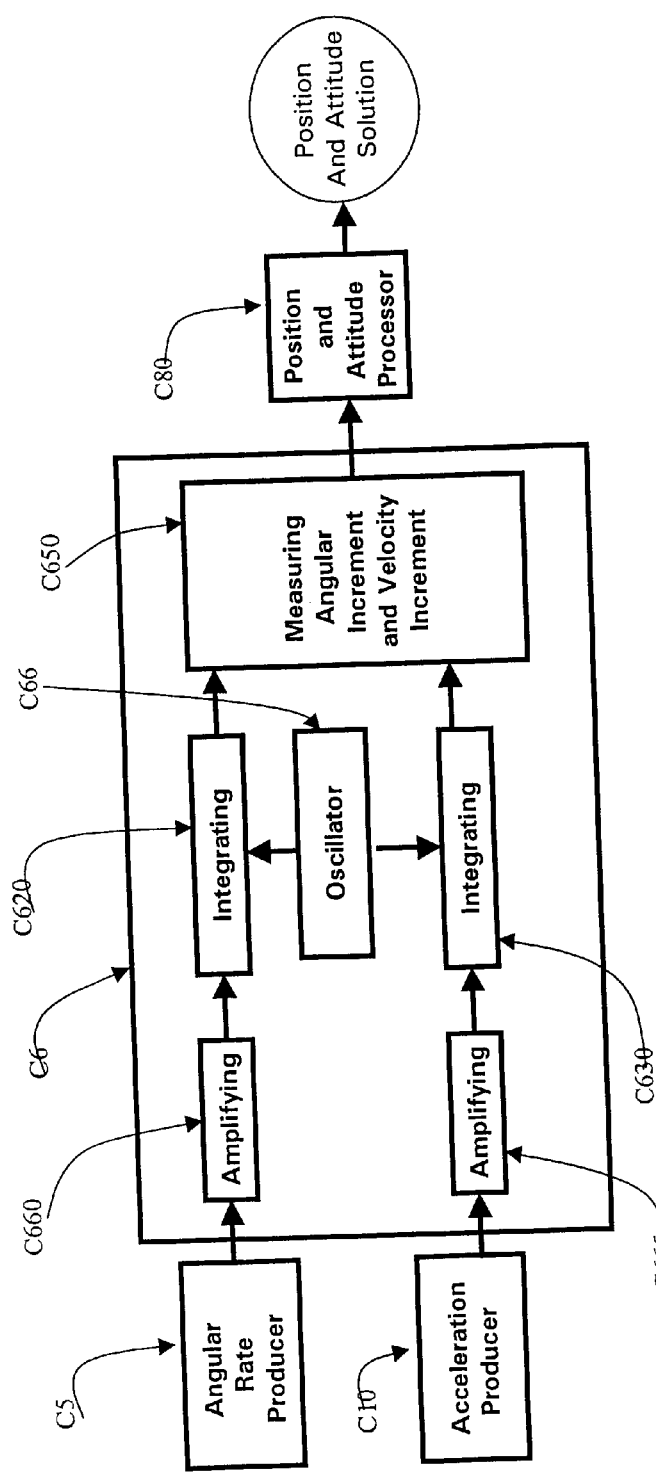
FIG. 16 is a block diagram illustrating another angular increment and velocity increment producer for outputting voltage signals of an angular rate producer and acceleration producer for the micro inertial measurement unit according to the above preferred embodiment of the present invention.

When the outputting analog voltage signals of the angular rate producer c5 and the acceleration producer c10 are too weak for the angular increment and velocity increment producer c6 to read, the angular increment and velocity increment producer c6 may employ amplifying means c660 and c665 for amplifying the analog voltage signals input from the angular rate producer c5 and the acceleration producer c10 and suppress noise signals residing within the analog voltage signals input from the angular rate producer c5 and the acceleration producer c10, as shown in FIGS. 15 and 16.

Figure 14:
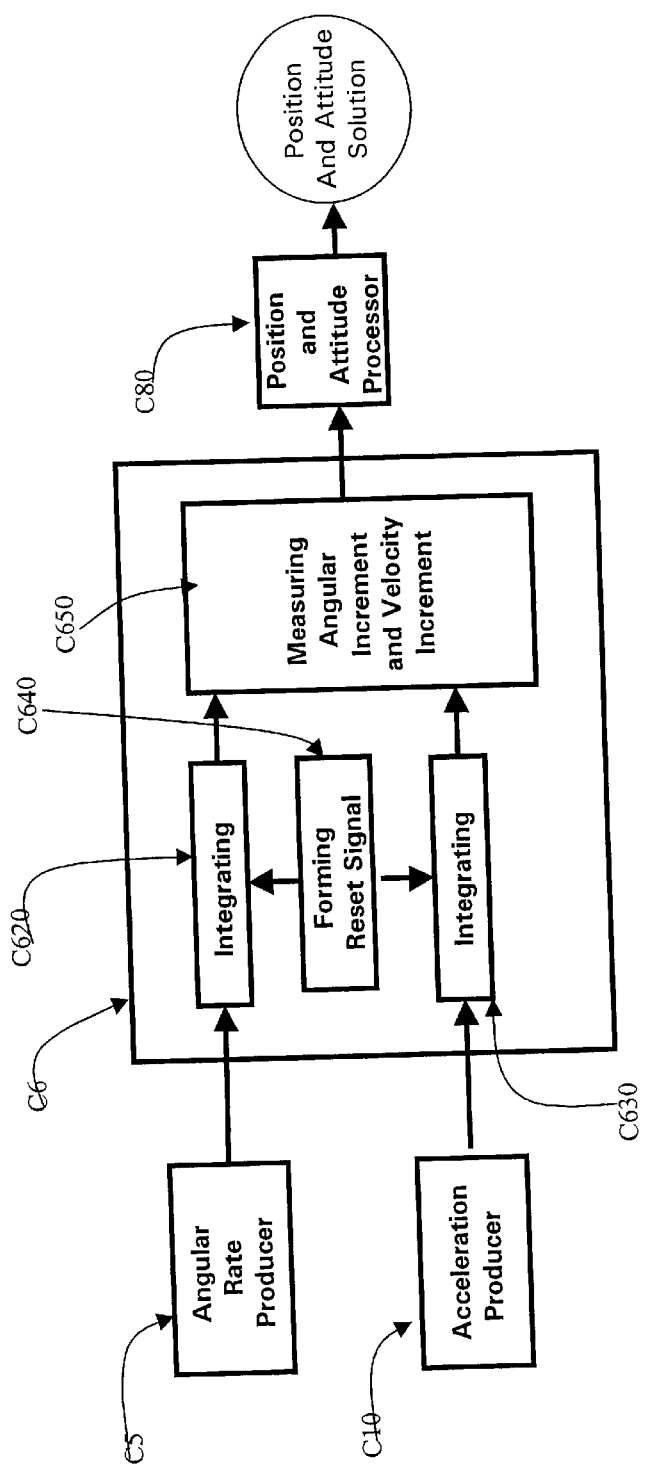
FIG. 14 is a block diagram illustrating an angular increment and velocity increment producer for outputting voltage signals of the angular rate producer and acceleration producer for the micro inertial measurement unit according to the above preferred embodiment of the present invention.

Referring to FIG. 14, the angular increment and velocity increment producer c6 comprises an angular integrating means c620, an acceleration integrating means c630, a resetting means c640, and an angular increment and velocity increment measurement means c650.

The angular integrating means c620 and the acceleration integrating means c630 are adapted for respectively integrating the three-axis analog angular rate voltage signals and the three-axis analog acceleration voltage signals for a predetermined time interval to accumulate the three-axis analog angular rate voltage signals and the three-axis analog acceleration voltage signals as an uncompensated three-axis angular increment and an uncompensated three-axis velocity increment for the predetermined time interval to achieve accumulated angular increments and accumulated velocity increments. The integration is performed to remove noise signals that are non-directly proportional to the carrier angular rate and acceleration within the three-axis analog angular rate voltage signals and the three-axis analog acceleration voltage signals, to improve signal-to-noise ratio, and to remove the high frequency signals in the three-axis analog angular rate voltage signals and the three-axis analog acceleration voltage signals. The signals are directly proportional to the carrier angular rate and acceleration within the three-axis analog angular rate voltage signals and the three-axis analog acceleration voltage signals.

The resetting means forms an angular reset voltage pulse and a velocity reset voltage pulse as an angular scale and a velocity scale which are input into the angular integrating means $c620$ and the acceleration integrating means $c630$ respectively.

The angular increment and velocity increment measurement means $c650$ is adapted for measuring the voltage values of the three-axis accumulated angular increments and the three-axis accumulated velocity increments with the angular reset voltage pulse and the velocity reset voltage pulse respectively to acquire angular increment counts and velocity increment counts as a digital form of the angular increment and velocity increment measurements respectively.

In order to output real three-angular increment and velocity increment values as an optional output format to substitute the voltage values of the three-axis accumulated angular increments and velocity increments, the angular increment and velocity increment measurement means $c650$ also scales the voltage values of the three-axis accumulated angular and velocity increments into real three-axis angular and velocity increment voltage values.

In the angular integrating means $c620$ and the acceleration integrating means $c630$, the three-axis analog angular voltage signals and the three-axis analog acceleration voltage signals are each reset to accumulate from a zero value at an initial point of every predetermined time interval.

As shown in FIG. 16, in general, the resetting means $c640$ can be an oscillator $c66$, so that the angular reset voltage pulse and the velocity reset voltage pulse are implemented by producing a timing pulse by the oscillator $c66$. In applications, the oscillator $c66$ can be built with circuits, such as Application Specific Integrated Circuits (ASIC) chip and a printed circuit board.

Figure 17:
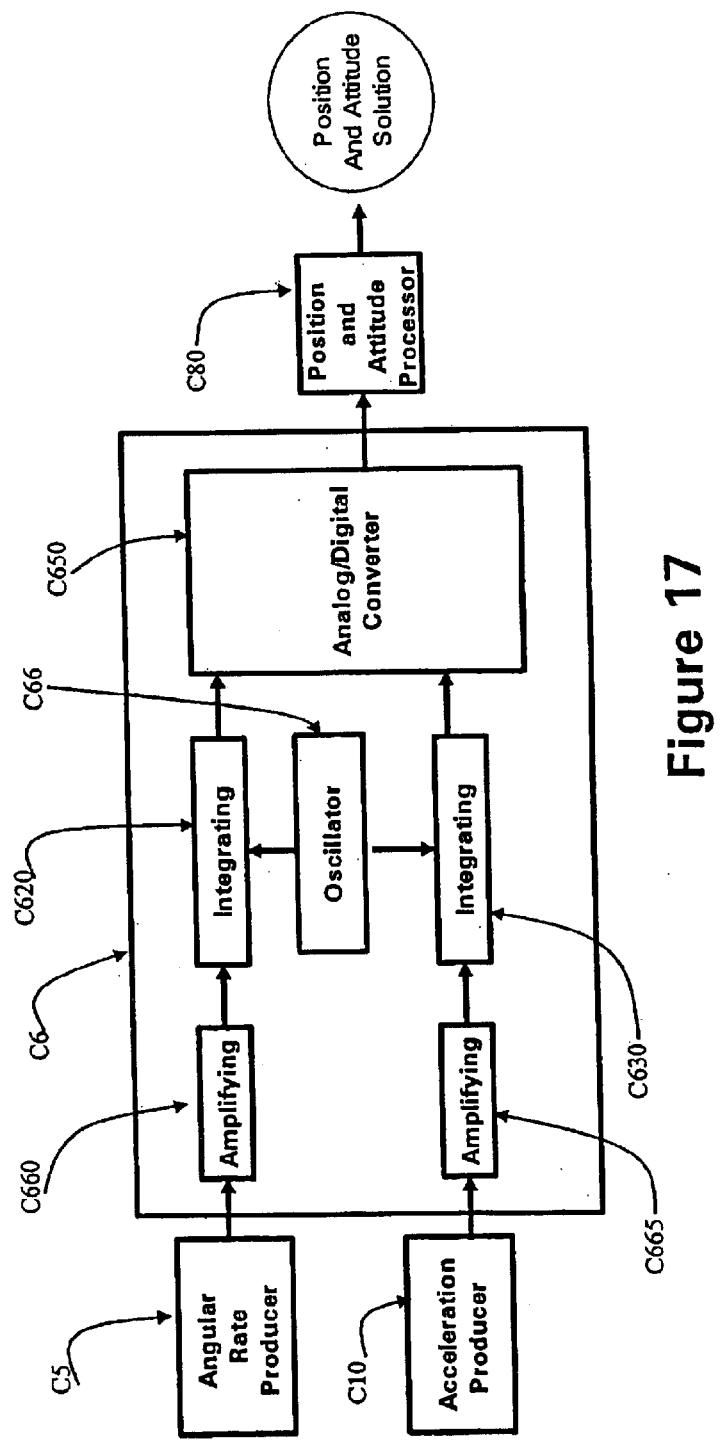
FIG. 17 is a block diagram illustrating another angular increment and velocity increment producer for outputting voltage signals of an angular rate producer and acceleration producer for the micro inertial measurement unit according to the above preferred embodiment of the present invention.

As shown in FIG. 17, the angular increment and velocity increment measurement means $c650$, which is adapted for measuring the voltage values of the three-axis accumulated angular and velocity increments, is an analog/digital converter $c650$ according to the preferred embodiment. In other words, the analog/digital converter $c650$ substantially digitizes the raw three-axis angular increment and velocity increment voltage values into digital three-axis angular increment and velocity increments.

Figure 21:
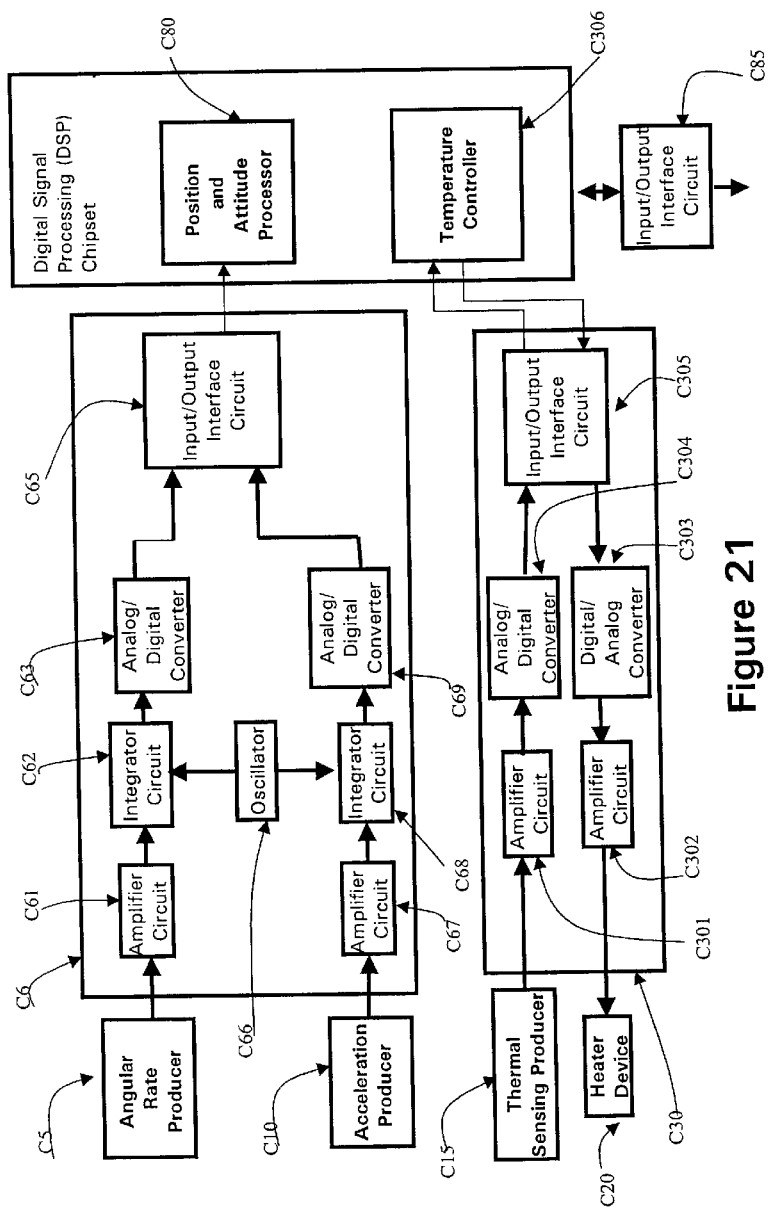
FIG. 21 is a block diagram illustrating a processing module for the micro inertial measurement unit according to the above preferred embodiment of the present invention.

Referring to FIGS. 17 and 21, the amplifying means $c660$ and $c665$ of the angular increment and velocity increment producer $c6$ are embodied by an angular amplifier circuit $c61$ and an acceleration amplifier circuit $c67$ respectively to amplify the three-axis analog angular rate voltage signals and the three-axis analog acceleration voltage signals to form amplified three-axis analog angular rate signals and amplified three-axis analog acceleration signals respectively.

The angular integrating means $c620$ and the acceleration integrating means $c630$ of the angular increment and velocity increment producer $c6$ are respectively embodied as an angular integrator circuit $c62$ and an acceleration integrator circuit $c68$ for receiving the amplified three-axis analog angular rate signals and the amplified three-axis analog acceleration signals from the angular and acceleration amplifier circuits $c61$, $c67$ which are integrated to form the accumulated angular increments and the accumulated velocity increments respectively.

The analog/digital converter $c650$ of the angular increment and velocity increment producer $c6$ further includes an angular analog/digital converter $c63$, a velocity analog/digital converter $c69$ and an input/output interface circuit $c65$.

The accumulated angular increments output from the angular integrator circuit $c62$ and the accumulated velocity increments output from the acceleration integrator circuit are input into the angular analog/digital converter $c63$ and the velocity analog/digital converter $c69$ respectively.

The accumulated angular increments are digitized by the angular analog/digital converter $c63$ by measuring the accumulated angular increments with the angular reset voltage pulse to form digital angular measurements of voltage in terms of the angular increment counts which are output to the input/output interface circuit $c65$ to generate digital three-axis angular increment voltage values.

The accumulated velocity increments are digitized by the velocity analog/digital converter $c69$ by measuring the accumulated velocity increments with the velocity reset voltage pulse to form digital velocity measurements of voltage in terms of the velocity increment counts which are output to the input/output interface circuit $c65$ to generate digital three-axis velocity increment voltage values.

Figure 18:
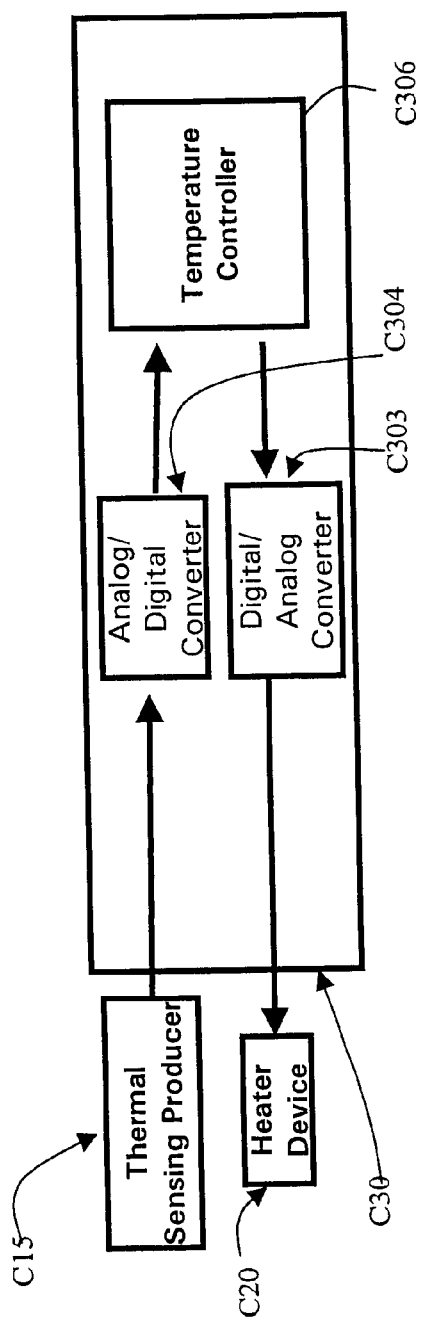
FIG. 18 is a block diagram illustrating a thermal processor for outputting analog voltage signals of the thermal sensing producer according to the above preferred embodiment of the present invention.

Referring to FIGS. 12 and 18, in order to achieve flexible adjustment of the thermal processor $c30$ for the thermal sensing producer device $c15$ with analog voltage output and the heater device $c20$ with analog input, the thermal processor $c30$ can be implemented in a digital feedback controlling loop as shown in FIG. 18.

The thermal processor $c30$, as shown in FIG. 18, comprises an analog/digital converter $c304$ connected to the thermal sensing producer device $c15$, a digital/analog converter $c303$ connected to the heater device $c20$, and a temperature controller $c306$ connected with both the analog/digital converter $c304$ and the digital/analog converter $c303$. The analog/digital converter $c304$ inputs the temperature voltage signals produced by the thermal sensing producer device $c15$, wherein the temperature voltage signals are sampled in the analog/digital converter $c304$ to sampled temperature voltage signals which are further digitized to digital signals and output to the temperature controller $c306$.

The temperature controller $c306$ computes digital temperature commands using the input digital signals from the analog/digital converter $c304$, a temperature sensor scale factor, and a pre-determined operating temperature of the angular rate producer and acceleration producer, wherein the digital temperature commands are fed back to the digital/analog converter $c303$.

The digital/analog converter $c303$ converts the digital temperature commands input from the temperature controller $c306$ into analog signals which are output to the heater device $c20$ to provide adequate heat for maintaining the predetermined operating temperature of the micro IMU of the present invention.

Figure 19:
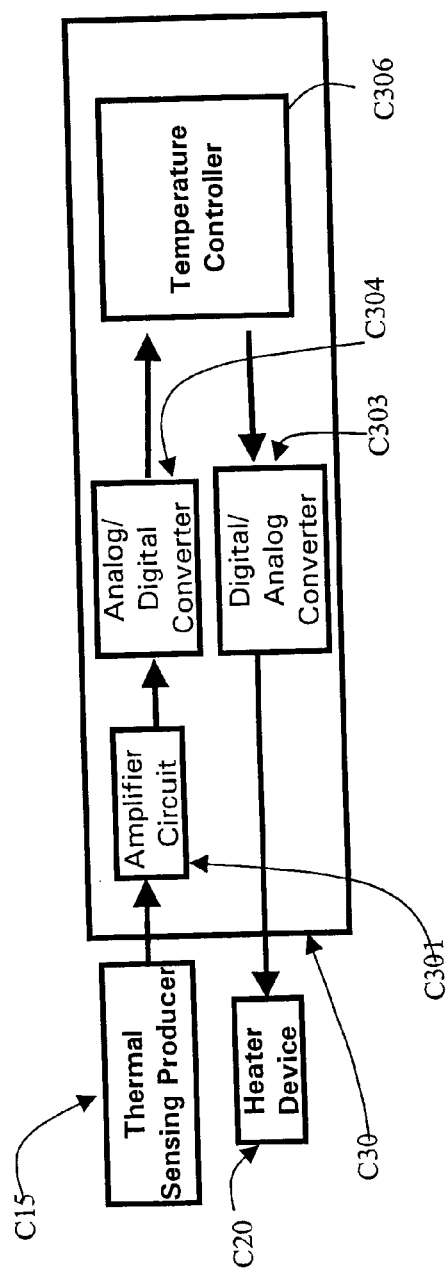
FIG. 19 is a block diagram illustrating another thermal processor for outputting analog voltage signals of the thermal sensing producer according to the above preferred embodiment of the present invention.

Moreover, as shown in FIG. 19, if the voltage signals produced by the thermal sensing producer device $c15$ are too weak for the analog/digital converter c304 to read, the thermal processor c30 further comprises a first amplifier circuit c301 between the thermal sensing producer device c15 and the digital/analog converter c303, wherein the voltage signals from the thermal sensing producer device c15 is first input into the first amplifier circuit c301 for amplifying the signals and suppressing the noise residing in the voltage signals and improving the signal-to-noise ratio, wherein the amplified voltage signals are then output to the analog/digital converter c304.

The heater device c20 requires a specific driving current signal. In this case, referring to FIG. 20, the thermal processor c30 can further comprise a second amplifier circuit 302 between the digital/analog converter c303 and heater device c20 for amplifying the input analog signals from the digital/analog converter c303 for driving the heater device c20.

In other words, the digital temperature commands input from the temperature controller c306 are converted in the digital/analog converter c303 into analog signals which are then output to the amplifier circuit c302.

Referring to FIG. 21, an input/output interface circuit c305 is required to connect the analog/digital converter c304 and digital/analog converter c303 with the temperature controller c306. In this case, as shown in FIG. 21, the voltage signals are sampled in the analog/digital converter c304 to form sampled voltage signals that are digitized into digital signals. The digital signals are output to the input/output interface circuit c305.

As mentioned above, the temperature controller c306 is adapted to compute the digital temperature commands using the input digital temperature voltage signals from the input/output interface circuit c305, the temperature sensor scale factor, and the pre-determined operating temperature of the angular rate producer and acceleration producer, wherein the digital temperature commands are fed back to the input/output interface circuit c305. Moreover, the digital/analog converter c303 further converts the digital temperature commands input from the input/output interface circuit c305 into analog signals which are output to the heater device c20 to provide adequate heat for maintaining the predetermined operating temperature of the micro IMU.

Figure 23:
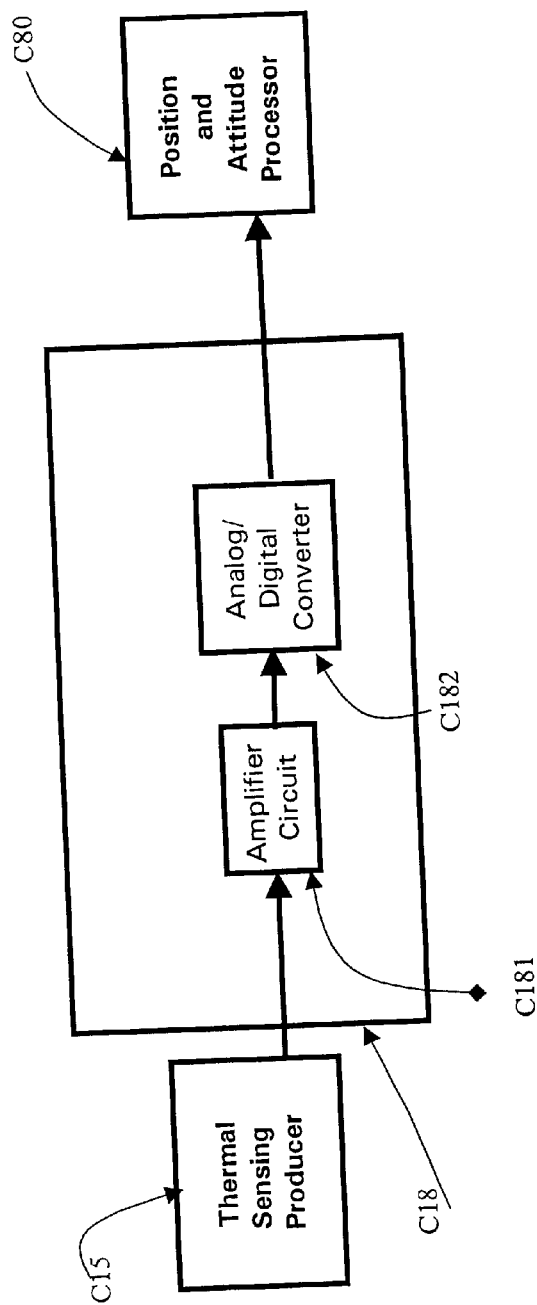
FIG. 23 is a block diagram illustrating a temperature digitizer for outputting analog voltage signals of the thermal sensing producer according to the above preferred embodiment of the present invention.

Referring to FIG. 22, as mentioned above, the thermal processor c30 and the heater device c20 as disclosed in FIGS. 12, 18, 19, 20, and 21 can alternatively be replaced by the analog/digital converter c182 connected to the thermal sensing producer device c15 to receive the analog voltage output from the thermal sensing producer device c15. If the voltage signals produced by the thermal sensing producer device c15 are too weak for the analog/digital converter c182 to read, referring to FIG. 23, an additional amplifier circuit c181 can be connected between the thermal sensing producer device c15 and the digital/analog converter c182 for amplifying the analog voltage signals and suppressing the noise residing in the voltage signals and improving the voltage signal-to-noise ratio, wherein the amplified voltage signals are output to the analog/digital converter c182 and sampled to form sampled voltage signals that are further digitized in the analog/digital converters c182 to form digital signals connected to the attitude and heading processor c80.

Alternatively, an input/output interface circuit c183 can be connected between the analog/digital converter c182 and the attitude and heading processor c80. In this case, referring to FIG. 24, the input amplified voltage signals are sampled to form sampled voltage signals that are further digitized in the analog/digital converters to form digital signals connected to the input/output interface circuit c183 before inputting into the attitude and heading processor c80.

Figure 11:
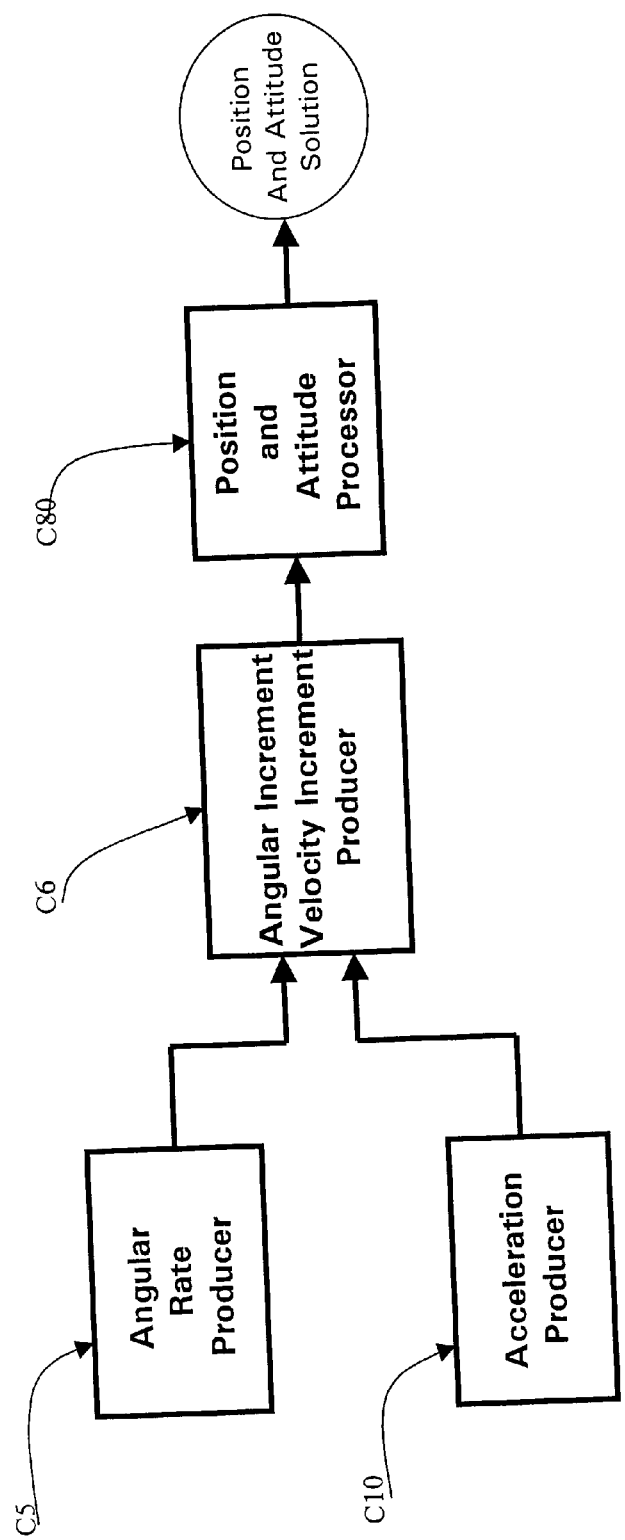
FIG. 11 is a block diagram illustrating the processing module for a micro inertial measurement unit according to a preferred embodiment of the present invention.

Referring to FIG. 11, the digital three-axis angular increment voltage values or real values and three-axis digital velocity increment voltage values or real values are produced and outputted from the angular increment and velocity increment producer c6.

Figure 25:
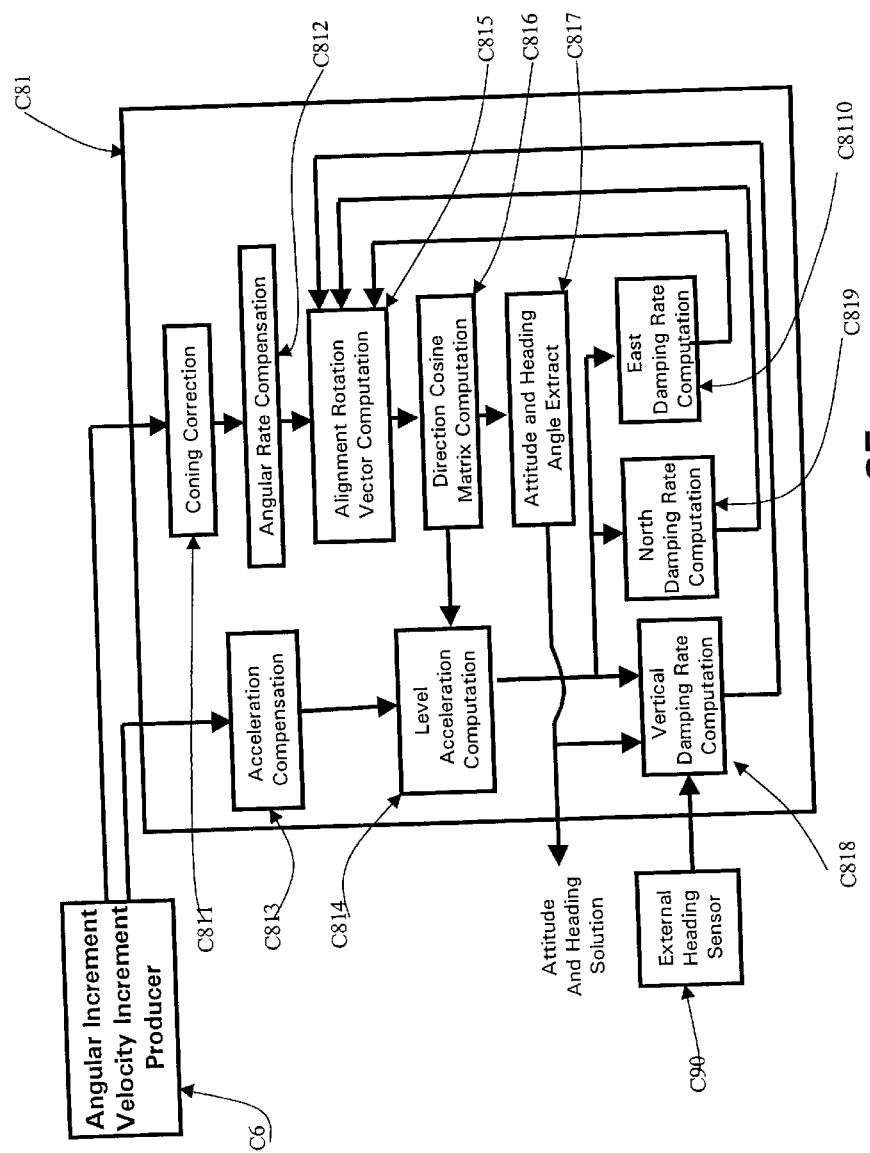
FIG. 25 is a block diagram illustrating the attitude and heading processing module according to the above preferred embodiment of the present invention.

In order to adapt to digital three-axis angular increment voltage value and three-axis digital velocity increment voltage values from the angular increment and velocity increment producer c6, the attitude and heading module c81, as shown in FIG. 25, comprises a coning correction module c811, wherein digital three-axis angular increment voltage values from the input/output interface circuit c65 of the angular increment and velocity increment producer c6 and coarse angular rate bias obtained from an angular rate producer and acceleration producer calibration constants table at a high data rate (short interval) are input into the coning correction module c811, which computes coning effect errors by using the input digital three-axis angular increment voltage values and coarse angular rate bias, and outputs three-axis coning effect terms and three-axis angular increment voltage values at a reduced data rate (long interval), which are called three-axis long-interval angular increment voltage values.

The attitude and heading module c81 further comprises an angular rate compensation module c812 and an alignment rotation vector computation module c815. In the angular rate compensation module c812, the coning effect errors and three-axis long-interval angular increment voltage values from the coning correction module c811 and angular rate device misalignment parameters, fine angular rate bias, angular rate device scale factor, and coning correction scale factor from the angular rate producer and acceleration producer calibration constants table are connected to the angular rate compensation module c812 for compensating definite errors in the three-axis long-interval angular increment voltage values using the coning effect errors, angular rate device misalignment parameters, fine angular rate bias, and coning correction scale factor, and transforming the compensated three-axis long-interval angular increment voltage values to real three-axis long-interval angular increments using the angular rate device scale factor. Moreover, the real three-axis angular increments are output to the alignment rotation vector computation module c815.

The attitude and heading module c81 further comprises an accelerometer compensation module c813 and a level acceleration computation module c814, wherein the three-axis velocity increment voltage values from the angular increment and velocity increment producer c6 and acceleration device misalignment, acceleration device bias, and acceleration device scale factor from the angular rate producer and acceleration producer calibration constants table are connected to the accelerometer compensation module c813 for transforming the three-axis velocity increment voltage values into real three-axis velocity increments using the acceleration device scale factor, and compensating the definite errors in three-axis velocity increments using the acceleration device misalignment, accelerometer bias, wherein the compensated three-axis velocity increments are connected to the level acceleration computation module c814.

By using the compensated three-axis angular increments from the angular rate compensation module c812, an east damping rate increment from an east damping rate computation module c8110, a north damping rate increment from a north damping rate computation module c819, and vertical damping rate increment from a vertical damping rate computation module c818, a quaternion, which is a vector representing rotation angle of the carrier, is updated, and the updated quaternion is connected to a direction cosine matrix computation module c816 for computing the direction cosine matrix, by using the updated quaternion.

The computed direction cosine matrix is connected to the level acceleration computation module c814 and an attitude and heading angle extract module c817 for extracting attitude and heading angle using the direction cosine matrix from the direction cosine matrix computation module c816.

The compensated three-axis velocity increments are connected to the level acceleration computation module c814 for computing level velocity increments using the compensated three-axis velocity increments from the acceleration compensation module c814 and the direction cosine matrix from the direction cosine matrix computation module c816.

The level velocity increments are connected to the east damping rate computation module c8110 for computing east damping rate increments using the north velocity increment of the input level velocity increments from the level acceleration computation module c814.

The level velocity increments are connected to the north damping rate computation module c819 for computing north damping rate increments using the east velocity increment of the level velocity increments from the level acceleration computation module c814.

The heading angle from the attitude and heading angle extract module c817 and a measured heading angle from the external heading sensor c90 are connected to the vertical damping rate computation module c818 for computing vertical damping rate increments.

The east damping rate increments, north damping rate increments, and vertical damping rate are fed back to the alignment rotation vector computation module c815 to damp the drift of errors of the attitude and heading angles.

Alternatively, in order to adapt real digital three-axis angular increment values and real three-axis digital velocity increment values from the angular increment and velocity increment producer c6, referring to FIG. 25, the real digital three-axis angular increment values from the angular increment and velocity increment producer c6 and coarse angular rate bias obtained from an angular rate producer and acceleration producer calibration constants table at a high data rate (short interval) are connected to the coning correction module c811 for computing coning effect errors in the coning correction module c811 using the digital three-axis angular increment values and coarse angular rate bias and outputting three-axis coning effect terms and three-axis angular increment values at reduced data rate (long interval), which are called three-axis long-interval angular increment values, into the angular rate compensation module c812.

The coning effect errors and three-axis long-interval angular increment values from the coning correction module c811 and angular rate device misalignment parameters and fine angular rate bias from the angular rate producer and acceleration producer calibration constants table are connected to the angular rate compensation module c812 for compensating definite errors in the three-axis long-interval angular increment values using the coning effect errors, angular rate device misalignment parameters, fine angular rate bias, and coning correction scale factor, and outputting the real three-axis angular increments to the alignment rotation vector computation module c815.

The three-axis velocity increment values from the angular increment and velocity increment producer c6 and acceleration device misalignment, and acceleration device bias from the angular rate producer and acceleration producer calibration are connected into the accelerometer compensation module c813 for compensating the definite errors in three-axis velocity increments using the acceleration device misalignment, and accelerometer bias; outputting the compensated three-axis velocity increments to the level acceleration computation module c814.

It is identical to the above mentioned processing that the following modules use the compensated three-axis angular increments from the angular rate compensation module c812 and compensated three-axis velocity increments from the acceleration compensation module c813 to produce attitude and heading angle.

Figure 24:
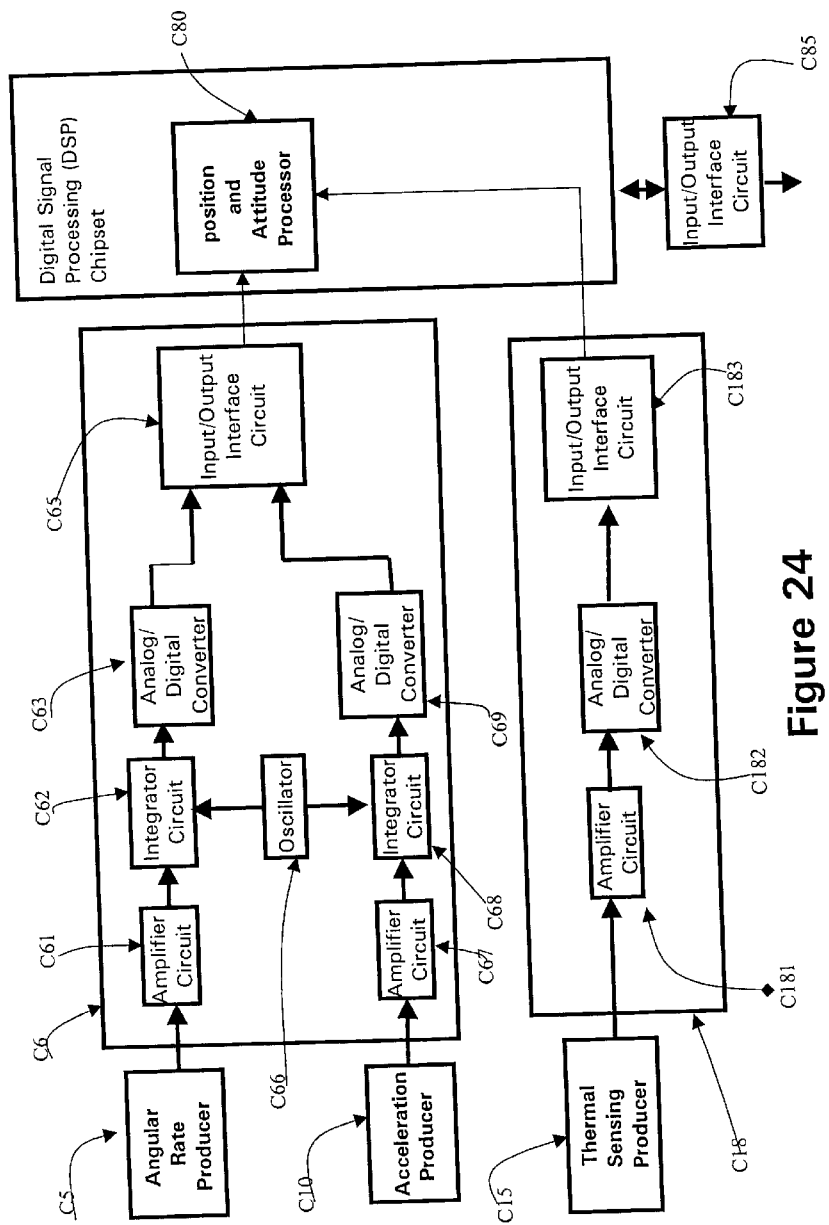
FIG. 24 is a block diagram illustrating a processing module with thermal compensation processing for the micro inertial measurement unit according to the above preferred embodiment of the present invention.

Referring to FIGS. 13, 24, and 25, which use the temperature compensation method by means of the temperature digitizer c18, in order to adapt to digital three-axis angular increment voltage value and three-axis digital velocity increment voltage values from the angular increment and velocity increment producer c6, the digital three-axis angular increment voltage values from the angular increment and velocity increment producer c6 and coarse angular rate bias obtained from an angular rate producer and acceleration producer calibration constants table at a high data rate (short interval) are connected to the coning correction module c811 for computing coning effect errors in the coning correction module c811 using the digital three-axis angular increment voltage values and coarse angular rate bias, and outputting three-axis coning effect terms and three-axis angular increment voltage values at a reduced data rate (long interval), which are called three-axis long-interval angular increment voltage values, into the angular rate compensation module c812.

The coning effect errors and three-axis long-interval angular increment voltage values from the coning correction module c811 and angular rate device misalignment parameters, fine angular rate bias, angular rate device scale factor, coning correction scale factor from the angular rate producer and acceleration producer calibration constants table, the digital temperature signals from input/output interface circuit c183, and temperature sensor scale factor are connected to the angular rate compensation module c812 for computing current temperature of the angular rate producer, accessing angular rate producer temperature characteristic parameters using the current temperature of the angular rate producer, compensating definite errors in the three-axis long-interval angular increment voltage values using the coning effect errors, angular rate device misalignment parameters, fine angular rate bias, and coning correction scale factor, transforming the compensated three-axis long-interval angular increment voltage values to real three-axis long-interval angular increments, compensating temperature-induced errors in the real three-axis long-interval angular increments using the angular rate producer temperature characteristic parameters, and outputting the real three-axis angular increments to the alignment rotation vector computation module c815.

The three-axis velocity increment voltage values from the angular increment and velocity increment producer c6 and acceleration device misalignment, acceleration bias, acceleration device scale factor from the angular rate producer and acceleration producer calibration constants table, the digital temperature signals from the input/output interface circuit c183 of the temperature digitizer c18, and temperature sensor scale factor are connected to the acceleration compensation module c813 for computing current temperature of the acceleration producer, accessing acceleration producer temperature characteristic parameters using the current temperature of the acceleration producer, transforming the three-axis velocity increment voltage values into real three-axis velocity increments using the acceleration device scale factor, compensating the definite errors in the three-axis velocity increments using the acceleration device misalignment and acceleration bias, compensating temperature-induced errors in the real three-axis velocity increments using the acceleration producer temperature characteristic parameters, and outputting the compensated three-axis velocity increments to the level acceleration computation module c814.

It is identical to the above mentioned processing that the following modules use the compensated three-axis angular increments from the angular rate compensation module c812 and compensated three-axis velocity increments from the acceleration compensation module c813 to produce the attitude and heading angles.

Alternatively, referring to FIGS. 13, 24, and 25, which use the temperature compensation method, in order to adapt real digital three-axis angular increment values and real three-axis digital velocity increment values from the angular increment and velocity increment producer c6, the attitude and heading module c81 can be further modified to accept the digital three-axis angular increment values from the angular increment and velocity increment producer c6 and coarse angular rate bias obtained from an angular rate producer and acceleration producer calibration constants table at a high data rate (short interval) into the coning correction module c811 for computing coning effect errors in the coning correction module c811 using the input digital three-axis angular increment values and coarse angular rate bias, and outputting three-axis coning effect data and three-axis angular increment data at a reduced data rate (long interval), which are called three-axis long-interval angular increment values, into the angular rate compensation module c812.

The coning effect errors and three-axis long-interval angular increment values from the coning correction module c811 and angular rate device misalignment parameters and fine angular rate bias from the angular rate producer and acceleration producer calibration constants table, the digital temperature signals from the input/output interface circuit c183 and temperature sensor scale factor are connected to the angular rate compensation module c812 for computing current temperature of the angular rate producer, accessing angular rate producer temperature characteristic parameters using the current temperature of the angular rate producer, compensating definite errors in the three-axis long-interval angular increment values using the coning effect errors, angular rate device misalignment parameters, fine angular rate bias, and coning correction scale factor, compensating temperature-induced errors in the real three-axis long-interval angular increments using the angular rate producer temperature characteristic parameters, and outputting the real three-axis angular increments to an alignment rotation vector computation module c815.

The three-axis velocity increment values from the input/output interface circuit c65 and acceleration device misalignment and acceleration bias from the angular rate producer and acceleration producer calibration constants table, the digital temperature signals from the input/output interface circuit c183 and temperature sensor scale factor are input into the acceleration compensation module c813 for computing current temperature of the acceleration producer, accessing the acceleration producer temperature characteristic parameters using the current temperature of the acceleration producer, compensating the definite errors in the three-axis velocity increments using the input acceleration device misalignment, acceleration bias, compensating temperature-induced errors in the real three-axis velocity increments using the acceleration producer temperature characteristic parameters, and outputting the compensated three-axis velocity increments to the level acceleration computation module c814.

It is identical to the above mentioned processing that the following modules use the compensated three-axis angular increments from the angular rate compensation module c812 and compensated three-axis velocity increments from the acceleration compensation module c813 to produce the attitude and heading angles.

Figure 26:
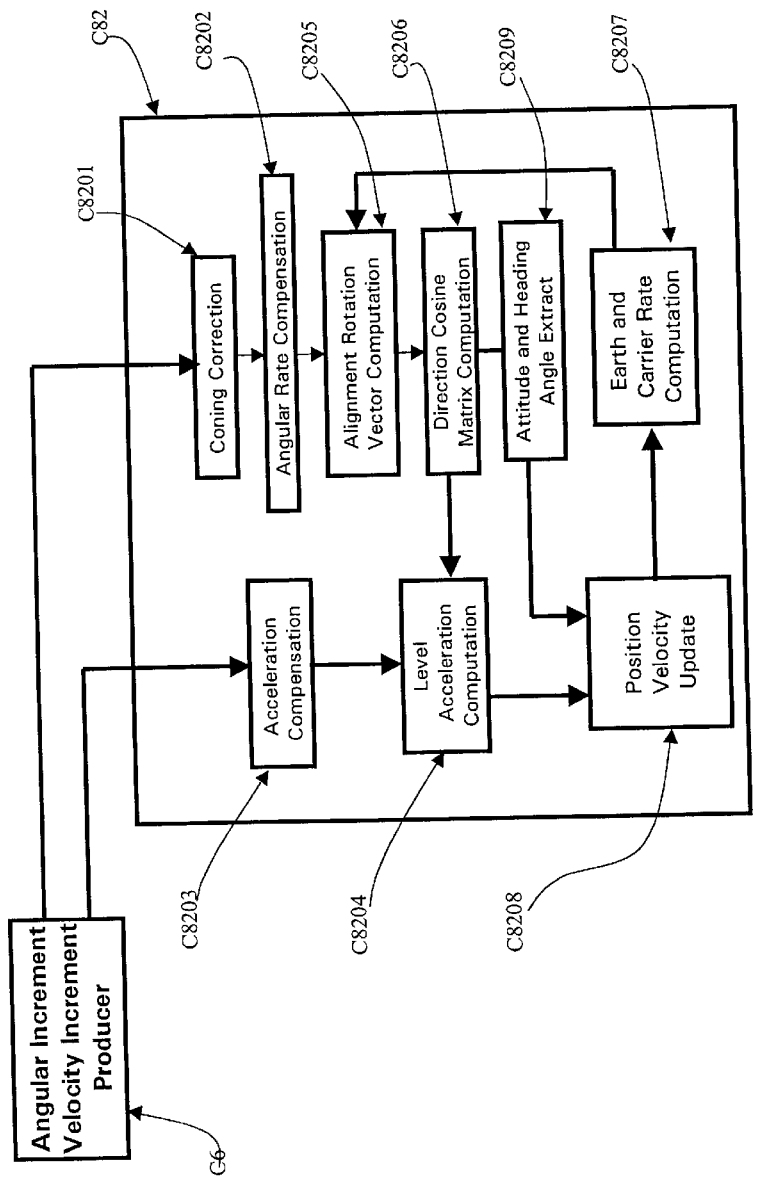
FIG. 26 is a functional block diagram illustrating the position velocity attitude and heading module according to the above preferred embodiment of the present invention.

Referring to FIG. 26, the Position, velocity, and attitude Module c82 comprises:

a coning correction module c8201, which is same as the coning correction module c811 of the attitude and heading module c81;

an angular rate compensation module c8202, which is same as the angular rate compensation module c812 of the attitude and heading module c81;

an alignment rotation vector computation module c8205, which is same as the alignment rotation vector computation module c815 of the attitude and heading module c81;

a direction cosine matrix computation module c8206, which is same as the Direction cosine matrix computation module c816 of the attitude and heading module c81;

an acceleration compensation module c8203, which is same as the acceleration compensation module c813 of the attitude and heading module c81;

a level acceleration computation module c8204, which is same as the acceleration compensation module c814 of the attitude and heading module c81; and an attitude and heading angle extract module c8209, which is same as the attitude and heading angle extract module c817 of the attitude and heading module c81.

A position and velocity update module c8208 accepts the level velocity increments from the level acceleration computation module c8204 and computes position and velocity solution.

An earth and carrier rate computation module c8207 accepts the position and velocity solution from the position and velocity update module c8208 and computes the rotation rate vector of the local navigation frame (n frame) of the carrier relative to the inertial frame (i frame), which is connected to the alignment rotation vector computation module c8205.

In order to meet the diverse requirements of application systems, referring to FIGS. 21 and 24, the digital three-axis angular increment voltage values, the digital three-axis velocity increment, and digital temperature signals in the input/output interface circuit c65 and the input/output interface circuit c305 can be ordered with a specific format required by an external user system, such as RS-232 serial communication standard, RS-422 serial communication standard, the popular PCI/ISA bus standard, and 1553 bus standard, etc.

In order to meet diverse requirements of application systems, referring to FIGS. 11, 21 and 24, the digital three-axis angular increment values, the digital three-axis velocity increment, and attitude and heading data in the input/output interface circuit c85 are ordered with a specific format required by an external user system, such as RS-232 serial communication standard, RS-422 serial communication standard, PCI/ISA bus standard, and 1553 bus standard, etc.

As mentioned above, one of the key technologies of the present invention to achieve the micro IMU with a high degree of performance is to utilize a micro size angular rate producer, wherein the micro-size angular rate producer with MEMS technologies and associated mechanical supporting structure and circuitry board deployment of the micro IMU of the present invention are disclosed in the following description.

Another of the key technologies of the present invention to achieve the micro IMU with low power consumption is to design a micro size circuitry with small power consumption, wherein the conventional AISC (Application Specific Integrated Circuit) technologies can be utilized to shrink a complex circuitry into a silicon chip.

Existing MEMS technologies, which are employed into the micro size angular rate producer, use vibrating inertial elements (a micromachine) to sense vehicle angular rate via the Coriolis Effect. The angular rate sensing principle of Coriolis Effect is the inspiration behind the practical vibrating angular rate sensors.

The Coriolis Effect can be explained by saying that when an angular rate is applied to a translating or vibrating inertial element, a Coriolis force is generated. When this angular rate is applied to the axis of an oscillating inertial element, its tines receive a Coriolis force, which then produces torsional forces about the sensor axis. These forces are proportional to the applied angular rate, which then can be measured.

The force (or acceleration), Coriolis force (or Coriolis acceleration) or Coriolis effect, is originally named from a French physicist and mathematician, Gaspard de Coriolis (1792-1843), who postulated his acceleration in 1835 as a correction for the earth's rotation in ballistic trajectory calculations. The Coriolis acceleration acts on a body that is moving around a point with a fixed angular velocity and moving radially as well.

The basic equation defining Coriolis force is expressed as follows:

$$\vec{F}_{Coriolis} = m\vec{a}_{Coriolis} = 2m(\vec{\omega} \times \vec{V}_{Oscillation})$$

where $\vec{F}_{Coriolis}$ is the detected Coriolis force;
m is the mass of the inertial element;

$\vec{a}_{Coriolis}$ is the generated Coriolis acceleration;

$\vec{\omega}$ is the applied (input) angular rotation rate;

$\vec{V}_{Oscillation}$ is the oscillation velocity in a rotating frame.

The Coriolis force produced is proportional to the product of the mass of the inertial element, the input rotation rate, and the oscillation velocity of the inertial element that is perpendicular to the input rotation rate.

The major problems with micromachined vibrating type angular rate producer are insufficient accuracy, sensitivity, and stability. Unlike MEMS acceleration producers that are passive devices, micromachined vibrating type angular rate producer are active devices. Therefore, associated high performance electronics and control should be invented to effectively use hands-on micromachined vibrating type angular rate producers to achieve high performance angular rate measurements in order to meet the requirement of the micro IMU.

Therefore, in order to obtain angular rate sensing signals from a vibrating type angular rate detecting unit, a dither drive signal or energy must be fed first into the vibrating type angular rate detecting unit to drive and maintain the oscillation of the inertial elements with a constant momentum. The performance of the dither drive signals is critical for the whole performance of a MEMS angular rate producer.

Figure 27:
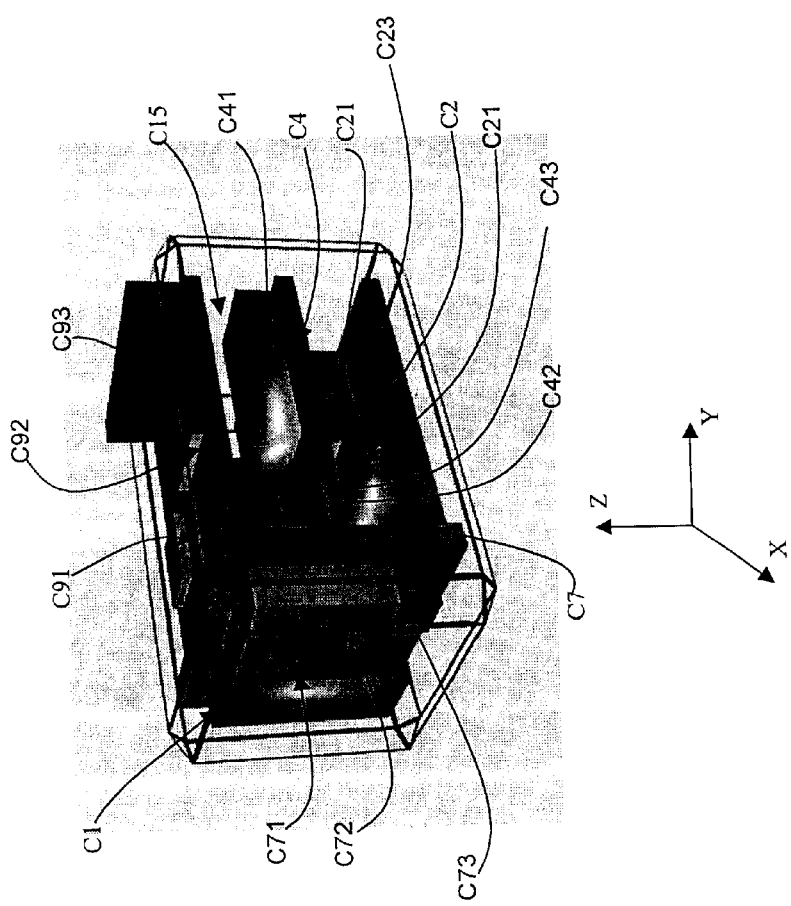
FIG. 27 is a perspective view illustrating the inside mechanical structure and circuit board deployment in the micro IMU according to the above preferred embodiment of the present invention.
Figure 28:
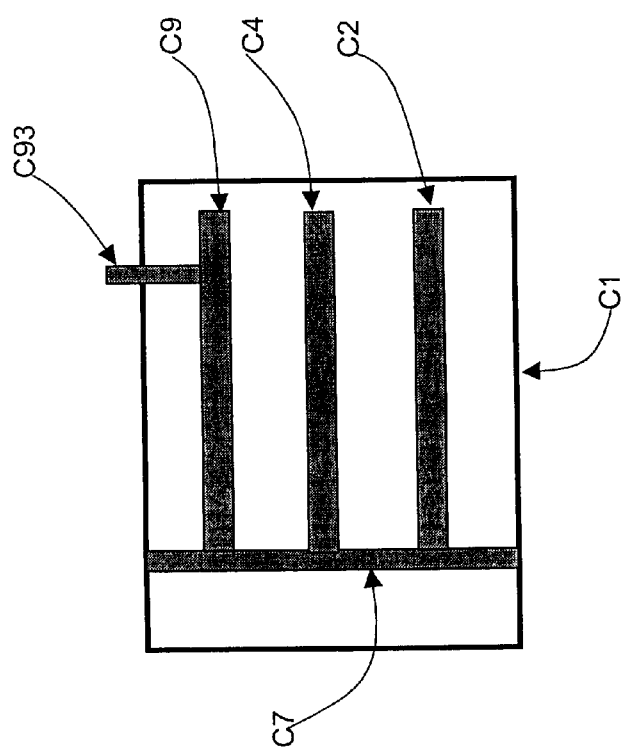
FIG. 28 is a sectional side view of the micro IMU according to the above preferred embodiment of the present invention.

As shown in FIG. 27 and FIG. 28, which are a perspective view and a sectional view of the micro IMU of the present invention as shown in the block diagram of FIG. 11, the micro IMU comprises a first circuit board c2, a second circuit board c4, a third circuit board c7, and a control circuit board c9 arranged inside a metal cubic case c1.

The first circuit board c2 is connected with the third circuit board c7 for producing X axis angular sensing signal and Y axis acceleration sensing signal to the control circuit board c9.

The second circuit board c4 is connected with the third circuit board c7 for producing Y axis angular sensing signal and X axis acceleration sensing signal to the control circuit board c9.

The third circuit board c7 is connected with the control circuit board c9 for producing Z axis angular sensing signal and Z axis acceleration sensing signals to the control circuit board c9.

The control circuit board c9 is connected with the first circuit board c2 and then the second circuit board c4 through the third circuit board c7 for processing the X axis, Y axis and Z axis angular sensing signals and the X axis, Y axis and Z axis acceleration sensing signals from the first, second and control circuit board to produce digital angular increments and velocity increments, position, velocity, and attitude solution.

Figure 29:
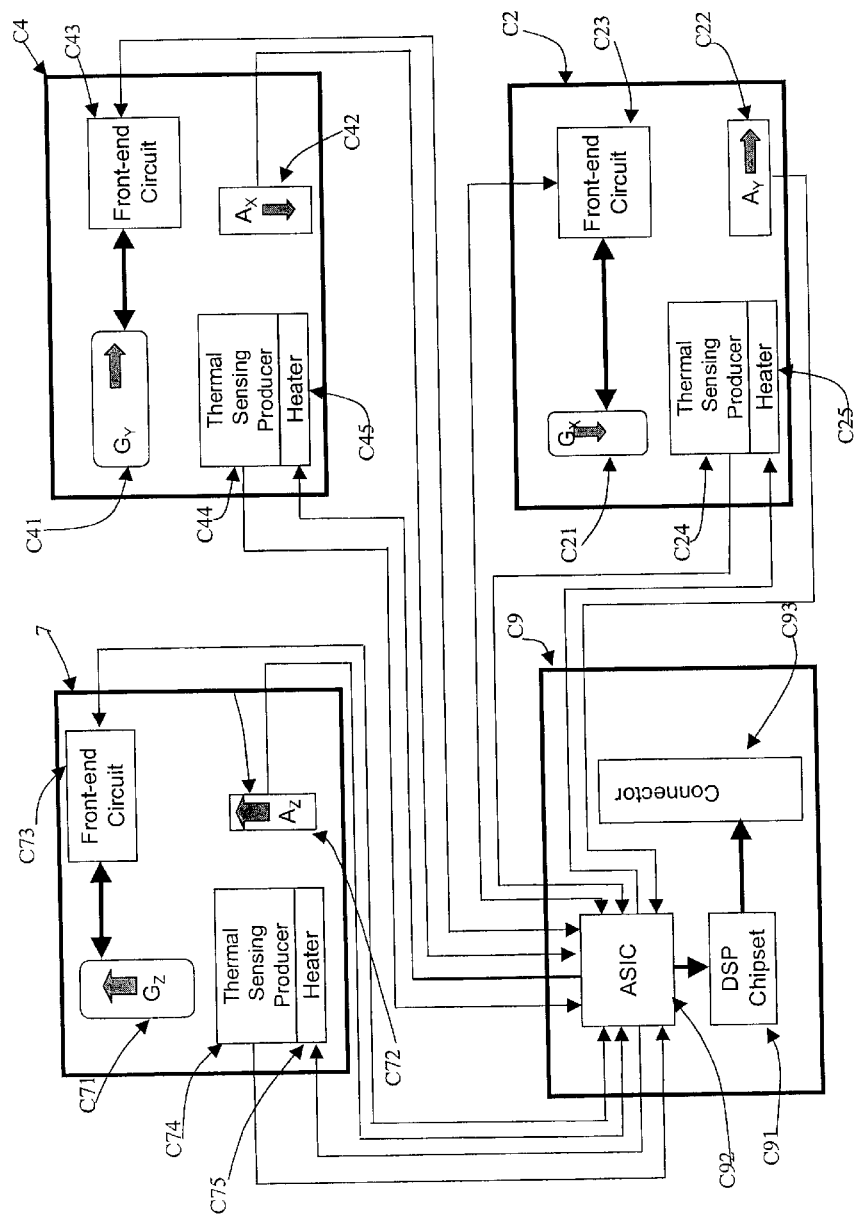
FIG. 29 is a block diagram illustrating the connection among the four circuit boards inside the micro IMU according to the above preferred embodiment of the present invention.
Figure 30:
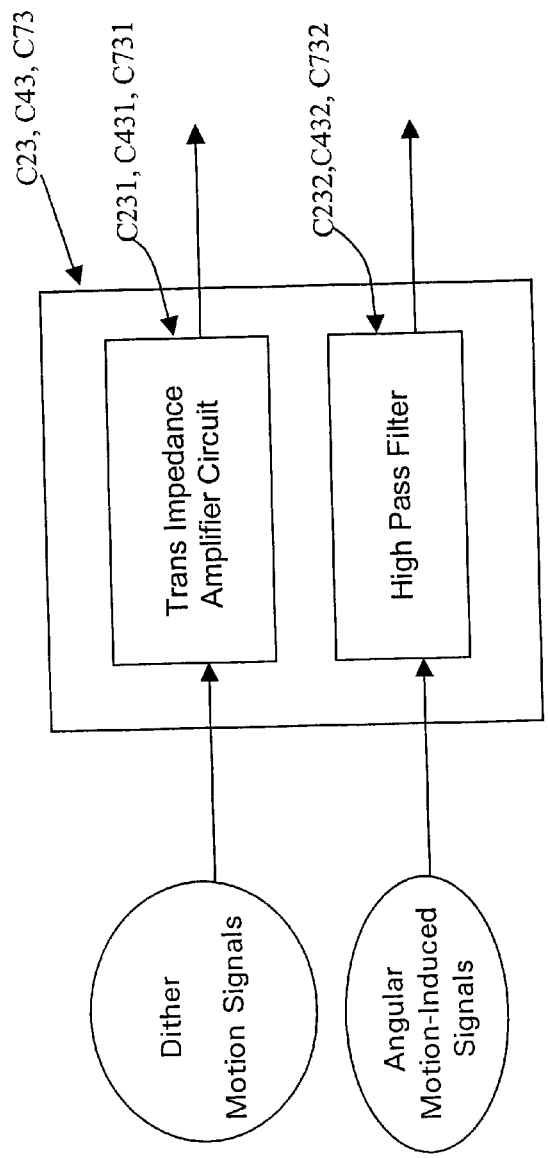
FIG. 30 is a block diagram of the front-end circuit in each of the first, second, and fourth circuit boards of the micro IMU according to the above preferred embodiment of the present invention.
Figure 31:
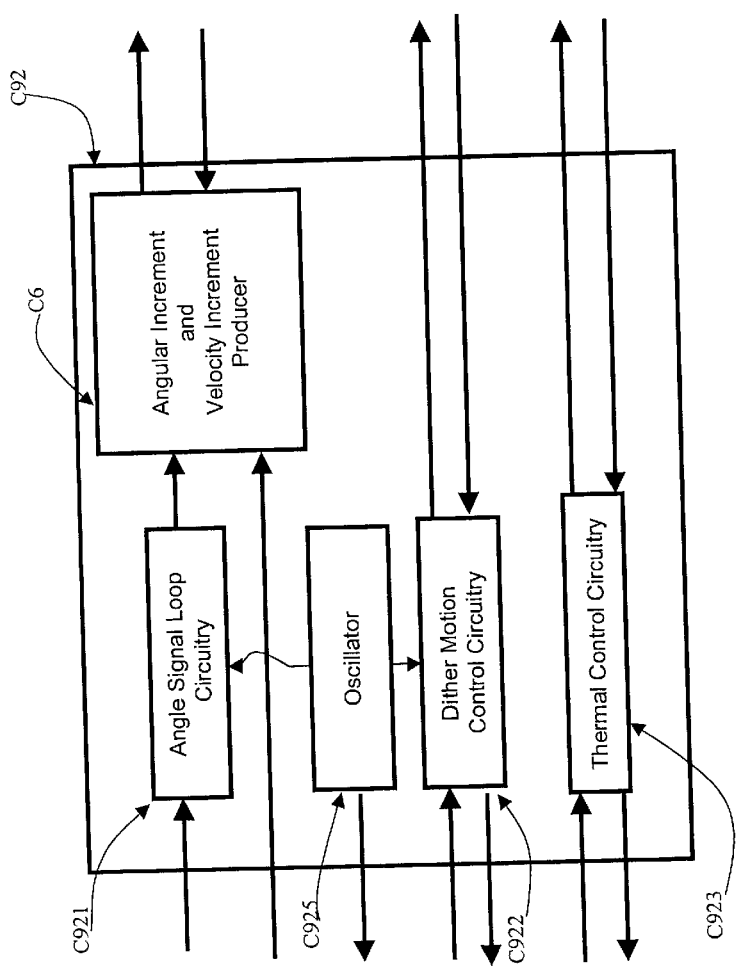
FIG. 31 is a block diagram of the ASIC chip in the third circuit board of the micro IMU according to the above preferred embodiment of the present invention.
Figure 32:
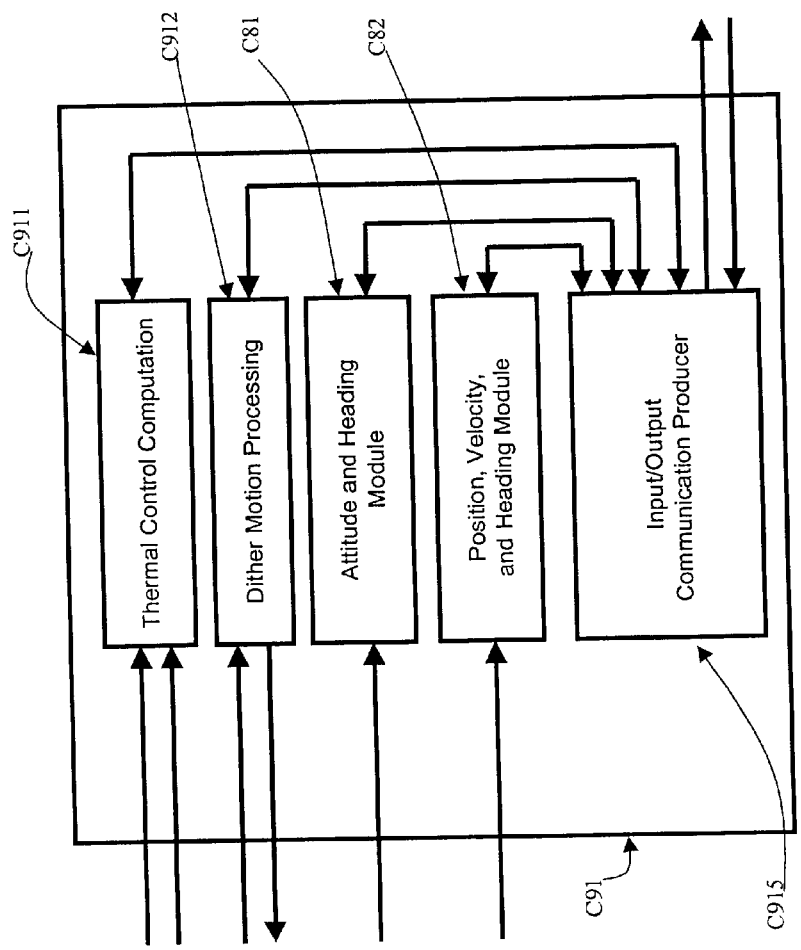
FIG. 32 is a block diagram of processing modules running in the DSP chipset in the third circuit board of the micro IMU according to the above preferred embodiment of the present invention.

As shown in FIG. 29, the angular producer c5 of the preferred embodiment of the present invention comprises:

a X axis vibrating type angular rate detecting unit c21 and a first front-end circuit c23 connected on the first circuit board c2;

a Y axis vibrating type angular rate detecting unit c41 and a second front-end circuit c43 connected on the second circuit board c4;

a Z axis vibrating type angular rate detecting unit c71 and a third front-end circuit c73 connected on the third circuit board c7;

three angular signal loop circuitries c921, which are provided in a ASIC chip c92 connected on the control circuit board c9, for the first, second and third circuit boards c2, c4, c7 respectively;

three dither motion control circuitries c922, which are provided in the ASIC chip c92 connected on the control circuit board c9, for the first, second and third circuit boards c2, c4, c7 respectively;

an oscillator c925 adapted for providing reference pickoff signals for the X axis vibrating type angular rate detecting unit c21, the Y axis vibrating type angular rate detecting unit c41, the Z axis vibrating type angular rate detecting unit c71, the angle signal loop circuitry c921, and the dither motion control circuitry c922; and three dither motion processing modules c912, which run in a DSP (Digital Signal Processor) chipset c91 connected on the control circuit board c9, for the first, second and third circuit boards c2, c4, c7 respectively.

The first, second and third front-end circuits c23, c43, c73, each of which is structurally identical, are used to condition the output signal of the X axis, Y axis and Z axis vibrating type angular rate detecting units c21, c41, c71 respectively and each further comprises:

a trans impedance amplifier circuit c231, c431, c731, which is connected to the respective X axis, Y axis or Z axis vibrating type angular rate detecting unit c21, c41, c71 for changing the output impedance of the dither motion signals from a very high level, greater than 100 million ohms, to a low level, less than 100 ohms to achieve two dither displacement signals, which are A/C voltage signals representing the displacement between the inertial elements and the anchor combs. The two dither displacement signals are output to the dither motion control circuitry c922; and a high-pass filter circuit c232, c432, c732, which is connected with the respective X axis, Y axis or Z axis vibrating type angular rate detecting units c21, c41, c71 for removing residual dither drive signals and noise from the dither displacement differential signal to form a filtered dither displacement differential signal to the angular signal loop circuitry c921.

Each of the X axis, Y axis and Z axis angular rate detecting units c21, c41, and c71 is structurally identical except that sensing axis of each angular rate detecting unit is placed in an orthogonal direction. The X axis angular rate detecting unit c21 is adapted to detect the angular rate of the vehicle along X axis. The Y axis angular rate detecting unit c21 is adapted to detect the angular rate of the vehicle along Y axis. The Z axis angular rate detecting unit c21 is adapted to detect the angular rate of the vehicle along Z axis.

Each of the X axis, Y axis and Z axis angular rate detecting units c21, c41 and c71 is a vibratory device, which comprises at least one set of vibrating inertial elements, including tuning forks, and associated supporting structures and means, including capacitive readout means, and uses Coriolis effects to detect vehicle angular rate.

Each of the X axis, Y axis and Z axis vibrating type angular rate detecting units c21, c41, c71 receives signals as follows:

1) dither drive signals from the respective dither motion control circuitry c922, keeping the inertial elements oscillating; and 2) carrier reference oscillation signals from the oscillator c925, including capacitive pickoff excitation signals.

Each of the X axis, Y axis and Z axis vibrating type angular rate detecting units c21, c41, c71 detects the angular motion in X axis, Y axis and Z axis respectively of a vehicle in accordance with the dynamic theory (Coriolis force), and outputs signals as follows:

1) angular motion-induced signals, including rate displacement signals which may be modulated carrier reference oscillation signals to a trans Impedance amplifier circuit c231, c431, c731 of the first, second, and third front-end circuit c23; and 2) its inertial element dither motion signals, including dither displacement signals, to the high-pass filter c232, c432, c732 of the first, second, and third front-end circuit c23.

The three dither motion control circuitries c922 receive the inertial element dither motion signals from the X axis, Y axis and Z axis vibrating type angular rate detecting units c21, c41, c71 respectively, reference pickoff signals from the oscillator c925, and produce digital inertial element displacement signals with known phase.

Figure 34:
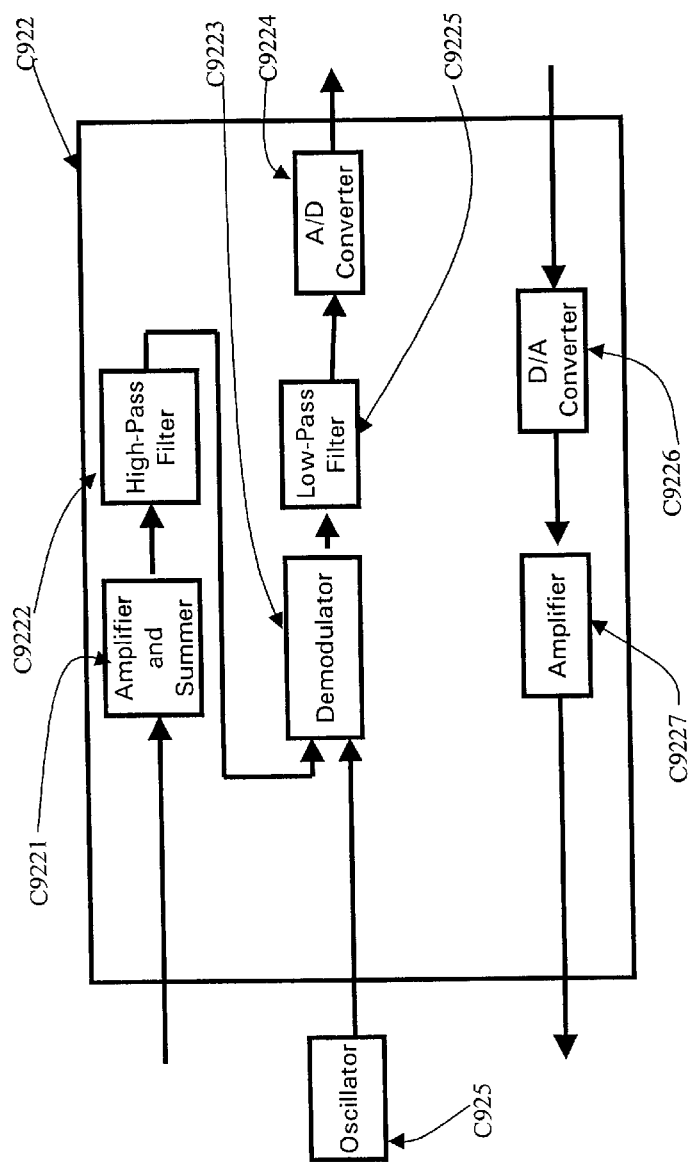
FIG. 34 is block diagram of the dither motion control circuitry of the ASIC chip in the third circuit board of the micro IMU according to the above preferred embodiment of the present invention.

In order to convert the inertial element dither motion signals from the X axis, Y axis and Z axis vibrating type angular rate detecting units c21, c41, c71 to processible inertial element dither motion signals, referring to FIG. 34, each of the dither motion control circuitries c922 comprises:

an amplifier and summer circuit c9221 connected to the trans impedance amplifier circuit c231, c431, c731 of the respective first, second or third front-end circuit c23, c43, c73 for amplifying the two dither displacement signals for more than ten times and enhancing the sensitivity for combining the two dither displacement signals to achieve a dither displacement differential signal by subtracting a center anchor comb signal with a side anchor comb signal;

a high-pass filter circuit c9222 connected to the amplifier and summer circuit c9221 for removing residual dither drive signals and noise from the dither displacement differential signal to form a filtered dither displacement differential signal;

a demodulator circuit c9223 connected to the high-pass filter circuit c2225 for receiving the capacitive pickoff excitation signals as phase reference signals from the oscillator c925 and the filtered dither displacement differential signal from the high-pass filter c9222 and extracting the in-phase portion of the filtered dither displacement differential signal to produce an inertial element displacement signal with known phase;

a low-pass filter c9225 connected to the demodulator circuit c9223 for removing high frequency noise from the inertial element displacement signal input thereto to form a low frequency inertial element displacement signal;

an analog/digital converter c9224 connected to the low-pass filter c9225 for converting the low frequency inertial element displacement analog signal to produce a digitized low frequency inertial element displacement signal to the dither motion processing module c912 (disclosed in the following text) running the DSP chipset c91;

a digital/analog converter c9226 processing the selected amplitude from the dither motion processing module c912 to form a dither drive signal with the correct amplitude; and an amplifier c9227 which generates and amplifies the dither drive signal to the respective X axis, Y axis or Z axis vibrating type angular rate detecting unit c21, c41, c71 based on the dither drive signal with the selected frequency and correct amplitude.

The oscillation of the inertial elements residing inside each of the X axis, Y axis and Z axis vibrating type angular rate detecting units c21, c41, c71 is generally driven by a high frequency sinusoidal signal with precise amplitude. It is critical to provide the X axis, Y axis and Z axis vibrating type angular rate detecting units c21, c41, c71 with high performance dither drive signals to achieve keen sensitivity and stability of X-axis, Y-axis and Z axis angular rate measurements.

The dither motion processing module c912 receives digital inertial element displacement signals with known phase from the analog/digital converter c9224 of the dither motion control circuitry c922 for:

(1) finding the frequencies which have the highest Quality Factor (Q) Values,
(2) locking the frequency, and
(3) locking the amplitude to produce a dither drive signal, including high frequency sinusoidal signals with a precise amplitude, to the respective X axis, Y axis or Z axis vibrating type angular rate detecting unit c21, c41, c71 to keep the inertial elements oscillating at the pre-determined resonant frequency.

The three dither motion processing modules c912 is to search and lock the vibrating frequency and amplitude of the inertial elements of the respective X axis, Y axis or Z axis vibrating type angular rate detecting unit c21, c41, c71. Therefore, the digitized low frequency inertial element displacement signal is first represented in terms of its spectral content by using discrete Fast Fourier Transform (FFT).

Discrete Fast Fourier Transform (FFT) is an efficient algorithm for computing discrete Fourier transform (DFT), which dramatically reduces the computation load imposed by the DFT. The DFT is used to approximate the Fourier transform of a discrete signal. The Fourier transform, or spectrum, of a continuous signal is defined as:

$$X(j\omega) = \int_{-\infty}^{\infty} x(t)e^{-j\omega t} dt$$

The DFT of N samples of a discrete signals X(nT) is given by:

$$X_s(k\omega) = \sum_{n=0}^{N-1} x(nT)e^{-j\omega Tnk}$$

where $\omega = 2\pi/NT$, T is the inter-sample time interval. The basic property of FFT is its ability to distinguish waves of different frequencies that have been additively combined.

After the digitized low frequency inertial element displacement signals are represented in terms of their spectral content by using discrete Fast Fourier Transform (FFT), Q (Quality Factor) Analysis is applied to their spectral content to determine the frequency with global maximal Q value. The vibration of the inertial elements of the respective X axis, Y axis or Z axis vibrating type angular rate detecting unit c21, c41, c71 at the frequency with global maximal Q value can result in minimal power consumption and cancel many of the terms that affect the excited mode. The Q value is a function of basic geometry, material properties, and ambient operating conditions.

A phase-locked loop and digital/analog converter is further used to control and stabilize the selected frequency and amplitude.

Figure 36:
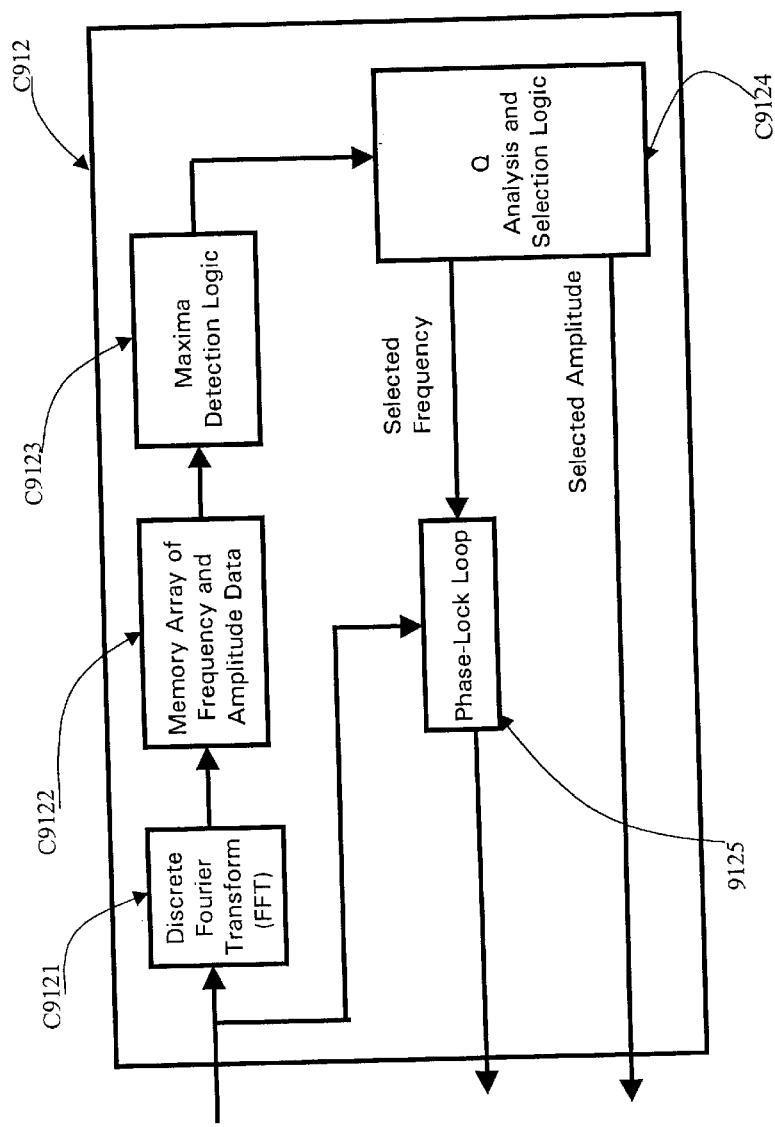
FIG. 36 is a block diagram of the dither motion processing module running in the DSP chipset of the third circuit board of the micro IMU according to the above preferred embodiment of the present invention.

Referring to FIG. 36, the dither motion processing module c912 further includes a discrete Fast Fourier Transform (FFT) module c9121, a memory array of frequency and amplitude data module c9122, a maxima detection logic module c9123, and a Q analysis and selection logic module c9124 to find the frequencies which have the highest Quality Factor (Q) Values.

The discrete Fast Fourier Transform (FFT) module c9121 is arranged for transforming the digitized low frequency inertial element displacement signal from the analog/digital converter c9224 of the dither motion control circuitry c922 to form amplitude data with the frequency spectrum of the input inertial element displacement signal.

The memory array of frequency and amplitude data module c9122 receives the amplitude data with frequency spectrum to form an array of amplitude data with frequency spectrum.

The maxima detection logic module c9123 is adapted for partitioning the frequency spectrum from the array of the amplitude data with frequency into plural spectrum segments, and choosing those frequencies with the largest amplitudes in the local segments of the frequency spectrum.

The Q analysis and selection logic module c9124 is adapted for performing Q analysis on the chosen frequencies to select frequency and amplitude by computing the ratio of amplitude/bandwidth, wherein the range for computing bandwidth is between +−½ of the peek for each maximum frequency point.

Moreover, the dither motion processing module c912 further includes a phase-lock loop c9125 to reject noise of the selected frequency to form a dither drive signal with the selected frequency, which serves as a very narrow bandpass filter, locking the frequency.

Figure 33:
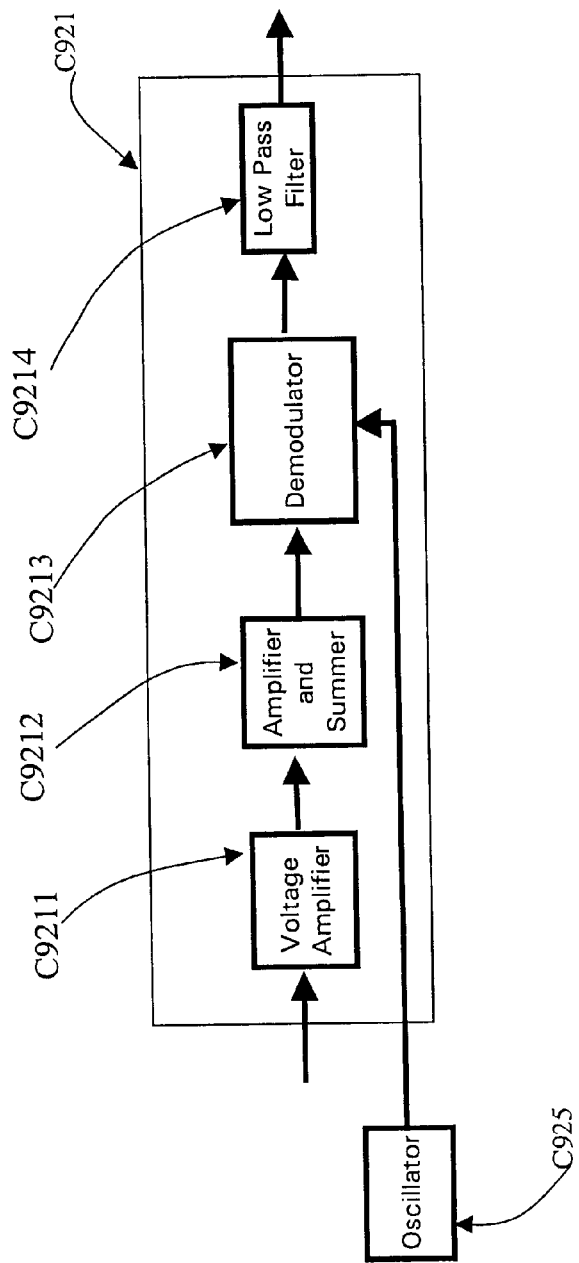
FIG. 33 is a block diagram of the angle signal loop circuitry of the ASIC chip in the third circuit board of the micro IMU according to the above preferred embodiment of the present invention.

The three angle signal loop circuitries c921 receive the angular motion-induced signals from the X axis, Y axis and Z axis vibrating type angular rate detecting units c21, c41, c71 respectively, reference pickoff signals from the oscillator c925, and transform the angular motion-induced signals into angular rate signals. Referring to FIG. 33, each of the angle signal loop circuitries c921 for the respective first, second or third circuit board c2, c4, c7 comprises:

a voltage amplifier circuit c9211, which amplifies the filtered angular motion-induced signals from the high-pass filter circuit c232 of the respective first, second or third front-end circuit c23, c43, c73 to an extent of at least 100 milivolts to form amplified angular motion-induced signals;

an amplifier and summer circuit c9212, which subtracts the difference between the angle rates of the amplified angular motion-induced signals to produce a differential angle rate signal;

a demodulator c9213, which is connected to the amplifier and summer circuit c9212, extracting the amplitude of the in-phase differential angle rate signal from the differential angle rate signal and the capacitive pickoff excitation signals from the oscillator c925;

a low-pass filter c9214, which is connected to the demodulator c9213, removing the high frequency noise of the amplitude signal of the in-phase differential angle rate signal to form the angular rate signal output to the angular increment and velocity increment producer c6.

Referring to FIGS. 27 to 29, the acceleration producer c10 of the preferred embodiment of the present invention comprises:

a X axis accelerometer c42, which is provided on the second circuit board c4 and connected with the angular increment and velocity increment producer 6 provided in the AISC chip c92 of the control circuit board c9;

a Y axis accelerometer c22, which is provided on the first circuit board c2 and connected with angular increment and velocity increment producer c6 provided in the AISC chip c92 of the control circuit board c9; and a Z axis accelerometer c72, which is provided on the third circuit board 7 and connected with angular increment and velocity increment producer 6 provided in the AISC chip c92 of the control circuit board c9.

Referring to FIGS. 12, 28 and FIG. 29, thermal sensing producer device c15 of the preferred embodiment of the present invention further comprises:

a first thermal sensing producing unit c24 for sensing the temperature of the X axis angular rate detecting unit c21 and the Y axis accelerometer c22;

a second thermal sensing producer c44 for sensing the temperature of the Y axis angular rate detecting unit c41 and the X axis accelerometer c42; and a third thermal sensing producer c74 for sensing the temperature of the Z axis angular rate detecting unit c71 and the Z axis accelerometer c72.

Referring to FIGS. 12 and 29, the heater device c20 of the preferred embodiment of the present invention further comprises:

a first heater c25, which is connected to the X axis angular rate detecting unit c21, the Y axis accelerometer c22, and the first front-end circuit c23, for maintaining the predetermined operational temperature of the X axis angular rate detecting unit c21, the Y axis accelerometer c22, and the first front-end circuit c23;

a second heater c45, which is connected to the Y axis angular rate detecting unit c41, the X axis accelerometer c42, and the second front-end circuit c43, for maintaining the predetermined operational temperature of the X axis angular rate detecting unit c41, the X axis accelerometer c42, and the second front-end circuit c43; and a third heater c75, which is connected to the Z axis angular rate detecting unit c71, the Z axis accelerometer c72, and the third front-end circuit c73, for maintaining the predetermined operational temperature of the Z axis angular rate detecting unit c71, the Z axis accelerometer c72, and the third front-end circuit c73.

Referred to FIGS. 12, 28, 29, 31, and 35, the thermal processor c30 of the preferred embodiment of the present invention further comprises three identical thermal control circuitries c923 and the thermal control computation modules c911 running the DSP chipset c91.

Figure 35:
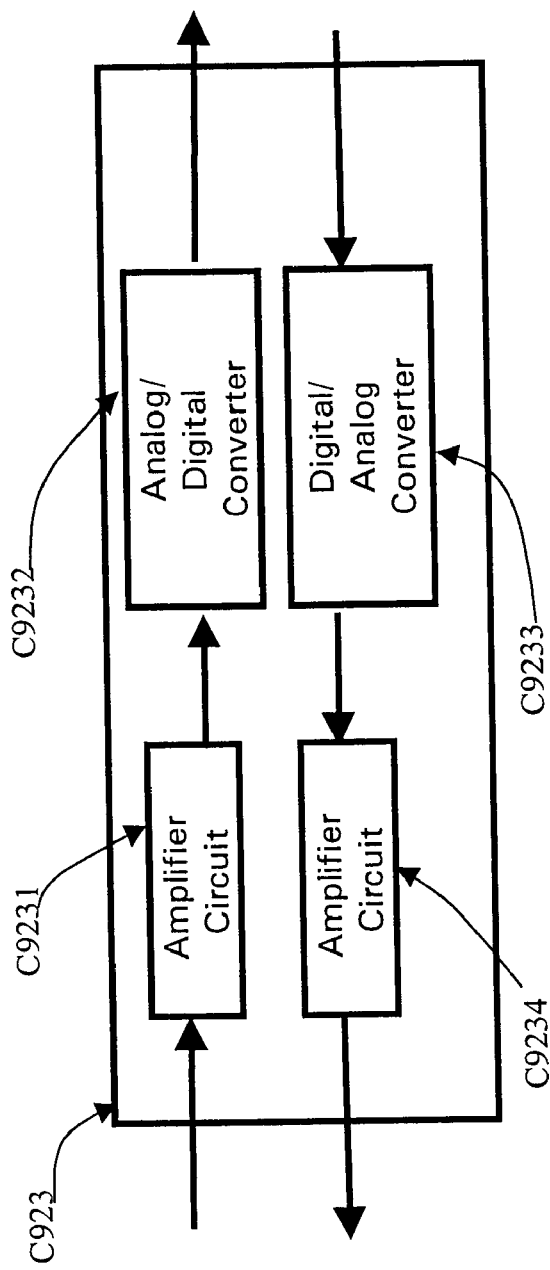
FIG. 35 is a block diagram of the thermal control circuit of the ASIC chip in the third circuit board of the micro IMU according to the above preferred embodiment of the present invention.

As shown in FIGS. 29 and 35, each of the thermal control circuitries c923 further comprises:

a first amplifier circuit c9231, which is connected with the respective X axis, Y axis or Z axis thermal sensing producer c24, c44, c74, for amplifying the signals and suppressing the noise residing in the temperature voltage signals from the respective X axis, Y axis or Z axis thermal sensing producer c24, c44, c74 and improving the signal-to-noise ratio;

an analog/digital converter c9232, which is connected with the amplifier circuit c9231, for sampling the temperature voltage signals and digitizing the sampled temperature voltage signals to digital signals, which are output to the thermal control computation module c911;

a digital/analog converter c9233 which converts the digital temperature commands input from the thermal control computation module c911 into analog signals; and a second amplifier circuit c9234, which receives the analog signals from the digital/analog converter 9233, amplifying the input analog signals from the digital/analog converter c9233 for driving the respective first, second or third heater c25, c45, c75; and closing the temperature controlling loop.

The thermal control computation module c911 computes digital temperature commands using the digital temperature voltage signals from the analog/digital converter c9232, the temperature sensor scale factor, and the pre-determined operating temperature of the angular rate producer and acceleration producer, wherein the digital temperature commands are connected to the digital/analog converter c9233.

In order to achieve a high degree of full functional performance for the micro IMU, a specific package of the first circuit board c2, the second circuit board c4, the third circuit board c7, and the control circuit board c9 of the preferred embodiment of the present invention is provided and disclosed as follows:

In the preferred embodiment of the present invention, as shown in FIGS. 27, 28, and 29, the third circuit board c7 is bonded to a supporting structure by means of a conductive epoxy, and the first circuit board c2, the second circuit board c4, and the control circuit board c9 are arranged parallelly to bond to the third circuit board c7 perpendicularly by a non conductive epoxy.

In other words, the first circuit board c2, the second circuit board c4, and the control circuit board c9 are soldered to the third circuit board c7 in such a way as to use the third circuit board c7 as an interconnect board, thereby avoiding the necessity to provide interconnect wiring, so as to minimize the small size.

The first, second, third, and control circuit boards c2, c4, c7, and c9 are constructed using ground planes which are brought out to the perimeter of each circuit board c2, c4, c7, c9, so that the conductive epoxy can form a continuous ground plane with the supporting structure. In this way the electrical noise levels are minimized and the thermal gradients are reduced. Moreover, the bonding process also reduces the change in misalignments due to structural bending caused by acceleration of the IMU.

Referring to FIG. 3, the vehicle self-carried processing method according to the preferred embodiment of the present invention comprises the following steps:

(a) sensing user motion and producing digital angular increments and velocity increments signals in response to vehicle motion by an inertial measurement unit 1, (b) sensing earth's magnetic field to measure a heading angle of a vehicle by a north finder 2 such as a magnetic sensor, (c) measuring a relative velocity of the vehicle relative to a transportation surface where the vehicle moving thereon by a velocity producer, and (d) deducing position data in an integration processor, using the digital angular increments and velocity increments signals, the heading angle, the relative velocity of the user relative to the transportation surface.

In the step (c), the velocity producer 6 is an odometer when the transportation surface is a ground surface or a velocimeter when the transportation surface is a water surface.

The step (d) further comprises the following steps:

(d.1) computing inertial positioning measurements using the digital angular increments and velocity increments signals;

(d.2) computing the heading angle using the earth's magnetic field measurements;

(d.3) creating a relative position error measurement in the odometer processing module using the relative velocity of the user relative to the ground to for a Kalman filter;

(d.4) creating a relative position error measurement in the velocimeter processing module using the relative velocity of the user relative to the water for a Kalman filter; and (d.5) estimating errors of inertial positioning measurements by means of performing Kalman filtering computation to calibrate the inertial positioning measurements.

In order to enhance the performance, the vehicle self-carrier positioning method of the present invention further comprises a first additional processing step of exchanging the obtained position information with other users via a wireless communication device.

In order to visualize the position information, the vehicle self-carrier positioning method of the present invention further comprises a second additional processing step of displaying the location of the vehicle on a map and displaying surrounding information by accessing the map database using the position information.

In principle, the step (d.1) can be called inertial navigation system processing. Inertial navigation is the process of calculating position by integrating velocity and computing velocity by integrating total acceleration. Total acceleration is calculated as the sum of gravitational acceleration, plus the acceleration produced by applied non-gravitational force. In a modern day INS, the attitude reference is provided by a software integration function residing in the INS computer using inputs from a three-axis set of inertial angular rate sensors. The angular rate sensor and accelerometer triad is mounted to a common rigid structure within the INS chassis to maintain precision alignment between each inertial sensor. Such an arrangement has been denoted as a strapdown INS because of the rigid attachment of the inertial sensors within the chassis, hence, to the vehicle in which the INS is mounted.

The primary functions executed in the INS computation module 31 are the angular rate integration into attitude function, denoted as attitude integration, use of the attitude data to transform the measured acceleration into a suitable navigation coordinate frame where it is integrated into velocity, denoted as velocity integration, and integration of navigation frame velocity into position, denoted as position integration. Thus, three integration functions are involved, attitude, velocity, and position, each of which require high accuracy to assure negligible error compared to inertial sensor accuracy requirements.

Therefore, the step (d.1) further comprises the steps of:

(d.1.1) integrating the angular increments into attitude data, referred to as attitude integration processing;

(d.1.2) transforming measured velocity increments into a suitable navigation coordinate frame by use of attitude data, wherein the transferred velocity increments are integrated into velocity data, denoted as velocity integration processing; and (d.1.3) integrating the navigation frame velocity data into position data, denoted as position integration processing.

In the strapdown INS, a mathematical frame (or an imaginary frame) is introduced, which emulates the motion of a level platform, so it is also called the platform frame and denoted by P. The vehicle velocity relative to the earth is represented in this mathematical frame. Written in the compact vector form, the velocity integration equation of the strapdown INS can be expressed as follows:

$$\dot{V} = f^P + G^P - (\omega_{ep}^P + 2\Omega_{ie}^P) \times V$$

where V is the vehicle velocity relative to the earth, represented in the P frame.

$f^P$ is the specific force represented in the P frame, or the accelerometer output transformed to the mathematical platform.

$G^P$ is the gravitational acceleration represented in the P frame.

$\omega_{ep}^P$ is the angular velocity of the mathematical platform with respect to the earth frame expressed in the P frame.

$\Omega_{ie}^P$ is the earth rate represented in the P frame.

In order to obtain a definite velocity equation for the INS, we have to first define the motion of the mathematical platform.

The P frame in the strapdown INS is a level platform, so its angular position with respect to the local geographical frame (N frame) can be described by an azimuth angle α. The angular velocity of the platform with respect to the inertial frame can be expressed as:

$$\omega_{ip}^P = \omega_{np}^P + C_n^p \omega_{en}^n + C_n^p \Omega_{ie}^n$$

where $\omega_{np}^P$ is the angular velocity of the P frame with respect to the N frame.

$C_n^p$ is direction cosine matrix of the P frame relative to the N frame.

$\omega_{en}^n$ is the angular velocity of the local geographical frame (N frame) with respect to the earth frame (E frame).

Since the P frame is a mathematical platform, we are able to define its motion. Based on the above equation, we can obtain an equation to describe the motion of the P frame relative to the N frame:

$$\omega_{ipz}^P = \dot{\alpha} + \frac{tg\varphi}{R_n + h} v_x^n + \Omega\sin\varphi$$

We define $\omega_{ipz}^P$ to obtain different mechanizations for the INS. In analogous to the gimbaled INS, we let $$\omega_{ipz}^P = 0$$

to have a so-called free-azimuth system, or let $$\omega_{ipz}^P = \Omega\sin\varphi$$

to have a so-called wander-azimuth system. Thus we have the motion of the mathematical platform defined.

For the free-azimuth system $$\dot{\alpha} = -\frac{tg\varphi}{R_n + h}v_x^n - \Omega\sin\varphi$$

For the wander-azimuth system $$\dot{\alpha} = -\frac{tg\varphi}{R_n + h}v_x^n$$

As long as the motion of the P frame is defined, we arrive at a definite velocity equation for the strapdown INS. Further, we can obtain a third-order, nonlinear, time-varying, ordinary differential equation as the INS velocity equation.

Expressed in geographical latitude and longitude, the position integration equation of the INS is written as $$\dot{\varphi} = \frac{v_y^n}{R_m + h} = \frac{1}{R_m + h}(v_x\sin\alpha + v_y\cos\alpha)$$

$$\dot{\lambda} = \frac{v_x^n}{(R_n + h)\cos\varphi} = \frac{1}{(R_n + h)\cos\varphi}(v_x\cos\alpha - v_y\sin\alpha)$$

It is noted that the longitude equation has a singularity at the earth's two poles. The longitude computation will become difficult in the polar areas. In practice, if the polar area navigation or simulation is required, we can introduce other position representation variables. For example, we can use the direction cosine matrix of the N frame relative to the earth centered earth fixed frame (ECEF frame), $C_e^n$, as the position variable. Then the position equation is expressed as:

$$\dot{C}_e^n = [\omega_{en}^n]C_e^n$$

This is a matrix differential equation. Where $$[\omega_{en}^n]$$

is the skew-symmetric matrix corresponding to the vector $$\omega_{en}^n.$$

This differential equation has no singular point and from $C_e^n$, we can calculate the position represented in latitude and longitude. In this equation, however, $C_e^n$ has 9 elements but 3 degrees-of-freedom. Thus in the computation, a normalization procedure is required to keep the $C_e^n$ normalized. That is, at every integration step, we modify $C_e^n$, making it satisfy $$C_e^n C_e^{nT} = I$$

If we regard the INS velocity equation as a nonlinear, time-varying system, the specific force in the P frame, $f^P$, and the gravitational acceleration, $G^P$, can be regarded as the inputs to the system. If we ignore the gravity anomaly, the gravitational acceleration can be represented as $$G^P = \begin{bmatrix} 0 \\ 0 \\ g \end{bmatrix}$$

where g is the normal gravity that can be expressed as $$g = g_0\left[1 - 2A\left(\frac{h}{a}\right) + B\sin^2\varphi\right]$$

where $A = 1 + f + m$
  $B = 2.5\ m - f$
  $f$=flattening of the reference ellipsoid.
  $m = \Omega^2 a^2 b/GM$
  $g_0$=equatorial gravity.
  h=altitude
  M=mass of the earth.
  G=gravitational constant.

The specific force in the P frame, $f^P$, is the actual accelerometer output transformed into the mathematical platform:

$$f^P = c_b^P f^b$$

where $f^b$ is the accelerometer output vector or the specific force represented in the IMU frame (or the body frame). To carry out this transformation, the direction cosine matrix $C_b^P$ must be known. That is, the attitude of the IMU frame must be obtained. In the strapdown INS the attitude is obtained from high-speed computation. It is through the attitude computation and coordinate system transformation, that the mathematical platform is established. In the implementation of the strapdown INS, the attitude computation is the most critical issue.

In principle, there are many kinds of parameters used to represent the attitude of a rigid body. For example, Euler angles, direction cosine matrix, quaternion, Euler parameters, etc. In practice, the direction cosine matrix and the quaternion are the most frequently used attitude representations in the analysis and computations. Represented with the direction cosine matrix, the attitude differential equation is written as:

$$\dot{C}_p^b = [\omega_{pb}^b]C_p^b$$

This is a matrix differential equation.

$$[\omega_{pb}^b]$$

is the skew-symmetric matrix corresponding to the vector $$\omega_{pb}^b$$

that is determined by the following equation:

$$\omega_{pb}^b = \omega_{ib}^b - \omega_{ip}^b$$
$$= \omega_{ib}^b - C_p^b(\omega_{ep}^p + C_b^p\Omega_{ie}^n)$$
$$= \omega_{ib}^b - C_p^b\omega_{ip}^p$$

where $$\omega_{pb}^b.$$

is the output of the gyros in the IMU or the IMU angular velocity with respect to the inertial space represented in the IMU frame itself.

The attitude equation is a $9^{th}$-order, nonlinear, time-varying ordinary differential equation. In this equation, however, the $C_p^b$ has 9 elements but 3 degrees-of-freedom. Thus, in the computation, a normalization procedure is required to keep the $C_p^b$ normalized. That is, in every integration step, we modify $C_p^b$, making it satisfy $$C_p^b C_p^{bT} = I.$$

The quaternion representation is often used in the attitude computation because of its conciseness and efficiency. The quaternion attitude equation is expressed as:

$$\dot{\lambda} = \frac{1}{2}\omega\lambda$$

where $\lambda$ is the quaternion expressed in the column matrix form, and $\omega$ is the 4×4 matrix determined by the angular velocity $$\omega_{pb}^b.$$

$$\lambda = \begin{bmatrix} \lambda_0 \\ \lambda_1 \\ \lambda_2 \\ \lambda_3 \end{bmatrix}$$

$$\omega = \begin{bmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{bmatrix}$$

The quaternion has 4 parameters to represent the body attitude, while a rigid body has only 3 degrees-of-freedom. Thus the components of the quaternion are constrained by the relationship:

$$\lambda_0^2 + \lambda_1^2 + \lambda_2^2 + \lambda_3^2 = 1$$

The quaternion satisfying this equation is called normalized. In the integration of the attitude equation, the normalization of the quaternion is also very simple. The relation between the quaternion and the direction cosine matrix is expressed as follows:

$$C_p^b = \begin{bmatrix} \lambda_1 \\ \lambda_2 \\ \lambda_3 \end{bmatrix} [\lambda_1 \; \lambda_2 \; \lambda_3] + \begin{bmatrix} \lambda_0 & \lambda_3 & -\lambda_2 \\ -\lambda_3 & \lambda_0 & \lambda_0 \\ \lambda_2 & -\lambda_0 & \lambda_0 \end{bmatrix}^2$$

To express the INS model in a compact form we introduce a vector defined as:

$$X = \begin{bmatrix} V \\ \alpha \\ \varphi \\ \lambda \end{bmatrix} = \begin{bmatrix} v_x \\ v_y \\ v_z \\ \alpha \\ \varphi \\ \lambda \end{bmatrix}$$

Then the INS computation model can be written as $$\dot{X} = F_x(X) + \begin{bmatrix} C_b^p f^b \\ O \end{bmatrix} + \begin{bmatrix} G^p \\ O \end{bmatrix}$$

$$\omega_{ip}^p = F_\omega(X)$$

$$\dot{C}_p^b = [\omega_{pb}^b] C_p^b$$

$$\omega_{pb}^b = \omega_{ib}^b - C_p^b \omega_{ip}^p$$

Figure 9:
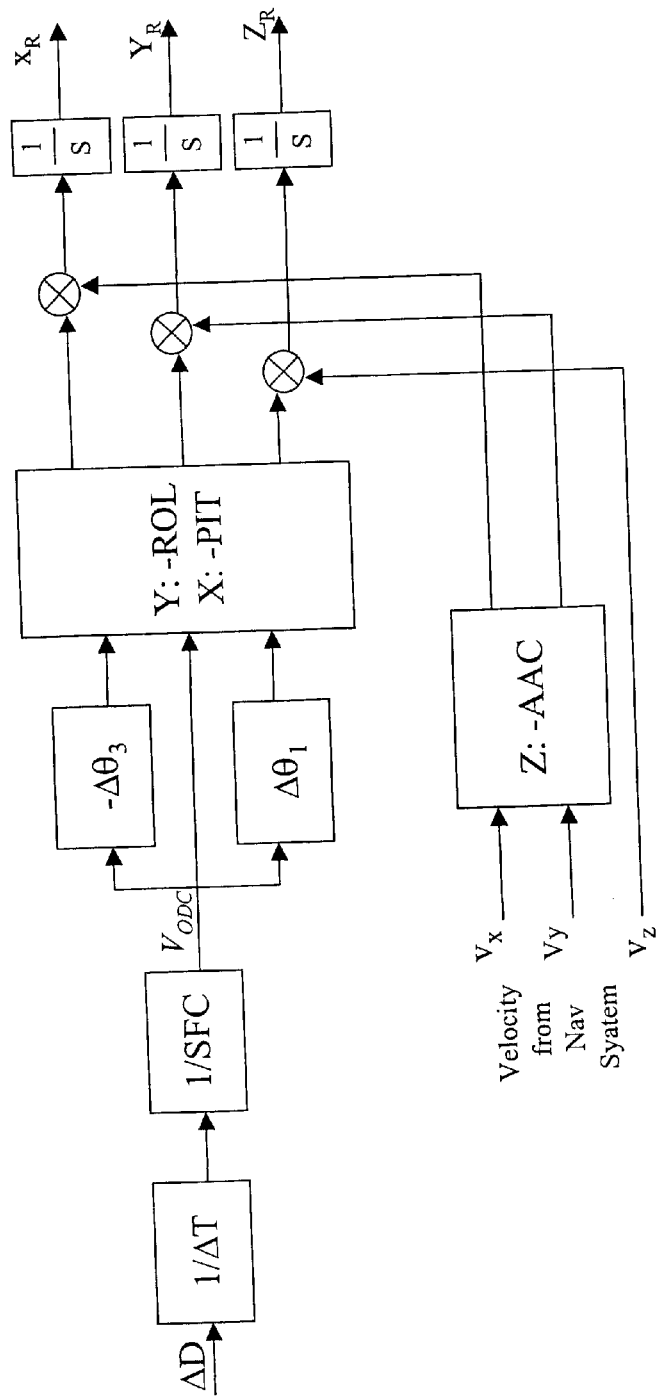
FIG. 9 is a block diagram illustrating the computation of the relative position error measurements for the odometer according to the above preferred embodiment of the present invention.

Referring to FIG. 9, the step (d.5) further comprises the steps of:
(d.5.1) performing motion tests to determine if the vehicle stops to initiate the zero-velocity update,
(d.5.2) formulating measurement equations and time varying matrix for the Kalman filter, and
(d.5.3) computing estimates of the error states using Kalman filter.

A flow diagram of the preferred implementation in step (d.3) to form the measurement is given in FIG. 9.

The variables and parameters in FIG. 9 are defined and described as follows:
ΔD, odometer position change pulses.
ΔT, time interval of high speed navigation/odometer loop.
ΔD/ΔT, velocity indicated by the odometer.
SFC, scale factor in pulse/(F/s).
$V_{ODC}$ computed odometer velocity.
$\Delta\theta_1$ and $\Delta\theta_3$, horizontal and vertical odometer boresight estimates.
PIT and ROL, IMU pitch, roll. Odometer mechanism assumes no turn.
$V_{x,y,z}$, navigation system (wander α) velocity.
AAC, sum of computer α and computer heading. The transformations using PIT, ROL, AAC must be current at high speed navigation rate.

Referring to FIG. 9, the step (d.3) further comprises the steps of:
(d.3.1) transforming the odometer or velocimeter velocity expressed in the body frame into the navigation frame;
(d.3.2) comparing the odometer or velocimeter velocity with the IMU velocity to form a velocity difference; and
(d.3.3) integrating the velocity difference during the predetermined interval.

In order to more clearly illustrate how the technology of the coremicro™ IMU employed in the vehicle self-carried positioning method and system thereof according to the present invention, the MEMS technology and the micro inertial measurement unit are further described in the following and referenced by FIGS. 11 to 36.

MEMS exploits the existing microelectronics infrastructure to create complex machines with micron feature sizes. These machines can have many functions, including sensing, communication, and actuation. Extensive applications for these devices exist in a wide variety of commercial systems.

It is quite a straightforward idea that we can exploit the MEMS sensors' merits of small size, low cost, batch processing, and shock resistance to develop a low cost, light weight, miniaturized, highly accurate integrated MEMS motion measurement system.

It is well known that existing processing methods for motion inertial measurement unit are most suitable for conventional angular rate sensors or gyros and accelerometers, and can not produce optimal performance for MEMS angular rate devices and acceleration devices.

According to the processing method for a motion inertial measurement unit, wherein output signals of angular rate producer and acceleration producer, such as angular rate device array and acceleration device array, or an angular rate and acceleration simulator, are processed to obtain highly accurate attitude and heading measurements of a carrier under dynamic environments.

The angular rate producer, such as MEMS angular rate device array or gyro array, provides three-axis angular rate measurement signals of a carrier. The acceleration producer, such as MEMS acceleration device array or accelerometer array, provides three-axis acceleration measurement signals of the carrier. The motion measurements of the carrier, such as attitude and heading angles, achieved by means of processing procedure of the three-axis angular rate measurement signals from the angular rate producer and three-axis acceleration measurement signals from the acceleration producer.

Output signals of angular rate producer and acceleration producer are processed to obtain digital highly accurate angular rate increment and velocity increment measurements of the carrier and are further processed to obtain highly accurate attitude and heading measurements of the carrier under dynamic environments. The present invention is specifically suitable for emerging MEMS angular rate devices and acceleration devices, which are assembled into an inertial measurement unit (IMU), such as core micro IMU.

Referring to FIG. 11, the processing method for carrier motion measurement comprises the following steps.

1. Produce three-axis angular rate signals by an angular rate producer c5 and three-axis acceleration signals by an acceleration producer c10.
2. Convert the three-axis angular rate signals into digital angular increments and convert the input three-axis acceleration signals into digital velocity increments in an angular increment and velocity increment producer c6.
3. Compute attitude and heading angle measurements using the three-axis digital angular increments and three-axis velocity increments in an attitude and heading processor c80.

In general, the angular rate producer c5 and the acceleration producer c10 are very sensitive to a variety of temperature environments. In order to improve measurement accuracy, referring to FIG. 12, the present invention further comprises an additional thermal controlling loop step 4, processed in parallel with the above steps 1 to 3, of maintaining a predetermined operating temperature throughout the above steps, wherein the predetermined operating temperature is a constant designated temperature selected between 150° F. and 185° F., preferable 176° F. (±1° F.).

The above thermal controlling loop step 4, as shown in FIG. 12, further comprises the steps of:

4A-1. producing temperature signals by a thermal sensing producer c15;

4A-2. inputting the temperature signals to a thermal processor c30 for computing temperature control commands using the temperature signals, a temperature scale factor, and a predetermined operating temperature of the angular rate producer c5 and the acceleration producer c10;

4A-3. producing driving signals to a heater device c20 using the temperature control commands; and 4A-4. outputting the driving signals to the heater device c20 for controlling the heater device c20 to provide adequate heat for maintaining the predetermined operating temperature throughout the above steps 1 to 3.

Temperature characteristic parameters of the angular rate producer c5 and the acceleration producer c10 can be determined during a series of the angular rate producer and acceleration producer temperature characteristic calibrations.

Referring to FIG. 13, when the above temperature controlling loop step 4 is not provided, in order to compensate the angular rate producer and acceleration producer measurement errors induced by a variety of temperature environments, after the above step 3, the present invention further comprises the steps of:

3A-1 producing temperature signals by a thermal sensing producer c15 and outputting a digital temperature value to an attitude and heading processor c80 by means of a temperature digitizer c18;

3A-2 accessing temperature characteristic parameters of the angular rate producer and the acceleration producer using a current temperature of the angular rate producer and the acceleration producer from the temperature digitizer c18; and 3A-3 compensating the errors induced by thermal effects in the input digital angular and velocity increments and computing attitude and heading angle measurements using the three-axis digital angular increments and three-axis velocity increments in the attitude and heading processor c80.

In preferable applications, in the above step 1, the angular rate producer c5 and the acceleration producer c10 are preferable MEMS angular rate device array and acceleration device array and the outputting signals of the angular rate producer c5 and the acceleration producer 10 are analog voltage signals. Current MEMS rate and acceleration sensors employ an input reference voltage to generate an output voltage which are proportional to input voltage and rotational and translational motion of a carrier, respectively. Therefore, step 1 further comprises the step of:

1.1 acquiring three-axis analog angular rate voltage signals from the angular producer c5, which are directly proportional to carrier angular rates, and 1.2 acquiring three-axis analog acceleration voltage signals from the acceleration producer c10, which are directly proportional to carrier accelerations.

When the outputting analog voltage signals of angular rate producer c5 and the acceleration producer c10 are too weak for the above mentioned integrating step 2 to read, the above producing step 1 prefers to further comprise amplifying steps 1.3 and 1.4 as follows after the step 1.2 for amplifying the analog voltage signals input from the angular rate producer c5 and the acceleration producer c10 and suppressing noise signals residing within the analog voltage signals input from the angular rate producer c5 and the acceleration producer c10, as shown in FIGS. 15 and 21.

1.3 Amplify the three-axis analog angular rate voltage signals and the three-axis analog acceleration voltage signals by means of a first amplifier circuit c61 and a second amplifier circuit c67 respectively to form amplified three-axis analog angular rate signals and amplified three-axis analog acceleration signals respectively.

1.4 Output the amplified three-axis analog angular rate signals and the amplified three-axis analog acceleration signals to an integrator circuit c62 and an integrator circuit c68.

Accordingly, referring to FIG. 14, the above converting step 2 further comprises the following steps:

2.1 Integrate the three-axis analog angular rate voltage signals and the three-axis analog acceleration voltage signals for a predetermined time interval to accumulate the three-axis analog angular rate voltage signals and the three-axis analog acceleration voltage signals as a raw three-axis angular increment and a raw three-axis velocity increment for the predetermined time interval to achieve accumulated angular increments and accumulated velocity increments. The integration is performed to remove noise signals that are non-directly proportional to the carrier angular rate and acceleration within the three-axis analog angular rate voltage signals and the three-axis analog acceleration voltage signals, to improve signal-to-noise ratio, and to remove the high frequency signals in the three-axis analog angular rate voltage signals and the three-axis analog acceleration voltage signals. The signals that are directly proportional to the carrier angular rate and acceleration within the three-axis analog angular rate voltage signals and the three-axis analog acceleration voltage signals can be used in subsequent processing steps.

2.2 Form an angular reset voltage pulse and a velocity reset voltage pulse as an angular scale and a velocity scale respectively.

2.3 Measure the voltage values of the three-axis accumulated angular increments and the three-axis accumulated velocity increments with the angular reset voltage pulse and the velocity reset voltage pulse respectively to acquire angular increment counts and velocity increment counts as a digital form of angular and velocity measurements respectively.

In order to output real three-angular increment and velocity increment values as an optional output format to substitute the voltage values of the three-axis accumulated angular increments and velocity increments, after the above step 2.3 the converting step 2 further comprises an additional step of:

2.4 scaling the voltage values of the three-axis accumulated angular and velocity increments into real three-axis angular and velocity increment voltage values.

In the integrating step 2.1, the three-axis analog angular voltage signals and the three-axis analog acceleration voltage signals are each reset to accumulate from a zero value at an initial point of every predetermined time interval.

Moreover, in general, the angular reset voltage pulse and the velocity reset voltage pulse in the step 2.2 may be implemented by producing a timing pulse by an oscillator c66, as shown in FIG. 16.

In the step 2.3, the measurement of the voltage values of the three-axis accumulated angular and velocity increments can be implemented by an analog/digital converter c650, as shown in FIG. 17. In other words, step 2.3 is substantially a digitization step for digitizing the raw three-axis angular and velocity increment voltage values into digital three-axis angular and velocity increments.

In applications, the above amplifying, integrating, analog/digital converter c650 and oscillator c66 can be built with circuits, such as Application Specific Integrated Circuits (ASIC) chip and a printed circuit board.

As shown in FIG. 21, the step 2.3 further comprises the steps of:

2.3.1 inputting the accumulated angular increments and the accumulated velocity increments into an angular analog/digital converter c63 and a velocity analog/digital converter c69 respectively;

2.3.2 digitizing the accumulated angular increments by the angular analog/digital converter c63 by measuring the accumulated angular increments with the angular reset voltage pulse to form a digital angular measurements of voltage in terms of the angular increment counts which is output to an input/output interface circuit c65;

2.3.3 digitizing the accumulated velocity increments by the velocity analog/digital converter c69 by measuring the accumulated velocity increments with the velocity reset voltage pulse to form a digital velocity measurements of voltage in terms of the velocity increment counts which is output to an input/output interface circuit c65; and 2.3.4 outputting the digital three-axis angular and velocity increment voltage values by the input/output interface circuit c65.

In order to achieve flexible adjustment of the thermal processor c30 for a thermal sensing producer c15 with analog voltage output and a heater device c20 with analog input, thermal processor c30 can be implemented in a digital feedback controlling loop as shown in FIG. 18. Referring to FIG. 18, the above thermal controlling loop step 4 alternatively comprises the steps of:

4B-1 producing temperature voltage signals by a thermal sensing producer c15 to an analog/digital converter c304, 4B-2 sampling the temperature voltage signals in the analog/digital converter c304 and digitizing the sampled temperature voltage signals to digital signals which are output to the temperature controller c306, 4B-3 computing digital temperature commands in a temperature controller c306 using the input digital signals from the analog/digital converter c304, a temperature sensor scale factor, and a pre-determined operating temperature of the angular rate producer and acceleration producer, wherein the digital temperature commands are fed back to a digital/analog converter c303, and 4B-4 converting the digital temperature commands input from the temperature controller c306 in the digital/analog converter c303 into analog signals which are output to a heater device c20 to provide adequate heat for maintaining the predetermined operating temperature throughout the above steps 1 to 3.

If the voltage signals produced by the thermal sensing producer c15 are too weak for the analog/digital converter c304 to read, referring to FIG. 19 there is an additional amplifying step 4-0 processed between the thermal sensing producer c15 and the digital/analog converter c303.

The amplifying step 4-0: Acquire voltage signals from the thermal sensing producer c15 to a first amplifier circuit c301 for amplifying the signals and suppressing the noise residing in the voltage signals and improving the signal-to-noise ratio, wherein the amplified voltage signals are output to the analog/digital converter c304.

Generally, the heater device c20 requires a specific driving current signals. In this case, referring to FIG. 20, there is an amplifying step 4.5 preferred to be processed between the digital/analog converter c303 and heater device c20:

Step 4B-5: amplifying the input analog signals from the digital/analog converter c303 for driving the heater device c20 in a second amplifier circuit c302; and closing the temperature controlling loop.

Figure 20:
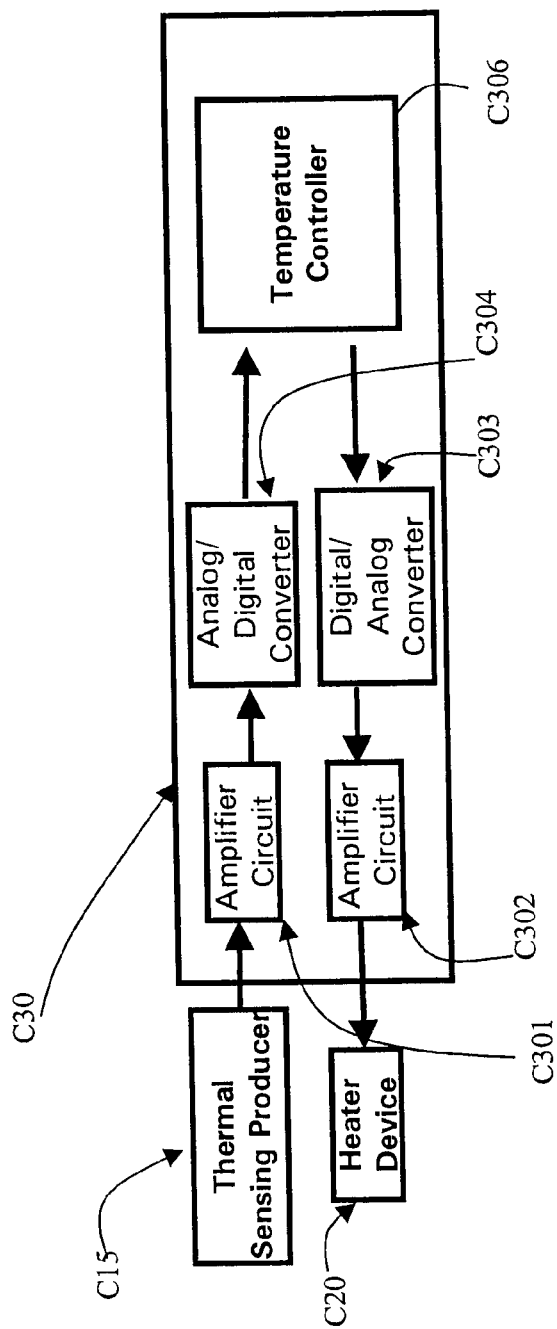
FIG. 20 is a block diagram illustrating another thermal processor for outputting analog voltage signals of the thermal sensing producer according to the above preferred embodiment of the present invention.

Sequentially, as shown in FIG. 20, the step 4B-4 further comprises the step of:

4B-4A converting the digital temperature commands input from the temperature controller c306 in the digital/analog converter c303 into analog signals which are output to the amplifier circuit c302.

Sometimes, an input/output interface circuit c305 is required to connect the analog/digital converter c304 and digital/analog converter c303 and with the temperature controller c306. In this case, referring to FIG. 21, the step 4B-2 comprises the step of 4B-2A sampling the voltage signals in the analog/digital converter c304 and digitizing the sampled voltage signals, and the digital signals are output to the input/output interface circuit c305.

Sequentially, as shown in FIG. 21, the step 4B-3 comprises the step of:

4B-3A computing digital temperature commands in the temperature controller c306 using the input digital temperature voltage signals from the input/output interface circuit c305, the temperature sensor scale factor, and the pre-determined operating temperature of the angular rate producer and acceleration producer, wherein the digital temperature commands are fed back to the input/output interface circuit c305.

Moreover, as shown in FIG. 21, the step 4B-4 further comprises the step of:

4B—4B converting the digital temperature commands input from the input/output interface circuit 305 in the digital/analog converter 303 into analog signals which are output to the heater device 20 to provide adequate heat for maintaining the predetermined operating temperature throughout the above steps 1 to 3.

Referring to FIG. 12, the above mentioned step 3A-1 can be implemented by an analog/digital converter c182 for the thermal sensing producer c15 with analog voltage output. If the voltage signals produced by the thermal sensing producer c15 are too weak for the analog/digital converter c182 to read, referring to FIG. 23, there is an additional amplifying step processed between the thermal sensing producer c15 and the digital/analog converter c182. The step 3A-1 further comprises the steps of:

3A-1.1 acquiring voltage signals from the thermal sensing producer c15 to the amplifier circuit c181 for amplifying the signals and suppressing the noise residing in the voltage signals and improving the voltage signal-to-noise ratio, wherein the amplified voltage signals are output to the analog/digital converter c182, and 3A-1.2 sampling the input amplified voltage signals in the analog/digital converters c182 and digitizing the sampled voltage signals to form digital signals outputting to the attitude and heading processor c80.

Sometimes, an input/output interface circuit c183 is required to connect the analog/digital converter c182 with the attitude and heading processor c80. In this case, referring to FIG. 24, the step 3A-1.2 comprises the step of:

3A-1.2A sampling the input amplified voltage signals in the analog/digital converters c182 and digitizing the sampled voltage signals to form digital signals outputting to the input/output interface circuit c183.

Referring to FIG. 11, the digital three-axis angular increment voltage values or real values and three-axis digital velocity increment voltage values or real values are produced and outputted by the step 2.

In order to adapt to digital three-axis angular increment voltage value and three-axis digital velocity increment voltage values from the step 2, referring to FIG. 25, the above mentioned step 3 further comprises the steps of:

3B.1 inputting digital three-axis angular increment voltage values from the input/output interface circuit 65 of the step 2 and coarse angular rate bias obtained from an angular rate producer and acceleration producer calibration constants table in high data rate (short interval) into a coning correction module c811; computing coning effect errors in the coning correction module 811 using the input digital three-axis angular increment voltage values and coarse angular rate bias; and outputting three-axis coning effect terms and three-axis angular increment voltage values at reduced data rate (long interval), which are called three-axis long-interval angular increment voltage values, into a angular rate compensation module c812, 3B.2 inputting the coning effect errors and three-axis long-interval angular increment voltage values from the coning correction module c811 and angular rate device misalignment parameters, fine angular rate bias, angular rate device scale factor, and coning correction scale factor from the angular rate producer and acceleration producer calibration constants table to the angular rate compensation module c812; compensating definite errors in the input three-axis long-interval angular increment voltage values using the input coning effect errors, angular rate device misalignment parameters, fine angular rate bias, and coning correction scale factor; transforming the compensated three-axis long-interval angular increment voltage values to real three-axis long-interval angular increments using the angular rate device scale factor; and outputting the real three-axis angular increments to an alignment rotation vector computation module c815, 3B.3 inputting the three-axis velocity increment voltage values from the input/output interface circuit 65 of the step 2 and acceleration device misalignment, acceleration device bias, and acceleration device scale factor from the angular rate producer and acceleration producer calibration constants table to accelerometer compensation module c813; transforming the input three-axis velocity increments voltage values into real three-axis velocity increments using the acceleration device scale factor; compensating the definite errors in three-axis velocity increments using the input acceleration device misalignment, accelerometer bias; outputting the compensated three-axis velocity increments to the level acceleration computation module c814, 3B.4 updating a quaternion, which is a vector representing rotation motion of the carrier, using the compensated three-axis angular increments from the angular rate compensation module c812, an east damping rate increment from an east damping computation module c818, a north damping rate increment from a north damping computation module c819, and vertical damping rate increment from a vertical damping computation module c810; and the updated quaternion is output to a direction cosine matrix computation module c816, 3B.5 computing the direction cosine matrix, using the input updated quaternion; and the computed direction cosine matrix is output to a level acceleration computation module c814 and an attitude and heading angle extract module c817, 3B.6 extracting attitude and heading angle using the direction cosine matrix from the direction cosine matrix computation module c816; outputting the heading angle into a vertical damping rate computation module c818, 3B.7 computing level velocity increments using the input compensated three-axis velocity increments from the acceleration compensation module c814 and the direction cosine matrix from the direction cosine matrix computation module c816; outputting the level velocity increments to an east damping rate computation module c810 and north damping rate computation module c819, 3B.8 computing east damping rate increments using the north velocity increment of the input level velocity increments from the level acceleration computation module c814; feeding back the east damping rate increments to the alignment rotation vector computation module c815, 3B.9 computing north damping rate increments using the east velocity increment of the input level velocity increments from the level acceleration computation module c814; feeding back the north damping rate increments to the alignment rotation vector computation module c815, and 3B.10 computing vertical damping rate increments using the computed heading angle from the attitude and heading angle extract module c817 and a measured heading angle from an external sensor c90; and feeding back the vertical damping rate increments to the alignment rotation vector computation module c815.

In order to adapt to real digital three-axis angular increment values and real three-axis digital velocity increment values from step 2, referring to FIG. 25, the above mentioned step 3B.1~3B.3 are modified into:

3B.1A inputting real digital three-axis angular increment values from the step 2 and coarse angular rate bias obtained from an angular rate producer and acceleration producer calibration constants table in high data rate (short interval) into a coning correction module c811; computing coning effect errors in the coning correction module c811 using the input digital three-axis angular increment values and coarse angular rate bias; and outputting three-axis coning effect terms and three-axis angular increment values at reduced data rate (long interval), which are called three-axis long-interval angular increment values, into a angular rate compensation module c812, 3B.2A inputting the coning effect errors and three-axis long-interval angular increment values from the coning correction module c811 and angular rate device misalignment parameters and fine angular rate bias from the angular rate producer and acceleration producer calibration constants table to the angular rate compensation module c812; compensating definite errors in the input three-axis long-interval angular increment values using the input coning effect errors, angular rate device misalignment parameters, fine angular rate bias, and coning correction scale factor; and outputting the real three-axis angular increments to an alignment rotation vector computation module c815, and 3B.3A inputting the three-axis velocity increment values from Step 2 and acceleration device misalignment, and acceleration device bias from the angular rate producer and acceleration producer calibration to accelerometer compensation module c813; compensating the definite errors in three-axis velocity increments using the input acceleration device misalignment, accelerometer bias; outputting the compensated three-axis velocity increments to the level acceleration computation module c814.

Referring to FIGS. 13, 24, and 25, which use temperature compensation method, in order to adapt to digital three-axis angular increment voltage value and three-axis digital velocity increment voltage values from step 2, the above mentioned step 3A-2 further comprises the steps of:

3A-2.1 inputting digital three-axis angular increment voltage values from the input/output interface circuit 65 of the step 2 and coarse angular rate bias obtained from an angular rate producer and acceleration producer calibration constants table in high data rate (short interval) into a coning correction module c811; computing coning effect errors in the coning correction module c811 using the input digital three-axis angular increment voltage values and coarse angular rate bias; and outputting three-axis coning effect terms and three-axis angular increment voltage values in reduced data rate (long interval), which are called three-axis long-interval angular increment voltage values, into a angular rate compensation module c812, 3A-2.2 inputting the coning effect errors and three-axis long-interval angular increment voltage values from the coning correction module c811 and angular rate device misalignment parameters, fine angular rate bias, angular rate device scale factor, and coning correction scale factor from the angular rate producer and acceleration producer calibration constants table to the angular rate compensation module c812; inputting the digital temperature signals from input/output interface circuit c183 of the step 3A.1.2 and temperature sensor scale factor; computing current temperature of angular rate producer; accessing angular rate producer temperature characteristic parameters using the current temperature of angular rate producer; compensating definite errors in the input three-axis long-interval angular increment voltage values using the input coning effect errors, angular rate device misalignment parameters, fine angular rate bias, and coning correction scale factor; transforming the compensated three-axis long-interval angular increment voltage values to real three-axis long-interval angular increments; compensating temperature-induced errors in the real three-axis long-interval angular increments using the angular rate producer temperature characteristic parameters; and outputting the real three-axis angular increments to an alignment rotation vector computation module c815, 3A-2.3 inputting the three-axis velocity increment voltage values from the input/output interface circuit c65 of the step 2 and acceleration device misalignment, acceleration bias, acceleration device scale factor from the angular rate producer and acceleration producer calibration constants table to acceleration compensation module c813; inputting the digital temperature signals from input/output interface circuit c183 of the step 3A-1 and temperature sensor scale factor; computing current temperature of acceleration producer; accessing acceleration producer temperature characteristic parameters using the current temperature of acceleration producer; transforming the input three-axis velocity increments voltage values into real three-axis velocity increments using the acceleration device scale factor; compensating the definite errors in three-axis velocity increments using the input acceleration device misalignment, acceleration bias; compensating temperature-induced errors in the real three-axis velocity increments using the acceleration producer temperature characteristic parameters; and outputting the compensated three-axis velocity increments to the level acceleration computation module c814, 3A-2.4 updating a quaternion, which is a vector representing rotation motion of the carrier, using the compensated three-axis angular increments from the angular rate compensation module c812, an east damping rate increment from an east damping computation module c818, a north damping rate increment from a north damping computation module c819, and vertical damping rate increment from a vertical damping computation module c810; and the updated quaternion is output to a direction cosine matrix computation module c816, 3A-2.5 computing the direction cosine matrix, using the input updated quaternion; and the computed direction cosine matrix is output to a level acceleration computation module c814 and an attitude and heading angle extract module c817, 3A-2.6 extracting attitude and heading angle using the direction cosine matrix from the direction cosine matrix computation module c816; outputting the heading angle into a vertical damping rate computation module c818, 3A-2.7 computing level velocity increments using the input compensated three-axis velocity increments from the acceleration compensation module c814 and the direction cosine matrix from the direction cosine matrix computation module c816; outputting the level velocity increments to an east damping rate computation module c810 and north damping rate computation module c819, 3A-2.8 computing east damping rate increments using the north velocity increment of the input level velocity increments from the level acceleration computation module c814; feeding back the east damping rate increments to the alignment rotation vector computation module c815, 3A-2.9 computing north damping rate increments using the east velocity increment of the input level velocity increments from the level acceleration computation module c814; feeding back the north damping rate increments to the alignment rotation vector computation module c815, and 3A-2.10 computing vertical damping rate increments using the computed heading angle from the attitude and heading angel extract module c817 and a measured heading angle from an external sensor c90; and feeding back the vertical damping rate increments to the alignment rotation vector computation module c815.

Referring to FIGS. 13, 24, and 25, which use temperature compensation method, in order to adapt to real digital three-axis angular increment values and real three-axis digital velocity increment values from the step 2, the above mentioned step 3A-2.1 are modified into:

3A-2.1A inputting digital three-axis angular increment values from the input/output interface circuit c65 of Step 2 and coarse angular rate bias obtained from an angular rate producer and acceleration producer calibration constants table in high data rate (short interval) into a coning correction module c811; computing coning effect errors in the coning correction module c811 using the input digital three-axis angular increment values and coarse angular rate bias; and outputting three-axis coning effect terms and three-axis angular increment values in reduced data rate (long interval), which are called three-axis long-interval angular increment values, into a angular rate compensation module c812, 3A-2.2A inputting the coning effect errors and three-axis long-interval angular increment values from the coning correction module c811 and angular rate device misalignment parameters and fine angular rate bias from the angular rate producer and acceleration producer calibration constants table to the angular rate compensation module c812; inputting the digital temperature signals from input/output interface circuit c183 of the step 3A-1.2 and temperature sensor scale factor; computing current temperature of angular rate producer; accessing angular rate producer temperature characteristic parameters using the current temperature of angular rate producer; compensating definite errors in the input three-axis long-interval angular increment values using the input coning effect errors, angular rate device misalignment parameters, fine angular rate bias, and coning correction scale factor; compensating temperature-induced errors in the real three-axis long-interval angular increments using the angular rate producer temperature characteristic parameters; and outputting the real three-axis angular increments to an alignment rotation vector computation module c815, and 3A-2.3A inputting the three-axis velocity increment values from the input/output interface circuit c65 of the step 2 and acceleration device misalignment and acceleration bias from the angular rate producer and acceleration producer calibration constants table to acceleration compensation module c813; inputting the digital temperature signals from input/output interface circuit c183 of the step 3A-1 and temperature sensor scale factor; computing current temperature of acceleration producer; accessing acceleration producer temperature characteristic parameters using the current temperature of acceleration producer; compensating the definite errors in three-axis velocity increments using the input acceleration device misalignment, acceleration bias; compensating temperature-induced errors in the real three-axis velocity increments using the acceleration producer temperature characteristic parameters; and outputting the compensated three-axis velocity increments to the level acceleration computation module c814.

What is claimed is:

1. A vehicle self-carried positioning system for being carried in a vehicle, comprising:

an inertial measurement unit sensing traveling displacement motions of said vehicle and producing digital angular increments and velocity increments signals in response to said traveling displacement motions of said vehicle;

a north finder producing a heading measurement of said vehicle;

a velocity producer producing a current axis velocity data of a body frame of said vehicle; and a navigation processor, which is connected with said inertial measurement unit, said north finder, and said velocity producer so as to receive said digital angular increments and velocity increments signals, heading measurement, and current axis velocity data of said body frame, for comparing an inertial measurement unit (IMU) position deduced from said digital angular increments and velocity increments signals with a measured position deduced from said heading measurement and current axis velocity data of said body frame, so as to obtain a position difference; and feeding back said position difference to correct said IMU position to output a corrected IMU position when said position difference is bigger than a predetermined scale value.

2. The vehicle self-carried positioning system, as recited in claim 1, wherein said north finder is a magnetic sensor detecting a magnetic field vector of the earth to form said magnetic heading measurement.

3. The vehicle self-carried positioning system, as recited in claim 2, further comprising a wireless communication device for exchanging said IMU position and said corrected IMU position with other vehicle self-carried positioning systems carried by other vehicles.

4. The vehicle self-carried positioning system, as recited in claim 3, further comprising a map database and a display device for displaying a location of said vehicle on a map and obtaining surrounding information by accessing said map database using said IMU position and said corrected IMU position.

5. The vehicle self-carried positioning system, as recited in claim 2, further comprising a map database and a display device for displaying a location of said vehicle on a map and obtaining surrounding information by accessing said map database using said IMU position and said corrected IMU position.

6. The vehicle self-carried positioning-system, as recited in claim 1, further comprising a wireless communication device for exchanging said IMU position and said corrected IMU position with other vehicle self-carried positioning systems carried by other vehicles.

7. The vehicle self-carried positioning system, as recited in claim 3, further comprising a map database and a display device for displaying a location of said vehicle on a map and obtaining surrounding information by accessing said map database using said IMU position and said corrected IMU position.

8. The vehicle self-carried positioning system, as recited in claim 1, further comprising a map database and a display device for displaying a location of said vehicle on a map and obtaining surrounding information by accessing said map database using said IMU position and said corrected IMU position.

9. The vehicle self-carried positioning system, as recited in claim 1, wherein said navigation processor further comprises:

an INS computation module, using said digital angular increments and velocity increments signals from said inertial measurement unit to produce inertial positioning measurements;

a magnetic sensor processing module for producing a heading angle;

a vehicle producer processing module for producing relative position error measurements for a Kalman filter; and a Kalman filter module for estimating errors of said inertial positioning measurements to calibrate inertial positioning measurement errors.

10. The vehicle self-carried positioning system, as recited in claim 9, wherein said INS computation module further comprises:

a sensor compensation module for calibrating errors of said digital angular increments and velocity increments signals; and an inertial navigation algorithm module for computing IMU position, velocity and attitude data.

11. A vehicle self-carried positioning system for being carried in a vehicle, comprising:

a north finder producing a heading measurement of said vehicle;

a velocity producer producing a current axis velocity data of a body frame of said vehicle; and a micro inertial measurement unit sensing traveling displacement motions of said vehicle and producing digital angular increments and velocity increments signals in response to said traveling displacement motions of said vehicle; wherein micro inertial measurement unit comprises an angular rate producer producing X axis, Y axis and Z axis angular rate electrical signals, an acceleration producer producing X axis, Y axis and Z axis acceleration electrical signals, and an angular increment and velocity increment producer converting said X axis, Y axis and Z axis angular rate electrical signals into digital angular increments and converting said input X axis, Y axis and Z axis acceleration electrical signals into digital velocity increments; and a navigation processor, which is connected with said inertial measurement unit, said north finder, and said velocity producer so as to receive said digital angular increments and velocity increments signals, heading measurement, and current axis velocity data of said body frame.

12. A vehicle self-carried positioning method, comprising the steps of:

(a) sensing traveling displacement motions of a vehicle and producing digital angular increments and velocity increments signals in response to said traveling displacement motions by an inertial measurement unit;

(b) sensing magnetic field of the earth to measure a heading angle of said vehicle by a north finder;

(c) measuring a relative velocity of said vehicle relative to a transportation surface where said vehicle moving thereon by a velocity producer, and (d) deducing position data in an integration processor, using said digital angular increments and velocity increments signals, said heading angle, said relative velocity of said vehicle relative to said transportation surface.

13. The vehicle self-carried positioning method, as recited in claim 12, wherein the step (d) further comprises the steps of:

(d.1) computing inertial positioning measurements using said digital angular increments and velocity increments signals;

(d.2) computing said heading angle using said earth's magnetic field measurements;

(d.3) creating a relative position error measurement in a velocity producer processing module of said navigation processor using said relative velocity of said vehicle relative to said transportation surface for a Kalman filter;

(d.4) creating a relative position error measurement in said velocity producer processing module using said relative velocity of said user relative to said water for said Kalman filter; and (d.5) estimating errors of said inertial positioning measurements to calibrate inertial positioning measurement errors.

14. The vehicle self-carried positioning method, as recited in claim 13, after the step (d), further comprising a first additional processing step of exchanging obtained position information with other vehicles via a wireless communication device.

15. The vehicle self-carried positioning method, as recited in claim 14, further comprising a second additional processing step of displaying a location of said vehicle on a map and displaying surrounding information by accessing said map database using obtained position information.

16. The vehicle self-carried positioning method, as recited in claim 13, further comprising an additional processing step of displaying a location of said vehicle on a map and displaying surrounding information by accessing said map database using obtained position information.

17. The vehicle self-carried positioning method, as recited in claim 12, after the step (d), further comprising an additional processing step of exchanging obtained position information with other vehicles via a wireless communication device.

18. The vehicle self-carried positioning method, as recited in claim 14, further comprising a second additional processing step of displaying a location of said vehicle on a map and displaying surrounding information by accessing said map database using obtained position information.

19. The vehicle self-carried positioning method, as recited in claim 12, further comprising an additional processing step of displaying a location of said vehicle on a map and displaying surrounding information by accessing said map database using obtained position information.

* * * * *